(12) United States Patent
Hofstetter et al.

(10) Patent No.: US 12,482,378 B2
(45) Date of Patent: Nov. 25, 2025

(54) SIMULATED ABDOMINAL WALL

(71) Applicant: Applied Medical Resources Corporation, Rancho Santa Margarita, CA (US)

(72) Inventors: Gregory K. Hofstetter, Rancho Santa Margarita, CA (US); Tracy Breslin, Trabuco Canyon, CA (US); Joel B. Velasco, Rancho Santa Margarita, CA (US)

(73) Assignee: Applied Medical Resources Corporation, Rancho Santa Margarita, CA (US)

( * ) Notice: Subject to any disclaimer, the term of this patent is extended or adjusted under 35 U.S.C. 154(b) by 0 days.

(21) Appl. No.: 18/520,973

(22) Filed: Nov. 28, 2023

(65) Prior Publication Data

US 2024/0096238 A1  Mar. 21, 2024

Related U.S. Application Data

(63) Continuation of application No. 17/474,534, filed on Sep. 14, 2021, now Pat. No. 11,830,378, which is a
(Continued)

(51) Int. Cl.
*G09B 23/28* (2006.01)
*G09B 23/30* (2006.01)

(52) U.S. Cl.
CPC ........... *G09B 23/285* (2013.01); *G09B 23/30* (2013.01)

(58) Field of Classification Search
CPC .............................. G09B 23/285; G09B 23/30
(Continued)

(56) References Cited

U.S. PATENT DOCUMENTS

| 184,573 | A | 11/1876 | Becker |
| 2,127,774 | A | 8/1938 | Jacobs |

(Continued)

FOREIGN PATENT DOCUMENTS

| CA | 2 293 585 A1 | 12/1998 |
| CN | 2421706 Y | 2/2001 |

(Continued)

OTHER PUBLICATIONS

European Patent Office, Extended European Search Report for European Patent Application No. 23186659.1, titled "Hysterectomy Model," dated Mar. 5, 2024, 11 pgs.
(Continued)

*Primary Examiner* — Peter S Vasat
*Assistant Examiner* — Stephen Alvesteffer
(74) *Attorney, Agent, or Firm* — Shirin Bozorgui

(57) ABSTRACT

A simulated abdominal wall for laparoscopic surgical training and methods of making the wall are provided. The simulated abdominal wall is dome-shaped having a visual appearance of an insufflated abdomen. The wall is strong enough to withstand penetration with surgical trocars without unrealistic buckling or deformation. The wall is supported by a perimeter frame without any support structures traversing the wall that would interfere with port placement. The wall includes multiple layers connected together to form a unitary wall to fit a laparoscopic trainer. In one method, a projection of a dome is cut from a flat layer of foam material and assembled within a mold cavity. Consecutive layers with the same or different projection pattern are laid up inside the mold cavity. Alternatively, a vacuum mold together with heat is used to deform each foam layer. Adhesive is applied between layers to simultaneously join the adjacent layers upon deformation.

20 Claims, 29 Drawing Sheets

Related U.S. Application Data continuation of application No. 16/018,361, filed on Jun. 26, 2018, now Pat. No. 11,120,708, which is a continuation of application No. PCT/US2017/039113, filed on Jun. 23, 2017.

(60) Provisional application No. 62/355,170, filed on Jun. 27, 2016.

(58) Field of Classification Search
USPC .......................................................... 434/267
See application file for complete search history.

(56) References Cited

U.S. PATENT DOCUMENTS

| | | | |
|---|---|---|---|
| 2,284,888 A | 6/1942 | Arneil, Jr. |
| 2,324,702 A | 7/1943 | Hoffman et al. |
| 2,345,489 A | 3/1944 | Lord |
| 2,495,568 A | 1/1950 | Coel |
| 3,766,666 A | 10/1973 | Stroop |
| 3,775,865 A | 12/1973 | Rowan |
| 3,789,518 A | 2/1974 | Chase |
| 3,921,311 A | 11/1975 | Beasley et al. |
| 3,991,490 A | 11/1976 | Markman |
| 4,001,951 A | 1/1977 | Fasse |
| 4,001,952 A | 1/1977 | Kleppinger |
| 4,321,047 A | 3/1982 | Landis |
| 4,323,350 A | 4/1982 | Bowden, Jr. |
| 4,332,569 A | 6/1982 | Burbank |
| 4,371,345 A | 2/1983 | Palmer et al. |
| 4,386,917 A | 6/1983 | Forrest |
| 4,459,113 A | 7/1984 | Boscaro Gatti et al. |
| 4,481,001 A | 11/1984 | Graham et al. |
| 4,596,528 A | 6/1986 | Lewis et al. |
| 4,726,772 A | 2/1988 | Amplatz |
| 4,737,109 A | 4/1988 | Abramson |
| 4,789,340 A | 12/1988 | Zikria |
| 4,832,978 A | 5/1989 | Lesser |
| 4,867,686 A | 9/1989 | Goldstein |
| 4,907,973 A | 3/1990 | Hon |
| 4,938,696 A | 7/1990 | Foster et al. |
| 4,940,412 A | 7/1990 | Blumenthal |
| 5,061,187 A | 10/1991 | Jerath |
| 5,083,962 A | 1/1992 | Pracas |
| 5,104,328 A | 4/1992 | Lounsbury |
| 5,149,270 A | 9/1992 | McKeown |
| 5,180,308 A | 1/1993 | Garito et al. |
| 5,230,630 A | 7/1993 | Burgett |
| 5,273,435 A | 12/1993 | Jacobson |
| 5,295,694 A | 3/1994 | Levin |
| 5,310,348 A | 5/1994 | Miller |
| 5,318,448 A | 6/1994 | Garito et al. |
| 5,320,537 A | 6/1994 | Watson |
| 5,358,408 A | 10/1994 | Medina |
| 5,368,487 A | 11/1994 | Medina |
| 5,380,207 A | 1/1995 | Siepser |
| 5,403,191 A | 4/1995 | Tuason |
| 5,425,644 A | 6/1995 | Szinicz |
| 5,425,731 A | 6/1995 | Daniel et al. |
| 5,472,345 A | 12/1995 | Eggert |
| 5,518,406 A | 5/1996 | Waters |
| 5,518,407 A | 5/1996 | Greenfield et al. |
| 5,520,633 A | 5/1996 | Costin |
| 5,541,304 A | 7/1996 | Thompson |
| 5,620,326 A | 4/1997 | Younker |
| 5,720,742 A | 2/1998 | Zacharias |
| 5,722,836 A | 3/1998 | Younker |
| 5,727,948 A | 3/1998 | Jordan |
| 5,743,730 A | 4/1998 | Clester et al. |
| 5,762,458 A | 6/1998 | Wang et al. |
| 5,769,640 A | 6/1998 | Jacobus et al. |
| 5,775,916 A | 7/1998 | Cooper et al. |
| 5,785,531 A | 7/1998 | Leung |
| 5,800,178 A | 9/1998 | Gillio |
| 5,803,746 A | 9/1998 | Barrie et al. |
| 5,807,378 A | 9/1998 | Jensen et al. |
| 5,810,880 A | 9/1998 | Jensen et al. |
| 5,814,038 A | 9/1998 | Jensen et al. |
| 5,850,033 A | 12/1998 | Mirzeabasov et al. |
| 5,855,583 A | 1/1999 | Wang et al. |
| 5,873,732 A | 2/1999 | Hasson |
| 5,873,863 A | 2/1999 | Komlosi |
| 5,908,302 A | 6/1999 | Goldfarb |
| 5,947,743 A | 9/1999 | Hasson |
| 5,951,301 A | 9/1999 | Younker |
| 6,080,181 A | 6/2000 | Jensen et al. |
| 6,083,008 A | 7/2000 | Yamada et al. |
| 6,113,395 A | 9/2000 | Hon |
| 6,234,804 B1 | 5/2001 | Yong |
| 6,271,278 B1 | 8/2001 | Park et al. |
| 6,336,812 B1 | 1/2002 | Cooper et al. |
| 6,398,557 B1 | 6/2002 | Hoballah |
| 6,413,264 B1 | 7/2002 | Jensen et al. |
| 6,474,993 B1 | 11/2002 | Grund et al. |
| 6,485,308 B1 | 11/2002 | Goldstein |
| 6,488,507 B1 | 12/2002 | Stoloff et al. |
| 6,497,902 B1 | 12/2002 | Ma |
| 6,511,325 B1 | 1/2003 | Lalka et al. |
| 6,517,354 B1 | 2/2003 | Levy |
| 6,568,941 B1 | 5/2003 | Goldstein |
| 6,589,057 B1 | 7/2003 | Keenan et al. |
| 6,620,174 B2 | 9/2003 | Jensen et al. |
| 6,654,000 B2 | 11/2003 | Rosenberg |
| 6,659,776 B1 | 12/2003 | Aumann et al. |
| 6,773,263 B2 | 8/2004 | Nicholls et al. |
| 6,780,016 B1 | 8/2004 | Toly |
| 6,817,973 B2 | 11/2004 | Merril et al. |
| 6,820,025 B2 | 11/2004 | Bachmann et al. |
| 6,854,976 B1 | 2/2005 | Suhr |
| 6,857,878 B1 | 2/2005 | Chosack et al. |
| 6,863,536 B1 | 3/2005 | Fisher et al. |
| 6,866,514 B2 | 3/2005 | Von Roeschlaub et al. |
| 6,887,082 B2 | 5/2005 | Shun |
| 6,929,481 B1 | 8/2005 | Alexander et al. |
| 6,939,138 B2 | 9/2005 | Chosack et al. |
| 6,950,025 B1 | 9/2005 | Nguyen |
| 6,960,617 B2 | 11/2005 | Omidian et al. |
| 6,997,719 B2 | 2/2006 | Wellman et al. |
| 7,008,232 B2 | 3/2006 | Brassel |
| 7,018,327 B1 | 3/2006 | Conti |
| 7,025,064 B2 | 4/2006 | Wang et al. |
| 7,056,123 B2 | 6/2006 | Gregorio et al. |
| 7,080,984 B1 | 7/2006 | Cohen |
| 7,118,582 B1 | 10/2006 | Wang et al. |
| 7,255,565 B2 | 8/2007 | Keegan |
| 7,269,532 B2 | 9/2007 | David et al. |
| 7,272,766 B2 | 9/2007 | Sakezles |
| 7,300,450 B2 | 11/2007 | Vleugels et al. |
| 7,364,582 B2 | 4/2008 | Lee |
| 7,404,716 B2 | 7/2008 | Gregorio et al. |
| 7,419,376 B2 | 9/2008 | Sarvazyan et al. |
| 7,427,199 B2 | 9/2008 | Sakezles |
| 7,431,189 B2 | 10/2008 | Shelton, IV et al. |
| 7,441,684 B2 | 10/2008 | Shelton, IV et al. |
| 7,465,168 B2 | 12/2008 | Allen et al. |
| 7,467,075 B2 | 12/2008 | Humphries et al. |
| 7,544,062 B1 | 6/2009 | Hauschild et al. |
| 7,549,866 B2 | 6/2009 | Cohen et al. |
| 7,553,159 B1 | 6/2009 | Arnal et al. |
| 7,575,434 B2 | 8/2009 | Palakodeti |
| 7,594,815 B2 | 9/2009 | Toly |
| 7,621,749 B2 | 11/2009 | Munday |
| 7,646,901 B2 | 1/2010 | Murphy et al. |
| 7,648,367 B1 | 1/2010 | Makower et al. |
| 7,648,513 B2 | 1/2010 | Green et al. |
| 7,651,332 B2 | 1/2010 | Dupuis et al. |
| 7,677,897 B2 | 3/2010 | Sakezles |
| 7,775,916 B1 | 8/2010 | Mahoney |
| 7,780,451 B2 | 8/2010 | Willobee et al. |
| 7,802,990 B2 | 9/2010 | Korndorffer et al. |
| 7,803,151 B2 | 9/2010 | Whitman |
| 7,806,696 B2 | 10/2010 | Alexander et al. |
| 7,819,799 B2 | 10/2010 | Merril et al. |
| 7,833,018 B2 | 11/2010 | Alexander et al. |

(56) References Cited

U.S. PATENT DOCUMENTS

| | | |
|---|---|---|
| 7,837,473 B2 | 11/2010 | Koh |
| 7,850,454 B2 | 12/2010 | Toly |
| 7,850,456 B2 | 12/2010 | Chosack et al. |
| 7,854,612 B2 | 12/2010 | Frassica et al. |
| 7,857,626 B2 | 12/2010 | Toly |
| 7,866,983 B2 | 1/2011 | Hemphill et al. |
| 7,931,470 B2 | 4/2011 | Alexander et al. |
| 7,931,471 B2 | 4/2011 | Senagore et al. |
| 7,988,992 B2 | 8/2011 | Omidian et al. |
| 7,993,140 B2 | 8/2011 | Sakezles |
| 7,997,903 B2 | 8/2011 | Hasson et al. |
| 8,007,281 B2 | 8/2011 | Toly |
| 8,007,282 B2 | 8/2011 | Gregorio et al. |
| 8,016,818 B2 | 9/2011 | Ellis et al. |
| 8,017,107 B2 | 9/2011 | Thomas et al. |
| 8,021,162 B2 | 9/2011 | Sui |
| 8,048,088 B2 | 11/2011 | Green et al. |
| 8,083,691 B2 | 12/2011 | Goldenberg et al. |
| 8,116,847 B2 | 2/2012 | Gattani et al. |
| 8,137,110 B2 | 3/2012 | Sakezles |
| 8,157,145 B2 | 4/2012 | Shelton, IV et al. |
| 8,197,464 B2 | 6/2012 | Krever et al. |
| 8,205,779 B2 | 6/2012 | Ma et al. |
| 8,221,129 B2 | 7/2012 | Parry et al. |
| 8,297,982 B2 | 10/2012 | Park et al. |
| 8,308,817 B2 | 11/2012 | Egilsson et al. |
| 8,323,028 B2 | 12/2012 | Matanhelia |
| 8,323,029 B2 | 12/2012 | Toly |
| 8,328,560 B2 | 12/2012 | Niblock et al. |
| 8,342,851 B1 | 1/2013 | Speeg et al. |
| 8,403,674 B2 | 3/2013 | Feygin et al. |
| 8,403,675 B2 | 3/2013 | Stoianovici et al. |
| 8,403,676 B2 | 3/2013 | Frassica et al. |
| 8,408,920 B2 | 4/2013 | Speller |
| 8,425,234 B2 | 4/2013 | Sakezles |
| 8,439,687 B1 | 5/2013 | Morriss et al. |
| 8,442,621 B2 | 5/2013 | Gorek et al. |
| 8,454,368 B2 | 6/2013 | Ault et al. |
| 8,459,094 B2 | 6/2013 | Yanni |
| 8,459,520 B2 | 6/2013 | Giordano et al. |
| 8,460,002 B2 | 6/2013 | Wang et al. |
| 8,465,771 B2 | 6/2013 | Wan et al. |
| 8,469,715 B2 | 6/2013 | Ambrozio |
| 8,469,716 B2 | 6/2013 | Fedotov et al. |
| 8,480,407 B2 | 7/2013 | Campbell et al. |
| 8,480,408 B2 | 7/2013 | Ishii et al. |
| 8,491,309 B2 | 7/2013 | Parry et al. |
| 8,500,753 B2 | 8/2013 | Green et al. |
| 8,512,044 B2 | 8/2013 | Sakezles |
| 8,517,243 B2 | 8/2013 | Giordano et al. |
| 8,521,252 B2 | 8/2013 | Diez |
| 8,535,062 B2 | 9/2013 | Nguyen |
| 8,544,711 B2 | 10/2013 | Ma et al. |
| 8,556,635 B2 | 10/2013 | Toly |
| 8,608,483 B2 | 12/2013 | Trotta et al. |
| 8,613,621 B2 | 12/2013 | Henderickson et al. |
| 8,636,520 B2 | 1/2014 | Iwasaki et al. |
| D699,297 S | 2/2014 | Bahsoun et al. |
| 8,641,423 B2 | 2/2014 | Gumkowski |
| 8,647,125 B2 | 2/2014 | Johns et al. |
| 8,678,831 B2 | 3/2014 | Trotta et al. |
| 8,679,279 B2 | 3/2014 | Thompson et al. |
| 8,696,363 B2 | 4/2014 | Gray et al. |
| 8,708,213 B2 | 4/2014 | Shelton, IV et al. |
| 8,708,707 B2 | 4/2014 | Hendrickson et al. |
| 8,764,449 B2 | 7/2014 | Rios et al. |
| 8,764,452 B2 | 7/2014 | Pravong et al. |
| 8,800,839 B2 | 8/2014 | Beetel |
| 8,801,437 B2 | 8/2014 | Mousques |
| 8,801,438 B2 | 8/2014 | Sakezles |
| 8,807,414 B2 | 8/2014 | Ross et al. |
| 8,808,004 B2 | 8/2014 | Misawa et al. |
| 8,808,311 B2 | 8/2014 | Heinrich et al. |
| 8,814,573 B2 | 8/2014 | Nguyen |
| 8,827,988 B2 | 9/2014 | Belson et al. |
| 8,840,628 B2 | 9/2014 | Green et al. |
| 8,870,576 B2 | 10/2014 | Millon et al. |
| 8,888,498 B2 | 11/2014 | Bisaillon et al. |
| 8,893,946 B2 | 11/2014 | Boudreaux et al. |
| 8,911,238 B2 | 12/2014 | Forsythe |
| 8,915,742 B2 | 12/2014 | Hendrickson et al. |
| 8,945,095 B2 | 2/2015 | Blumenkranz et al. |
| 8,961,190 B2 | 2/2015 | Hart et al. |
| 8,966,954 B2 | 3/2015 | Ni et al. |
| 8,968,003 B2 | 3/2015 | Hendrickson et al. |
| 9,008,989 B2 | 4/2015 | Wilson et al. |
| 9,017,080 B1 | 4/2015 | Placik |
| 9,026,247 B2 | 5/2015 | White |
| 9,050,201 B2 | 6/2015 | Egilsson et al. |
| 9,056,126 B2 | 6/2015 | Hersel et al. |
| 9,070,306 B2 | 6/2015 | Rappel et al. |
| 9,087,458 B2 | 7/2015 | Shim et al. |
| 9,096,744 B2 | 8/2015 | Wan et al. |
| 9,117,377 B2 | 8/2015 | Shim et al. |
| 9,119,572 B2 | 9/2015 | Gorek et al. |
| 9,123,261 B2 | 9/2015 | Lowe |
| 9,129,054 B2 | 9/2015 | Nawana et al. |
| 9,196,176 B2 | 11/2015 | Hager et al. |
| 9,226,799 B2 | 1/2016 | Lightcap et al. |
| 9,257,055 B2 | 2/2016 | Endo et al. |
| 9,265,587 B2 | 2/2016 | Vancamberg et al. |
| 9,295,468 B2 | 3/2016 | Heinrich et al. |
| 9,336,694 B2 | 5/2016 | Shim et al. |
| 9,351,714 B2 | 5/2016 | Ross et al. |
| 9,358,682 B2 | 6/2016 | Ruiz Morales |
| 9,364,224 B2 | 6/2016 | Nicholas et al. |
| 9,364,279 B2 | 6/2016 | Houser et al. |
| 9,370,361 B2 | 6/2016 | Viola et al. |
| 9,373,270 B2 | 6/2016 | Miyazaki |
| 9,387,276 B2 | 7/2016 | Sun et al. |
| 9,427,496 B2 | 8/2016 | Sun et al. |
| 9,439,649 B2 | 9/2016 | Shelton, IV et al. |
| 9,439,733 B2 | 9/2016 | Ha et al. |
| 9,449,532 B2 | 9/2016 | Black et al. |
| 9,468,438 B2 | 10/2016 | Baber et al. |
| 2001/0019818 A1 | 9/2001 | Yong |
| 2002/0168619 A1 | 11/2002 | Provenza |
| 2003/0031993 A1 | 2/2003 | Pugh |
| 2003/0091967 A1 | 5/2003 | Chosack et al. |
| 2003/0176770 A1 | 9/2003 | Merril et al. |
| 2004/0005423 A1 | 1/2004 | Dalton et al. |
| 2004/0126746 A1 | 7/2004 | Toly |
| 2004/0248072 A1 | 12/2004 | Gray et al. |
| 2005/0008997 A1 | 1/2005 | Herman |
| 2005/0026125 A1 | 2/2005 | Toly |
| 2005/0064378 A1 | 3/2005 | Toly |
| 2005/0084833 A1 | 4/2005 | Lacey et al. |
| 2005/0131390 A1 | 6/2005 | Heinrich et al. |
| 2005/0142525 A1 | 6/2005 | Cotin et al. |
| 2005/0192595 A1 | 9/2005 | Green et al. |
| 2005/0196739 A1 | 9/2005 | Moriyama |
| 2005/0196740 A1 | 9/2005 | Moriyama |
| 2005/0214727 A1 | 9/2005 | Stoianovici et al. |
| 2006/0046235 A1 | 3/2006 | Alexander et al. |
| 2006/0252019 A1 | 11/2006 | Burkitt et al. |
| 2006/0275741 A1 | 12/2006 | Chewning et al. |
| 2007/0074584 A1 | 4/2007 | Talarico et al. |
| 2007/0077544 A1 | 4/2007 | Lemperle et al. |
| 2007/0078484 A1 | 4/2007 | Talarico et al. |
| 2007/0148626 A1 | 6/2007 | Ikeda |
| 2007/0166682 A1 | 7/2007 | Yarin et al. |
| 2007/0197895 A1 | 8/2007 | Nycz et al. |
| 2007/0225734 A1 | 9/2007 | Bell et al. |
| 2007/0275359 A1 | 11/2007 | Rotnes et al. |
| 2008/0032272 A1 | 2/2008 | Palakodeti |
| 2008/0032273 A1 | 2/2008 | Macnamara et al. |
| 2008/0052034 A1 | 2/2008 | David et al. |
| 2008/0064017 A1 | 3/2008 | Grundmeyer, III |
| 2008/0076101 A1 | 3/2008 | Hyde et al. |
| 2008/0097501 A1 | 4/2008 | Blier |
| 2008/0108869 A1 | 5/2008 | Sanders et al. |
| 2008/0187895 A1 | 8/2008 | Sakezles |
| 2008/0188948 A1 | 8/2008 | Flatt |
| 2008/0299529 A1 | 12/2008 | Schaller |

(56) References Cited

U.S. PATENT DOCUMENTS

| | | | |
|---|---|---|---|
| 2008/0317818 A1 | 12/2008 | Griffith et al. | |
| 2009/0068627 A1 | 3/2009 | Toly | |
| 2009/0069122 A1* | 3/2009 | Laliberty | A63B 41/08 |
| | | | 473/415 |
| 2009/0142739 A1 | 6/2009 | Wang et al. | |
| 2009/0142741 A1 | 6/2009 | Ault et al. | |
| 2009/0143642 A1 | 6/2009 | Takahashi et al. | |
| 2009/0176196 A1 | 7/2009 | Niblock et al. | |
| 2009/0187079 A1 | 7/2009 | Albrecht et al. | |
| 2009/0246747 A1 | 10/2009 | Buckman, Jr. | |
| 2009/0298034 A1 | 12/2009 | Parry et al. | |
| 2009/0314550 A1 | 12/2009 | Layton | |
| 2010/0047752 A1 | 2/2010 | Chan et al. | |
| 2010/0094312 A1 | 4/2010 | Ruiz Morales et al. | |
| 2010/0099067 A1 | 4/2010 | Agro | |
| 2010/0167248 A1 | 7/2010 | Ryan | |
| 2010/0167249 A1 | 7/2010 | Ryan | |
| 2010/0167250 A1 | 7/2010 | Ryan et al. | |
| 2010/0167253 A1 | 7/2010 | Ryan et al. | |
| 2010/0167254 A1 | 7/2010 | Nguyen | |
| 2010/0196867 A1 | 8/2010 | Geerligs et al. | |
| 2010/0204713 A1 | 8/2010 | Ruiz Morales | |
| 2010/0209899 A1 | 8/2010 | Park et al. | |
| 2010/0248200 A1 | 9/2010 | Ladak | |
| 2010/0258611 A1 | 10/2010 | Smith et al. | |
| 2010/0273136 A1 | 10/2010 | Kandasami et al. | |
| 2010/0279263 A1 | 11/2010 | Duryea | |
| 2010/0285094 A1 | 11/2010 | Gupta | |
| 2010/0324541 A1 | 12/2010 | Whitman | |
| 2011/0020779 A1 | 1/2011 | Hannaford et al. | |
| 2011/0046637 A1 | 2/2011 | Patel et al. | |
| 2011/0046659 A1 | 2/2011 | Ramstein et al. | |
| 2011/0087238 A1 | 4/2011 | Wang et al. | |
| 2011/0091855 A1 | 4/2011 | Miyazaki | |
| 2011/0137337 A1 | 6/2011 | van den Dool et al. | |
| 2011/0200976 A1 | 8/2011 | Hou et al. | |
| 2011/0207104 A1 | 8/2011 | Trotta | |
| 2011/0218550 A1 | 9/2011 | Ma | |
| 2011/0244436 A1 | 10/2011 | Campo | |
| 2011/0269109 A2 | 11/2011 | Miyazaki | |
| 2011/0281251 A1 | 11/2011 | Mousques | |
| 2011/0301620 A1 | 12/2011 | Di Betta et al. | |
| 2012/0003621 A1* | 1/2012 | Segall | G09B 23/32 |
| | | | 434/272 |
| 2012/0015337 A1 | 1/2012 | Hendrickson et al. | |
| 2012/0015339 A1 | 1/2012 | Hendrickson et al. | |
| 2012/0016362 A1 | 1/2012 | Heinrich et al. | |
| 2012/0028231 A1 | 2/2012 | Misawa et al. | |
| 2012/0034587 A1 | 2/2012 | Toly | |
| 2012/0045743 A1 | 2/2012 | Okano et al. | |
| 2012/0065632 A1 | 3/2012 | Shadduck | |
| 2012/0082970 A1 | 4/2012 | Pravong et al. | |
| 2012/0100217 A1 | 4/2012 | Green et al. | |
| 2012/0115117 A1 | 5/2012 | Marshall | |
| 2012/0115118 A1 | 5/2012 | Marshall | |
| 2012/0116391 A1 | 5/2012 | Houser et al. | |
| 2012/0148994 A1 | 6/2012 | Hori et al. | |
| 2012/0164616 A1 | 6/2012 | Endo et al. | |
| 2012/0165866 A1 | 6/2012 | Kaiser et al. | |
| 2012/0172873 A1 | 7/2012 | Artale et al. | |
| 2012/0179072 A1 | 7/2012 | Kegreiss | |
| 2012/0202179 A1* | 8/2012 | Fedotov | G09B 23/285 |
| | | | 434/267 |
| 2012/0202180 A1 | 8/2012 | Stock et al. | |
| 2012/0264096 A1 | 10/2012 | Taylor et al. | |
| 2012/0264097 A1 | 10/2012 | Newcott et al. | |
| 2012/0282583 A1 | 11/2012 | Thaler et al. | |
| 2012/0282584 A1 | 11/2012 | Millon et al. | |
| 2012/0283707 A1 | 11/2012 | Giordano et al. | |
| 2012/0288839 A1 | 11/2012 | Crabtree | |
| 2012/0308977 A1 | 12/2012 | Tortola | |
| 2013/0087597 A1 | 4/2013 | Shelton, IV et al. | |
| 2013/0101973 A1 | 4/2013 | Hoke et al. | |
| 2013/0105552 A1 | 5/2013 | Weir et al. | |
| 2013/0116668 A1 | 5/2013 | Shelton, IV et al. | |
| 2013/0157240 A1 | 6/2013 | Hart et al. | |
| 2013/0171288 A1 | 7/2013 | Harders | |
| 2013/0177890 A1 | 7/2013 | Sakezles | |
| 2013/0192741 A1 | 8/2013 | Trotta et al. | |
| 2013/0218166 A1 | 8/2013 | Elmore | |
| 2013/0224709 A1 | 8/2013 | Riojas et al. | |
| 2013/0225332 A1* | 8/2013 | Yeh | A63B 37/0043 |
| | | | 473/374 |
| 2013/0245681 A1 | 9/2013 | Straehnz et al. | |
| 2013/0253480 A1 | 9/2013 | Kimball et al. | |
| 2013/0267876 A1 | 10/2013 | Leckenby et al. | |
| 2013/0282038 A1 | 10/2013 | Dannaher et al. | |
| 2013/0288216 A1 | 10/2013 | Parry, Jr. et al. | |
| 2013/0302771 A1 | 11/2013 | Alderete | |
| 2013/0324991 A1 | 12/2013 | Clem et al. | |
| 2013/0324999 A1 | 12/2013 | Price et al. | |
| 2014/0011172 A1 | 1/2014 | Lowe | |
| 2014/0017651 A1 | 1/2014 | Sugimoto et al. | |
| 2014/0030682 A1 | 1/2014 | Thilenius | |
| 2014/0038151 A1 | 2/2014 | Hart | |
| 2014/0051049 A1 | 2/2014 | Jarc et al. | |
| 2014/0072941 A1 | 3/2014 | Hendrickson et al. | |
| 2014/0087345 A1 | 3/2014 | Breslin et al. | |
| 2014/0087346 A1 | 3/2014 | Breslin et al. | |
| 2014/0087347 A1 | 3/2014 | Tracy et al. | |
| 2014/0087348 A1 | 3/2014 | Tracy et al. | |
| 2014/0088413 A1 | 3/2014 | Von Bucsh et al. | |
| 2014/0093852 A1 | 4/2014 | Poulsen et al. | |
| 2014/0093854 A1 | 4/2014 | Poulsen et al. | |
| 2014/0099858 A1 | 4/2014 | Hernandez | |
| 2014/0106328 A1 | 4/2014 | Loor | |
| 2014/0107471 A1 | 4/2014 | Haider et al. | |
| 2014/0156002 A1 | 6/2014 | Thompson et al. | |
| 2014/0162016 A1 | 6/2014 | Matsui et al. | |
| 2014/0170623 A1 | 6/2014 | Jarstad et al. | |
| 2014/0186809 A1 | 7/2014 | Hendrickson et al. | |
| 2014/0187855 A1 | 7/2014 | Nagale et al. | |
| 2014/0200561 A1 | 7/2014 | Ingmanson et al. | |
| 2014/0212861 A1 | 7/2014 | Romano | |
| 2014/0220527 A1 | 8/2014 | Li et al. | |
| 2014/0220530 A1 | 8/2014 | Merkle et al. | |
| 2014/0220532 A1 | 8/2014 | Ghez et al. | |
| 2014/0242564 A1 | 8/2014 | Pravong et al. | |
| 2014/0246479 A1 | 9/2014 | Baber et al. | |
| 2014/0248596 A1 | 9/2014 | Hart et al. | |
| 2014/0263538 A1 | 9/2014 | Leimbach et al. | |
| 2014/0272878 A1 | 9/2014 | Shim et al. | |
| 2014/0272879 A1 | 9/2014 | Shim et al. | |
| 2014/0275795 A1 | 9/2014 | Little et al. | |
| 2014/0275981 A1 | 9/2014 | Selover et al. | |
| 2014/0277017 A1 | 9/2014 | Leimbach et al. | |
| 2014/0303643 A1 | 10/2014 | Ha et al. | |
| 2014/0303646 A1 | 10/2014 | Morgan et al. | |
| 2014/0303660 A1 | 10/2014 | Boyden et al. | |
| 2014/0308643 A1 | 10/2014 | Trotta et al. | |
| 2014/0342334 A1 | 11/2014 | Black et al. | |
| 2014/0349266 A1 | 11/2014 | Choi | |
| 2014/0350530 A1 | 11/2014 | Ross et al. | |
| 2014/0357977 A1 | 12/2014 | Zhou | |
| 2014/0370477 A1 | 12/2014 | Black et al. | |
| 2014/0371761 A1 | 12/2014 | Juanpera | |
| 2014/0378995 A1 | 12/2014 | Kumar et al. | |
| 2015/0031008 A1* | 1/2015 | Black | G09B 23/285 |
| | | | 434/272 |
| 2015/0037773 A1 | 2/2015 | Quirarte Catano | |
| 2015/0038613 A1 | 2/2015 | Sun et al. | |
| 2015/0076207 A1 | 3/2015 | Boudreaux et al. | |
| 2015/0086955 A1 | 3/2015 | Poniatowski et al. | |
| 2015/0132732 A1 | 5/2015 | Hart et al. | |
| 2015/0132733 A1 | 5/2015 | Garvik et al. | |
| 2015/0135832 A1 | 5/2015 | Blumenkranz et al. | |
| 2015/0148660 A1 | 5/2015 | Weiss et al. | |
| 2015/0164598 A1 | 6/2015 | Blumenkranz et al. | |
| 2015/0187229 A1 | 7/2015 | Wachli et al. | |
| 2015/0194075 A1 | 7/2015 | Rappel et al. | |
| 2015/0202299 A1 | 7/2015 | Burdick et al. | |
| 2015/0209035 A1 | 7/2015 | Zemlock | |
| 2015/0209059 A1 | 7/2015 | Trees et al. | |
| 2015/0209573 A1 | 7/2015 | Hibner et al. | |

(56) References Cited

U.S. PATENT DOCUMENTS

| | | |
|---|---|---|
| 2015/0228206 A1 | 8/2015 | Shim et al. |
| 2015/0262511 A1 | 9/2015 | Lin et al. |
| 2015/0265431 A1 | 9/2015 | Egilsson et al. |
| 2015/0272571 A1 | 10/2015 | Leimbach et al. |
| 2015/0272574 A1 | 10/2015 | Leimbach et al. |
| 2015/0272580 A1 | 10/2015 | Leimbach et al. |
| 2015/0272581 A1 | 10/2015 | Leimbach et al. |
| 2015/0272583 A1 | 10/2015 | Leimbach et al. |
| 2015/0272604 A1 | 10/2015 | Chowaniec et al. |
| 2015/0332609 A1 | 11/2015 | Alexander |
| 2015/0358426 A1 | 12/2015 | Kimball et al. |
| 2015/0371560 A1 | 12/2015 | Lowe |
| 2015/0374378 A1 | 12/2015 | Giordano et al. |
| 2015/0374449 A1 | 12/2015 | Chowaniec et al. |
| 2016/0000437 A1 | 1/2016 | Giordano et al. |
| 2016/0022374 A1 | 1/2016 | Haider et al. |
| 2016/0030240 A1 | 2/2016 | Gonenc et al. |
| 2016/0031091 A1 | 2/2016 | Popovic et al. |
| 2016/0058534 A1 | 3/2016 | Derwin et al. |
| 2016/0066909 A1 | 3/2016 | Baber et al. |
| 2016/0070436 A1 | 3/2016 | Thomas et al. |
| 2016/0073928 A1 | 3/2016 | Soper et al. |
| 2016/0074103 A1 | 3/2016 | Sartor |
| 2016/0098933 A1 | 4/2016 | Reiley et al. |
| 2016/0104394 A1 | 4/2016 | Miyazaki |
| 2016/0117956 A1 | 4/2016 | Larsson et al. |
| 2016/0125762 A1 | 5/2016 | Becker et al. |
| 2016/0133158 A1 | 5/2016 | Sui et al. |
| 2016/0140876 A1 | 5/2016 | Jabbour et al. |
| 2016/0194378 A1 | 7/2016 | Cass et al. |
| 2016/0199059 A1 | 7/2016 | Shelton, IV et al. |
| 2016/0220150 A1 | 8/2016 | Sharonov |
| 2016/0220314 A1 | 8/2016 | Huelman et al. |
| 2016/0225288 A1 | 8/2016 | East et al. |
| 2016/0232819 A1 | 8/2016 | Hofstetter et al. |
| 2016/0235494 A1 | 8/2016 | Shelton, IV et al. |
| 2016/0256187 A1 | 9/2016 | Shelton, IV et al. |
| 2016/0256229 A1 | 9/2016 | Morgan et al. |
| 2016/0262736 A1 | 9/2016 | Ross et al. |
| 2016/0262745 A1 | 9/2016 | Morgan et al. |
| 2016/0293055 A1 | 10/2016 | Hofstetter |
| 2016/0296144 A1 | 10/2016 | Gaddam et al. |
| 2017/0011659 A1* | 1/2017 | Watanabe ............... G09B 23/28 |
| 2017/0352295 A1* | 12/2017 | Belzacq .................. G09B 9/00 |

FOREIGN PATENT DOCUMENTS

| | | |
|---|---|---|
| CN | 2751372 Y | 1/2006 |
| CN | 2909427 Y | 6/2007 |
| CN | 101313842 A | 12/2008 |
| CN | 101528780 A | 9/2009 |
| CN | 201364679 Y | 12/2009 |
| CN | 201955979 U | 8/2011 |
| CN | 102458496 A | 5/2012 |
| CN | 202443680 U | 9/2012 |
| CN | 202563792 U | 11/2012 |
| CN | 202601055 U | 12/2012 |
| CN | 202694651 U | 1/2013 |
| CN | 103050040 A | 4/2013 |
| CN | 203013103 U | 6/2013 |
| CN | 203038549 U | 7/2013 |
| CN | 203338651 U | 12/2013 |
| CN | 203397593 U | 1/2014 |
| CN | 203562128 U | 4/2014 |
| CN | 102596275 B | 6/2014 |
| CN | 103845757 A | 6/2014 |
| CN | 103886797 A | 6/2014 |
| CN | 103396562 B | 7/2015 |
| CN | 105194740 A | 12/2015 |
| CN | 105504166 A | 4/2016 |
| DE | 9102218 U1 | 5/1991 |
| DE | 41 05 892 A1 | 8/1992 |
| DE | 44 14 832 A1 | 11/1995 |
| DE | 19716341 A1 | 9/2000 |
| EP | 1 024 173 A1 | 8/2000 |
| EP | 1 609 431 A1 | 12/2005 |
| EP | 2 068 295 A2 | 6/2009 |
| EP | 2 218 570 A1 | 8/2010 |
| FR | 2 691 826 A1 | 12/1993 |
| FR | 2 917 876 A1 | 12/2008 |
| GB | 2488994 A | 9/2012 |
| JP | 10 211160 A | 8/1998 |
| JP | 2001005378 A | 1/2001 |
| JP | 2006187566 A | 7/2006 |
| JP | 2009063787 A | 3/2009 |
| JP | 2009236963 A | 10/2009 |
| JP | 3162161 U | 8/2010 |
| JP | 2011113056 A | 6/2011 |
| JP | 2013127496 A | 6/2013 |
| KR | 101231565 B1 | 2/2013 |
| MX | PA 02004422 A | 11/2003 |
| PT | 106230 | 9/2013 |
| WO | WO 1994/06109 A1 | 3/1994 |
| WO | WO 1996/042076 A1 | 12/1996 |
| WO | WO 1998/58358 A1 | 12/1998 |
| WO | WO 1999/01074 A1 | 1/1999 |
| WO | WO 2000/36577 A1 | 6/2000 |
| WO | WO 2002/38039 A2 | 5/2002 |
| WO | WO 2002/038039 A3 | 5/2002 |
| WO | WO 2004/032095 A1 | 4/2004 |
| WO | WO 2004/082486 A1 | 9/2004 |
| WO | WO 2005/071639 A1 | 8/2005 |
| WO | WO 2005/083653 A1 | 9/2005 |
| WO | WO 2006/083963 A2 | 8/2006 |
| WO | WO 2007/068360 A1 | 6/2007 |
| WO | WO 2008/021720 A2 | 2/2008 |
| WO | WO 2008/103383 A1 | 8/2008 |
| WO | WO 2009/000939 A1 | 12/2008 |
| WO | WO 2009/089614 A1 | 7/2009 |
| WO | WO 2010/094730 A1 | 8/2010 |
| WO | WO 2011/035410 A1 | 3/2011 |
| WO | WO 2011/046606 A1 | 4/2011 |
| WO | WO 2011/127379 A2 | 10/2011 |
| WO | WO 2011/151304 A1 | 12/2011 |
| WO | WO 2012/149606 A1 | 11/2012 |
| WO | WO 2012/168287 A1 | 12/2012 |
| WO | WO 2012/175993 A1 | 12/2012 |
| WO | WO 2013/048978 A1 | 4/2013 |
| WO | WO 2013/103956 A1 | 7/2013 |
| WO | WO 2014/022815 A1 | 2/2014 |
| WO | WO 2014/093669 A1 | 6/2014 |
| WO | WO 2014/197793 A1 | 12/2014 |
| WO | WO 2015/148817 A1 | 10/2015 |
| WO | WO 2016/138528 A1 | 9/2016 |
| WO | WO 2016/183412 A1 | 11/2016 |
| WO | WO 2016/198238 A1 | 12/2016 |
| WO | WO 2016/201085 A1 | 12/2016 |
| WO | WO 2017/031214 A1 | 2/2017 |
| WO | WO 2017/042301 A1 | 3/2017 |

OTHER PUBLICATIONS

Society of Laparoendoscopic Surgeons, "Future Technology Session: The Edge of Innovation in Surgery, Space, and Business," http://www.laparoscopytoday.com/endourology/page/2/ , Figure 1B: http://laparoscopy.blogs.com/laparoscopy_today/images/6-1/6-1VlaovicPicB.jpg , Sep. 5-8, 2007, 10 pgs.

European Patent Office, International Search Report for International Application No. PCT/US2011/053859 A3, mailed on Apr. 5, 2012, entitled "Portable Laparoscopic Trainer," 8 pgs.

European Patent Office, The International Search Report and Written Opinion for International Application No. PCT/US2012/60997, entitled "Simulated Tissue Structure for Surgical Training," mailed Mar. 7, 2013, 8 pgs.

European Patent Office, The International Search Report and Written Opinion for International Application No. PCT/US2012/070971, entitled "Advanced Surgical Simulation," mailed Mar. 18, 2013, 10 pgs.

Human Patient Simulator, Medical Education Technologies, Inc., http://www.meti.com (1999) all, printed Apr. 12, 2013, 24 pgs.

(56) References Cited

OTHER PUBLICATIONS

The International Bureau of WIPO, International Preliminary Report on Patentability and Written Opinion for International Application No. PCT/US2011/053859, entitled "Portable Laparoscopic Trainer," dated Apr. 2, 2013, 9 pgs.
European Patent Office, The International Search Report and Written Opinion for International Application No. PCT/US2013/062363, entitled "Surgical Training Model for Laparoscopic Procedures," mailed Jan. 22, 2014, 11 pgs.
European Patent Office, The International Search Report and Written Opinion for International Application No. PCT/US2013/061949, entitled "Surgical Training Model for Laparoscopic Procedures," mailed Feb. 17, 2014, 7 pgs.
Anonymous: Realsim Systems—LTS2000, Sep. 4, 2005, pp. 1-2, XP055096193,Retrieved from the Internet: URL:https://web.archive.org/web/2005090403;3030/http://www.realsimsystems.com/exersizes.htm (retrieved on Jan. 14, 2014).
European Patent Office, The International Search Report and Written Opinion for International Application No. PCT/US2013/062269, entitled "Surgical Training Model for Transluminal Procedures," mailed Feb. 17, 2014, 8 pgs.
European Patent Office, The International Search Report and Written Opinion for International Application No. PCT/US2013/061557, entitled "Surgical Training Model for Laparoscopic Procedures," mailed Feb. 10, 2014, 9 pgs.
European Patent Office, The International Search Report and Written Opinion for International Application No. PCT/US2013/061728, entitled "Surgical Training Model for Laparoscopic Procedures," mailed Oct. 18, 2013, 9 pgs.
Limps and Things, EP Guildford MATTU Hernia Trainer, http://limbsandthings.com/us/products/tep-guildford-mattu-hernia-trainer/, printed May 29, 2014, 11 pgs.
Simulab, Hernia Model, http://www.simulab.com/product/surgery/open/hernia model, printed printed May 29, 2014, 4 pgs.
McGill Laparoscopic Inguinal Hernia Simulator, Novel Low-Cost Simulator for Laparoscopic Inguinal Hernia Repair, Feb. 8, 2011, 1 pg.
University of Wisconsin-Madison Biomedical Engineering, Inguinal Hernia Model, http://bmedesign.engr.wisc.edu/projects/s10/hernia_model/, printed May 29, 2014, 62 pgs.
The International Bureau of WIPO, International Preliminary Report on Patentability for International Application No. PCT/US2012/070971, entitled "Advanced Surgical Simulation," dated Jun. 24, 2014, 7 pgs.
European Patent Office, The International Search Report and Written Opinion of the International Searching Authority for International Application No. PCT/US2014/038195, entitled "Hernia Model", mailed Oct. 15, 2014, 20 pgs.
European Patent Office, The International Search Report and Written Opinion of the International Searching Authority for International Application No. PCT/US2014/048027, entitled "First Entry Model", mailed Oct. 17, 2014, 10 pgs.
The International Bureau of WIPO, International Preliminary Report on Patentability for International Application No. PCT/US2012/060997, entitled "Simulated Tissue Structure for Surgical Training" dated Apr. 22, 2014, 6 pgs.
European Patent Office, The International Search Report and Written Opinion for International Application No. PCT/US2014/019840, entitled "Advanced Surgical Simulation Constructions and Methods," mailed Jul. 4, 2014, 8 pgs.
Kurashima, et al., "A tool for training and evaluation of Laparoscopic inguinal hernia repair; the Global Operative Assessment of Laparoscopic Skills-Groin Hernia" American Journal of Surgery, Paul Hoeber, New York, NY, US vol. 201, No. 1, Jan. 1, 2011, pp. 54-61 XP027558745.
European Patent Office, The International Search Report and Written Opinion for International Application No. PCT/US2014/042998, entitled "Gallbladder Model," mailed Jan. 7, 2015, 20 pgs.
The International Bureau of WIPO, International Preliminary Report on Patentability, for PCT application No. PCT/US2013/053497, entitled Simulated Stapling and Energy Based Ligation for Surgical Training, mailed Feb. 12, 2015, 6 pgs.
The International Bureau of WIPO, International Preliminary Report on Patentability for International Application No. PCT/US2013/062363, entitled "Surgical Training Model for Laparoscopic Procedures," mailed Apr. 9, 2015, 9 pgs.
The International Bureau of WIPO, International Preliminary Report on Patentability for International Application No. PCT/US2013/062269, entitled "Surgical Training Model for Laparoscopic Procedures," mailed Apr. 9, 2015, 6 pgs.
The International Bureau of WIPO, International Preliminary Report on Patentability for International Application No. PCT/US2013/061557, entitled "Surgical Training Model for Laparoscopic Procedures," mailed Apr. 9, 2015, 6 pgs.
The International Bureau of WIPO, International Preliminary Report on Patentability for International Application No. PCT/US2013/061728, entitled "Surgical Training Model for Laparoscopic Procedures," mailed Apr. 9, 2015, 7 pgs.
The International Bureau of WIPO, International Preliminary Report on Patentability for International Application No. PCT/US2013/061949, entitled "Surgical Training Model for Laparoscopic Procedures," mailed Apr. 9, 2015, 6 pgs.
The International Bureau of WIPO, International Preliminary Report on Patentability for International Application No. PCT/US2014/019840, entitled "Simulated Tissue Structure for Surgical Training," dated Sep. 11, 2015, 8 pgs.
European Patent Office, The International Search Report and Written Opinion for International Application No. PCT/US2015/020574, entitled "Advanced First Entry Model for Surgical Simulation," mailed Jun. 1, 2015, 12 pgs.
European Patent Office, The International Search Report and Written Opinion for International Application No. PCT/US2015/022774, entitled "Simulated Dissectible Tissue," mailed Jun. 11, 2015, 13 pgs.
Anonymous: Silicone rubber-from Wikipedia, the free encyclopedia, pp. 1-6, XP055192375, Retrieved from the Internet: URL:http://en.wikipedia.org/w.index.php?title=Silicone_rubber&oldid=596456058 (retrieved on May 29, 2015).
Lamouche, et al., "Review of tissue simulating phantoms with controllable optical, mechanical and structural properties for use in optical coherence tomography," Biomedical Optics Express, Jun. 1, 2012, 18 pgs., vol. 3, No. 6.
The International Bureau of WIPO, International Preliminary Report on Patentability for International Application No. PCT/US2014/038195, entitled "Hernia Model," mailed Nov. 26, 2015, 16 pgs.
The International Bureau of WIPO, International Preliminary Report on Patentability for International Application No. PCT/US2014/042998, entitled "Gallbladder Model," dated Dec. 30, 2015, 15 pgs.
European Patent Office, International Search Report and Written Opinion for International Application No. PCT/US2013/053497, titled "Simulated Stapling and Energy Based Ligation for Surgical Training," dated Nov. 5, 2013, 8 pgs.
The International Bureau of WIPO, International Preliminary Report on Patentability for International Application No. PCT/US2014/048027, entitled "First Entry Model," dated Feb. 4, 2016, 8 pgs.
European Patent Office, International Search Report and Written Opinion for International Application No. PCT/US2015/059668, entitled "Simulated Tissue Models and Methods," dated Apr. 26, 2016, 20 pgs.
Australian Patent Office, Patent Examination Report No. 1 for Australian Application No. 2012358851, titled "Advanced Surgical Simulation," dated May 26, 2016, 3 pgs.
Miyazaki Enterprises, "Miya Model Pelvic Surgery Training Model and Video," www.miyazakienterprises, printed Jul. 1, 2016, 1 pg.
European Patent Office, International Search Report and Written Opinion for International Application No. PCT/US2016/032292, entitled "Synthetic Tissue Structures for Electrosurgical Training and Simulation," dated Jul. 14, 2016, 11 pgs.
European Patent Office, International Search Report and Written Opinion for International Application No. PCT/US2016/018697, entitled "Simulated Tissue Structures and Methods," dated Jul. 14, 2016, 21 pgs.

(56) References Cited

OTHER PUBLICATIONS

European Patent Office, International Search Report and Written Opinion for International Application No. PCT/US2016/034591, entitled "Surgical Training Model for Laparoscopic Procedures," dated Aug. 8, 2016, 18 pgs.
European Patent Office, The International Search Report and Written Opinion of the International Searching Authority for International Application No. PCT/US2016/036664, entitled "Hysterectomy Model", mailed Aug. 19, 2016, 15 pgs.
The International Bureau of WIPO, International Preliminary Report on Patentability for International Application No. PCT/US2015/020574, entitled "Advanced First Entry Model for Surgical Simulation," dated Sep. 22, 2016, 9 pgs.
European Patent Office, The International Search Report and Written Opinion of the International Searching Authority for International Application No. PCT/US2016/0043277 titled "Appendectomy Model", mailed Oct. 4, 2016, 12 pgs.
The International Bureau of WIPO, International Preliminary Report on Patentability for International Application No. PCT/US2015/022774, titled "Simulated Dissectible Tissue," dated Oct. 6, 2016, 9 pgs.
European Patent Office, The International Search Report and Written Opinion of the International Searching Authority for International Application No. PCT/US2016/041852 titled "Simulated Dissectible Tissue", mailed Oct. 13, 2016, 12 pgs.
European Patent Office, Invitation to Pay Additional Fees for International Application No. PCT/US2016/062669, titled "Simulated Dissectible Tissue", mailed Feb. 10, 2017, 8 pgs.
European Patent Office, The International Search Report and Written Opinion of the International Searching Authority for International Application No. PCT/US2016/055148 titled "Hysterectomy Model", mailed Feb. 28, 2017, 12 pgs.
European Patent Office, The International Search Report and Written Opinion of the International Searching Authority for International Application No. PCT/US2016/062669 titled "Simulated Dissectible Tissue", mailed Apr. 5, 2017, 19 pgs.
European Patent Office, Examination Report for European Application No. 14733949.3 titled "Gallbladder Model," mailed Dec. 21, 2016, 6 pgs.
European Patent Office, The International Search Report and Written Opinion of the International Searching Authority for International Application No. PCT/US2017/020389 titled "Simulated Tissue Cartridge", mailed May 24, 2017, 13 pgs.
The International Bureau of WIPO, International Preliminary Report on Patentability for International Application No. PCT/US2015/059668, entitled "Simulated Tissue Models and Methods," dated May 26, 2017, 16 pgs.
European Patent Office, The International Search Report and Written Opinion for International Application No. PCT/US2017/039113, entitled "Simulated Abdominal Wall," mailed Aug. 7, 2017, 13 pgs.
The International Bureau of WIPO, International Preliminary Report on Patentability for International Application No. PCT/US2016/018697, entitled "Simulated Tissue Structures and Methods," dated Aug. 31, 2017, 14 pgs.
The International Bureau of WIPO, International Preliminary Report on Patentability for International Application No. PCT/US2016/0032292, entitled "Synthetic Tissue Structures for Electrosurgical Training and Simulation," dated Nov. 23, 2017, 8 pgs.
The International Bureau of WIPO, International Preliminary Report on Patentability for International Application No. PCT/US2016/034591, entitled "Surgical Training Model for Laparoscopic Procedures," dated Dec. 7, 2017, 14 pgs.
The International Bureau of WIPO, International Preliminary Report on Patentability for International Application No. PCT/US2016/036664, entitled "Hysterectomy Model," dated Dec. 21, 2017, 10 pgs.
The International Bureau of WIPO, International Preliminary Report on Patentability for International Application No. PCT/US2016/041852, entitled "Simulated Dissectible Tissue," dated Jan. 25, 2018, 12 pgs.

European Patent Office, Extended European Search Report for European Patent Application No. EP 17202365.7, titled "Gallbladder Model", dated Jan. 31, 2018, 8 pgs.
The International Bureau of WIPO, International Preliminary Report on Patentability for International Application No. PCT/US2016/043277, entitled "Appendectomy Model," dated Feb. 1, 2018, 9 pgs.
The International Bureau of WIPO, International Preliminary Report on Patentability for International Application No. PCT/US2016/055148, entitled "Hysterectomy Model," dated Apr. 12, 2018, 12 pgs.
European Patent Office, The International Search Report and Written Opinion for International Application No. PCT/US2018/018895, entitled "Synthetic Tissue Structures for Electrosurgical Training and Simulation," mailed May 17, 2018, 12 pgs.
The International Bureau of WIPO, International Preliminary Report on Patentability for International Application No. PCT/US2016/062669, entitled "Simulated Dissectible Tissue," dated May 31, 2018, 11 pgs.
European Patent Office, The International Search Report and Written Opinion for International Application No. PCT/US2018/018036, entitled "Laparoscopic Training System," mailed Jun. 8, 2018, 13 pgs.
3D-MED Corporation, "Validated Training Course for Laparoscopic Skills", https://www.3-dmed.com/sites/default/files/product-additional/product-spec/Validated%20Training%20Course%20for%20Laparoscopic%20Skills.docx_3.pdf , printed Aug. 23, 2016, pp. 1-6.
3D-MED Corporation, "Loops and Wire #1," https://www.3-dmed.com/product/loops-and-wire-1 , printed Aug. 23, 2016, 4 pgs.
Barrier, et al., "A Novel and Inexpensive Vaginal Hysterectomy Simulatory, "Simulation in Healthcare: The Journal of the Society for Simulation in Healthcare, vol. 7, No. 6, Dec. 1, 2012, pp. 374-379.
European Patent Office, Extended European Search Report for European Patent Application No. EP 18177751.7, titled "Portable Laparoscopic Trainer," dated Jul. 13, 2018, 8 pgs.
European Patent Office, The International Search Report and Written Opinion for International Application No. PCT/US2018/034705, entitled "Laparoscopic Training System," mailed Aug. 20, 2018, 14 pgs.
The International Bureau of WIPO, International Preliminary Report on Patentability for International Application No. PCT/US2017/020389, entitled "Simulated Tissue Cartridge," dated Sep. 13, 2018, 8 pgs.
European Patent Office, Extended European Search Report for European Patent Application No. EP 18184147.9, titled "First Entry Model," dated Nov. 7, 2018, 7 pgs.
The International Bureau of WIPO, International Preliminary Report on Patentability for International Application No. PCT/US2017/039113, entitled "Simulated Abdominal Wall," dated Jan. 10, 2019, 8 pgs.
European Patent Office, Extended European Search Report for European Patent Application No. EP 18210006.5, titled "Surgical Training Model for Laparoscopic Procedures," dated Jan. 21, 2019, 7 pgs.
European Patent Office, Extended European Search Report for European Patent Application No. EP 18207214.0, titled "Synthetic Tissue Structures for Electrosurgical Training and Simulation," dated Mar. 28, 2019, 6 pgs.
European Patent Office, Extended European Search Report for European Patent Application No. EP 18216002.8, titled "Surgical Training Model for Laparoscopic Procedures," dated Feb. 4, 2019, 6 pgs.
European Patent Office, Extended European Search Report for European Patent Application No. EP 18216005.1, titled "Surgical Training Model for Laparoscopic Procedures," dated Feb. 4, 2019, 7 pgs.
European Patent Office, Extended European Search Report for European Patent Application No. EP 19159065.2, titled "Simulated Tissue Structures and Methods," dated May 29, 2019, 8 pgs.

(56) References Cited

OTHER PUBLICATIONS

The International Bureau of WIPO, International Preliminary Report on Patentability for International Application No. PCT/US2018/018036, entitled "Laparoscopic Training System," dated Aug. 29, 2019, 8 pgs.

The International Bureau of WIPO, International Preliminary Report on Patentability for International Application No. PCT/US2018/018895, entitled "Synthetic Tissue Structures for Electrosurgical Training and Simulation," dated Sep. 6, 2019, 7 pgs.

European Patent Office, Extended European Search Report for European Patent Application No. EP 20153338.7, titled "Advanced Surgical Simulation Constructions and Methods," dated Mar. 5, 2020, 7 pgs.

European Patent Office, Extended European Search Report for European Patent Application No. EP 19215545.5, titled "Advanced First Entry Model for Surgical Simulation," dated Mar. 26, 2020, 8 pgs.

European Patent Office, Extended European Search Report for European Patent Application No. EP 20158500.7, titled "Surgical Training Device," dated May 14, 2020, 9 pgs.

"Surgical Female Pelvic Trainer (SFPT) with Advanced Surgical Uterus," Limbs & Things Limited, Issue 1, Jul. 31, 2003, URL:https://www.accuratesolutions.it/wp-content/uploads/2012/08/Surgical_Female_Pelvic_Trainer_SFPT_with_Advanced_Uterus_User_Guide.pdf, retrieved Feb. 21, 2020, 2 pgs.

European Patent Office, Extended European Search Report for European Patent Application No. EP 20186713.2, titled "Simulated Dissectible Tissue," dated Nov. 10, 2020, 12 pgs.

European Patent Office, Partial Extended European Search Report for European Patent Application No. 23180886.6, titled "Simulated Dissectible Tissue," dated Sep. 20, 2023, 16 pgs.

European Patent Office, Extended European Search Report for European Patent Application No. 23200455.6, titled "Simulated Training Model for Laparoscopic Procedures," dated Dec. 4, 2023, 7 pgs.

European Patent Office, Extended European Search Report for European Patent Application No. 23180886.6, titled "Simulated Dissectible Tissue," dated Dec. 21, 2023, 14 pgs.

* cited by examiner

SIMULATED ABDOMINAL WALL

CROSS-REFERENCE TO RELATED APPLICATIONS

This patent application is a continuation of U.S. application Ser. No. 17/474,534 filed on Sep. 14, 2021 entitled "Simulated abdominal wall" which is a continuation of U.S. application Ser. No. 16/018,361 filed on Jun. 26, 2018, now issued U.S. Pat. No. 11,120,708 entitled "Simulated abdominal wall" which is a continuation of International Patent Application No. PCT/US2017/039113 entitled "Simulated abdominal wall" filed on Jun. 23, 2017 which claims priority to and benefit of U.S. Provisional Patent Application Ser. No. 62/355,170 entitled "Simulated abdominal wall" filed on Jun. 27, 2016 all incorporated herein by reference in their entirety.

FIELD OF THE INVENTION

The present invention relates to the field of surgical training and simulation and more specifically, to a simulated abdominal wall for training laparoscopic surgical skills.

BACKGROUND OF THE INVENTION

Minimally invasive surgical techniques such as laparoscopic surgery can greatly improve patient outcomes because of reduced trauma to the body. There is, however, a steep learning curve associated with minimally invasive surgery. Accordingly, laparoscopic simulators, also known as trainers, have been developed to facilitate training surgeons on these challenging techniques. Trainers generally consist of an enclosure and some type of barrier blocking direct observation of the interior of the enclosure where simulated organs or training platforms are located. In some cases, the barrier is configured to be pierced by surgical instruments in order to gain access to the interior in order to observe and perform mock procedures and exercises.

The barrier serves to simulate an abdominal wall. In some cases, apertures may be pre-formed in the barrier to provide the simplest form of laparoscopic trainer. Laparoscopic instruments including scopes are passed through the apertures, and a live feed of the interior of the enclosure is captured via a camera and viewed on an adjacent video monitor. The surgeon observes the procedure on the video monitor during the operation. While much skill can be gained using simple trainers, efforts are being made to increase the fidelity of surgical simulation. More advanced laparoscopy simulators use different materials to mimic the softness and pliability of the human abdominal wall. Previous versions have used layers of different types of flat foam sheets to simulate the look and feel of the different types of tissue present in the human abdominal wall. These sheets generally remain flat or are curved only in one direction while simulating an abdominal wall.

A simulated abdominal wall must be strong enough to withstand the same or similar forces encountered in real surgery including forces from penetration of the simulated abdominal wall with a surgical trocar. In order to withstand such forces, the abdominal wall is generally a smaller sized insert in a larger and rigid representation of the abdomen. A small simulated abdominal wall and a larger one require some type of support structure to prevent its collapse during use. Care must be given in selecting the type of support structure so as to not detract from the overall look and feel of the simulated abdominal wall, and to not interfere with practice procedures especially during trocar placement.

Generally, a simulated abdominal wall that is configured to be penetrable by a surgical trocar is flat or curved only in one direction. While easy to manufacture, these designs present an aesthetic shortcoming which greatly detracts from the realism of the simulation. Furthermore, in real laparoscopic procedures the interior of the abdomen is insufflated with gas and the patient's abdominal wall bows outwardly to have a convex surface that curves in multiple directions. While simulators do not use insufflation gas, it is desirable to represent the same curvature and working space created by insufflation. A simulated abdominal wall with a realistic curvature and also with anatomical landmarks such as ribs or cartilage greatly aids the trainee in learning proper port placement. Proper port placement allows safe access to the abdominal cavity, and adequate triangulation for accessing the key internal anatomical structures throughout a surgical procedure. The present invention presents a simulated abdominal wall suitable for laparoscopic trainers that provides a more lifelike simulation and is large enough to provide the user with a larger range of port placement. The present invention further presents methods to create a layered foam abdominal wall that is strong and does not require additional support structures to maintain its shape even during port placement. The simulated abdominal wall of the present invention also includes anatomical landmarks and has the visual appeal of a truly convex surface of an insufflated abdomen.

SUMMARY OF THE INVENTION

According to one aspect of the invention, a simulated abdominal wall that has a convex shape mimicking the visual appearance of an insufflated human abdomen and requires no internal support structures to maintain the shape is provided. The simulated abdominal wall includes a multiple of laminated layers of foam connected together with adhesive. The multiple layers increases the overall rigidity of the structure which springs back to its original shape after being deformed and retains enough rigidity to allow realistic puncture by trocars. An outer skin layer comprising a silicone layer mechanically bonded to foam layer is also part of the layered structure. Methods of manufacturing and integrating the simulated abdominal wall with a laparoscopic trainer are also provided.

According to another aspect of the invention, a simulated abdominal wall is provided. The simulated abdominal wall is configured to permit the user to penetrate the simulated abdominal wall with a trocar anywhere through its surface without interference from unrealistic underlying and/or traversing support structures used for maintaining a bowed shape. The construction provides a realistic feel and is supported only around its perimeter without other support structures.

According to another aspect of the invention, a method for making a simulated abdominal wall is provided. The method includes providing a planar first layer of the simulated abdominal wall. A first three-dimensional domed shape is projected onto a planar two-dimensional surface of the first layer to create a first projection. The first projection is cut out of the first layer to create a first cutout having a first perimeter. A mold having a mold cavity is provided. The cavity has a cavity surface that is sized and configured to receive the first cutout. The first cutout is placed inside the mold cavity. Portions of the first perimeter are brought into juxtaposition to form the first domed shape in a loose fashion wherein the first domed shape has seams defined along the joined portions of the first perimeter. The first domed shape has an inner surface and an outer surface. A planar second layer of the simulated abdominal wall is provided. A second domed shape is projected onto a planar surface of the second layer to create a second projection. The second projection is cut from the second layer to create a second cutout having a second perimeter. The second cutout is placed inside the mold cavity. Portions of the second perimeter are brought into juxtaposition to form the second domed shape wherein the second domed shape has seams defined along the joined portions of the second perimeter. The second domed shape has an inner surface and an outer surface. The second domed shape is slightly smaller and placed inside the first domed shape such that the inner surface of the first domed shape faces the outer surface of the second domed shape.

According to another aspect of the invention, a method for making a simulated abdominal wall is provided. The method includes providing a mold having hemispherical-like cavity. A plurality of planar cutouts of domed projections is also provided. Each cutout is assembled into a dome having seams and nested consecutively inside each other inside the cavity. Adjacent cutouts are adhered to create a unitary simulated abdominal wall made of a plurality of layers and having a dome-like shape.

According to another aspect of the invention, a method for making a simulated abdominal wall is provided. The method includes providing a vacuum mold having a mold cavity formed by a main body of the mold. The main body of the mold defines a wall having an inner surface and an outer surface with a plurality of air holes extending across the wall in the location of the mold cavity. At least one flat foam sheet is provided and placed to cover the cavity. A pressure differential is applied across the wall through the air holes of the main body. Heat is also applied to the flat foam sheet. The flat foam sheet is deformed into a deformed layer having a deformed shape as a result of applying heat to soften the foam and the vacuum pulling the softened foam into the mold. The deformed shape substantially corresponds to the shape of the mold cavity or previous layer or layers.

According to another aspect of the invention, a surgical training system is provided. The surgical training system includes a base and a top cover connected to and spaced apart from the base to define an internal cavity. The top cover includes an opening and a frame connected to the top cover in the location of the opening. A penetrable simulated abdominal wall is connected to the frame and covers at least part of the opening. The simulated abdominal wall is dome-shaped having a convex surface and a concave surface facing the cavity.

DETAILED DESCRIPTION OF THE INVENTION

Figure 1:
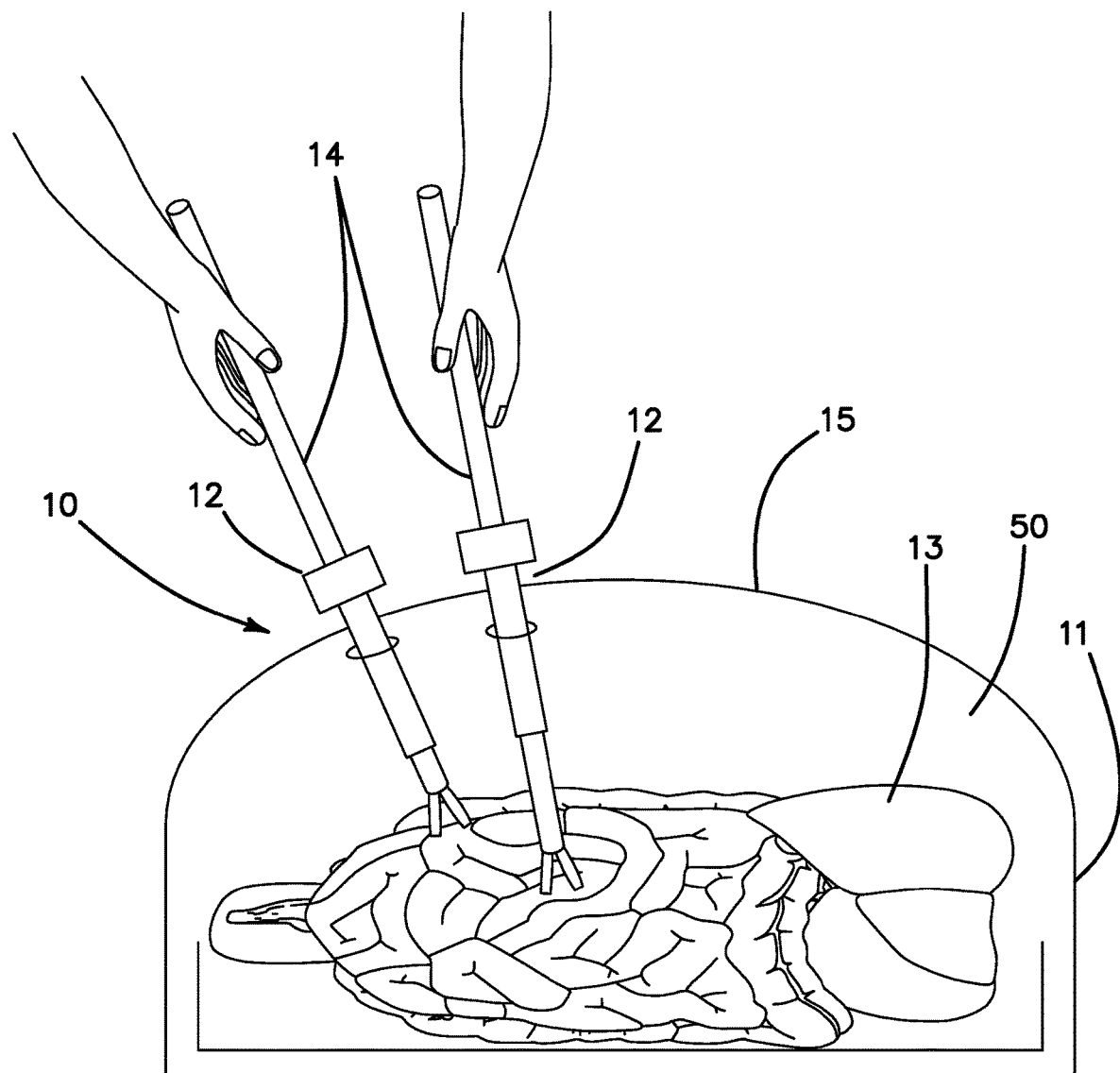
FIG. 1 is a sectional side view of surgical instruments inserted via trocars to access simulated organs located inside a surgical simulator according to the present invention.

With reference to FIG. 1, a surgical simulator for laparoscopic procedures, also known as a trainer, 10 is provided. The trainer 10 allows a trainee to practice intricate surgical maneuvers in an environment that is safe and inexpensive. The trainer 10 generally consists of an enclosure 11 comprising an illuminated environment that defines an interior cavity 50. The interior cavity 50 is accessed with surgical access devices such as trocars 12. The enclosure 11 is sized and configured to replicate a surgical environment. For example, the trainer 10 is configured as a portion of a human abdomen and, in particular, configured to appear to be an insufflated abdominal cavity. Simulated organs 13 may be provided inside the enclosure 11. The simulated organs 13 are capable of being manipulated and "operated on" in mock procedures using real surgical instruments 14, such as but not limited to graspers, dissectors, scissors and even energy-based fusion and cutting devices. Instead of simulated organs 13, the enclosure 11 may be provided with an exercise platform configured for practicing one or more techniques in isolation. For example, a suture board, instead of simulated organs 13, may be located inside the enclosure 11 for the purpose of practicing suturing techniques.

The trainer 10 further includes a simulated abdominal wall 15. The simulated abdominal wall 15 generally covers the top of the trainer 10 through which trocars 12 are placed. The simulated abdominal wall 15 is connected to sidewalls of the trainer 10 or other frame structure that connects to the trainer 10. The simulated abdominal wall 15 is curved in a manner to improve the realism of the simulation. In one variation, this curvature mimics an insufflated abdominal wall. The simulated abdominal wall 15 is further configured to provide a plurality of layers including but not limited to layers designed to represent skin, muscle, fat, bone, cartilage, and peritoneum. The simulated abdominal wall 15 is further configured to provide a realistic visual via a scope inside a trocar during penetration and, thereby, include all of the layers, characteristic colors, thickness and anatomical landmarks to realistically inform the surgeon of the progression through the layers and, thereby, teach prevention of accidental organ puncture. The simulated abdominal 15 wall must provide not only, a realistic visual, but also, a realistic tactile sensation that includes realistic force levels of the instruments through the simulated abdominal wall 15.

Figure 2:
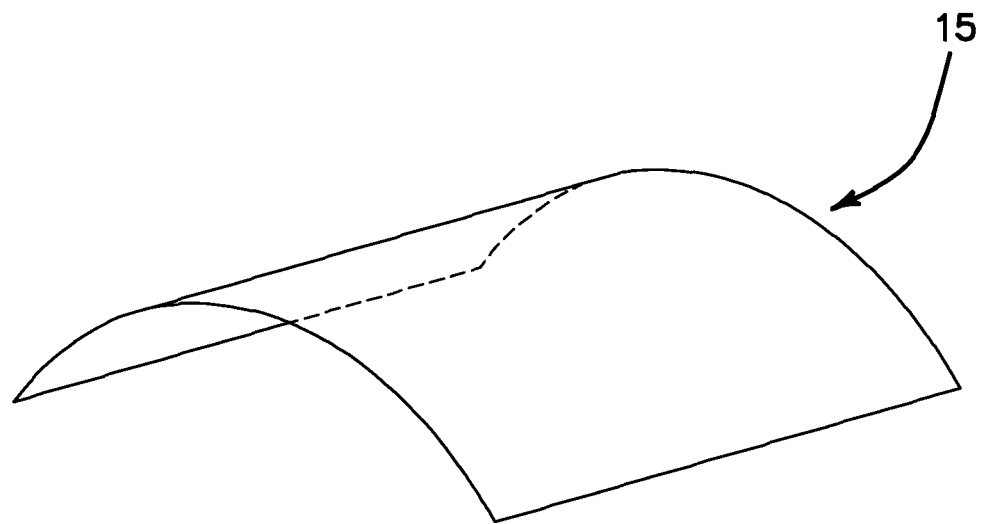
FIG. 2 illustrates a simulated abdominal wall that is curved in one direction.
Figure 3:
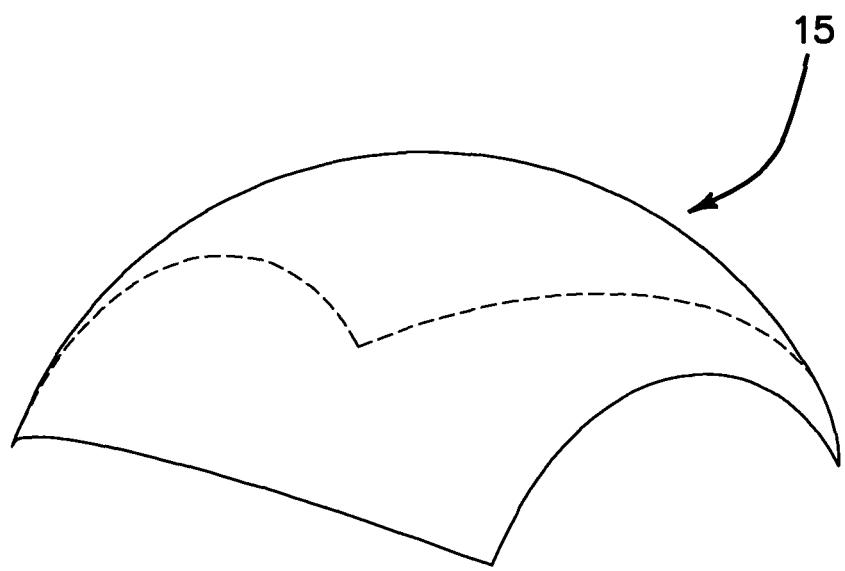
FIG. 3 illustrates a simulated abdominal wall that is curved in two directions according to the present invention.

Turning to FIG. 2, an exemplary surface of a simulated abdominal wall 15 curved in one direction is shown. The partial cylinder of the simulated abdominal wall 15 is easy to manufacture and many of the prior trainers 10 make use of such a simulated abdominal wall 15 that has a curvature about a single axis only. This shape is an approximation of the real shape of an insufflated abdomen. Additionally, the shape of FIG. 2 is not as structurally sound as a shape that curves in two directions; therefore, abdominal wall designs that are curved in this way often necessitate the use of additional internal support structures. FIG. 3 shows a simulated abdominal wall 15 surface that curves in two directions. The partially spherical surface of FIG. 3 is both more lifelike, and also more structurally sound than a simulated abdominal wall surface that curves in only one direction. The simulated abdominal wall of the present invention eliminates the need for internal support structures while creating a shape that has a visual look and tactile feel that more closely mimic the real abdominal wall.

A method for manufacturing a simulated abdominal wall is provided. The method includes the step of projecting a domed, three-dimensional shape of the desired curvature onto a flat surface of a foam layer. The projection is cut out of the foam layer. Then the three-dimensional surface of a dome is formed from the projected two-dimensional surface of a cutout by bringing the edges of each cutout together forming seams in a prescribed manner. Each cutout represents one or more anatomical layers of a human abdominal wall. In the method, a plurality of cutouts, each sequentially slightly smaller are nested inside each other to build up a complete domed abdominal wall structure. The layers are held in position inside a mold having a conforming depression and laminating together with the adhesive.

Figure 4A:
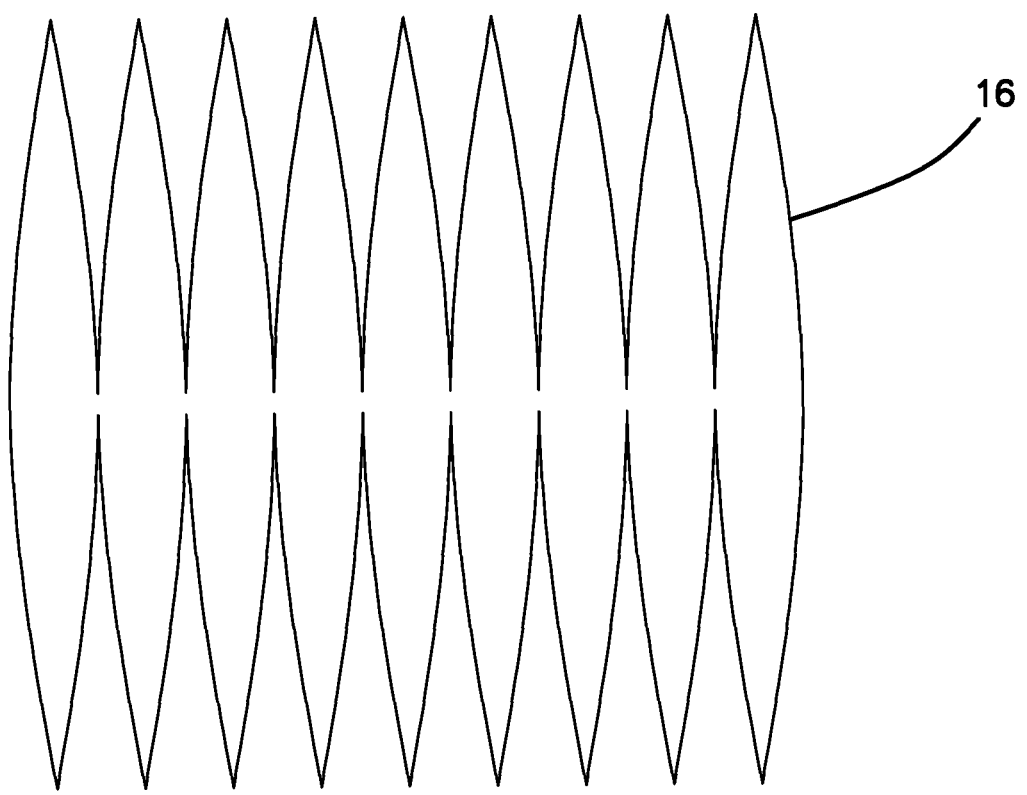
FIG. 4A illustrates a surface of a dome projected onto a flat surface according to the present invention.
Figure 4B:
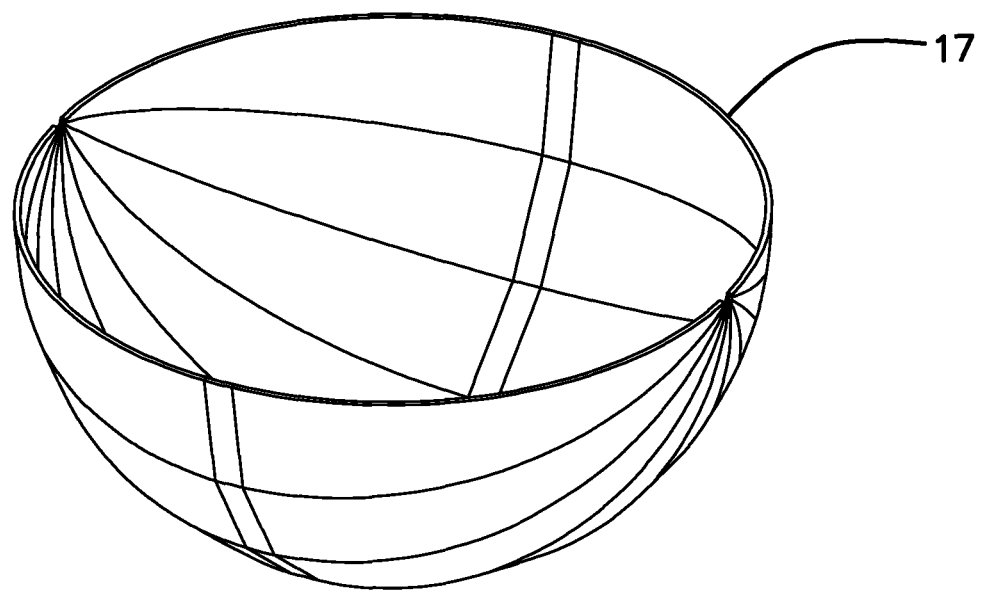
FIG. 4B illustrates the surface of FIG. 4A with its edges joined together forming a dome according to the present invention.
Figure 4C:
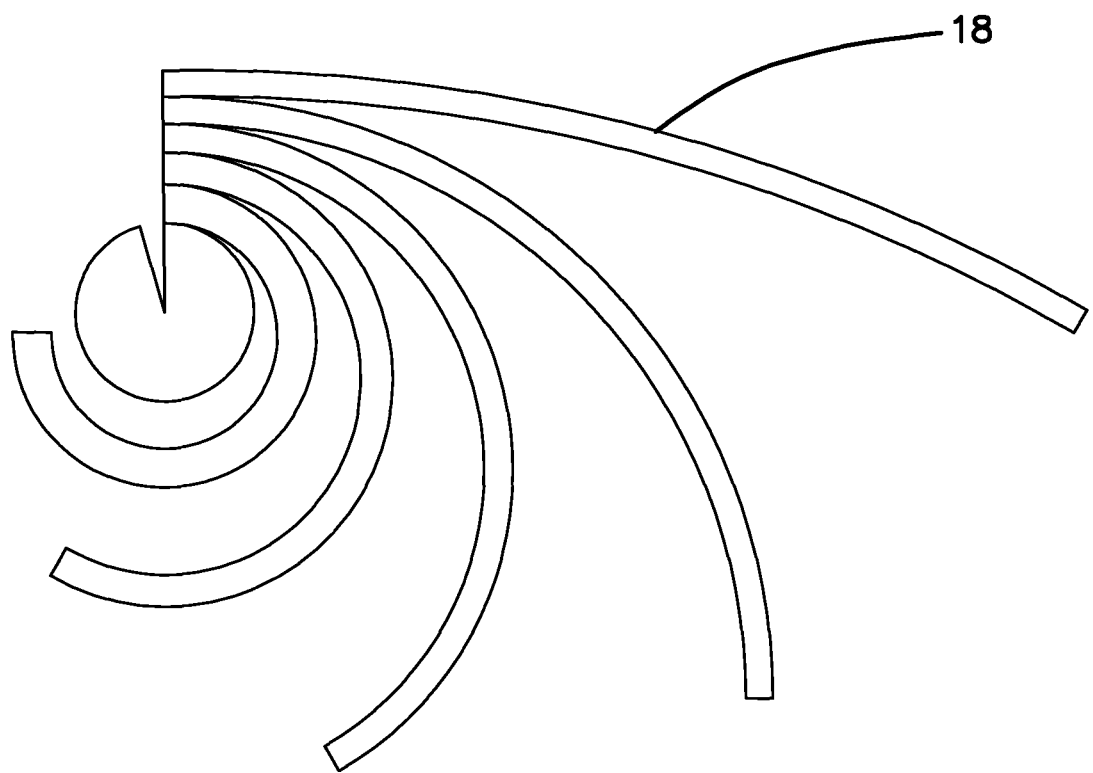
FIG. 4C illustrates a surface of a dome projected onto a flat surface according to the present invention.
Figure 4D:
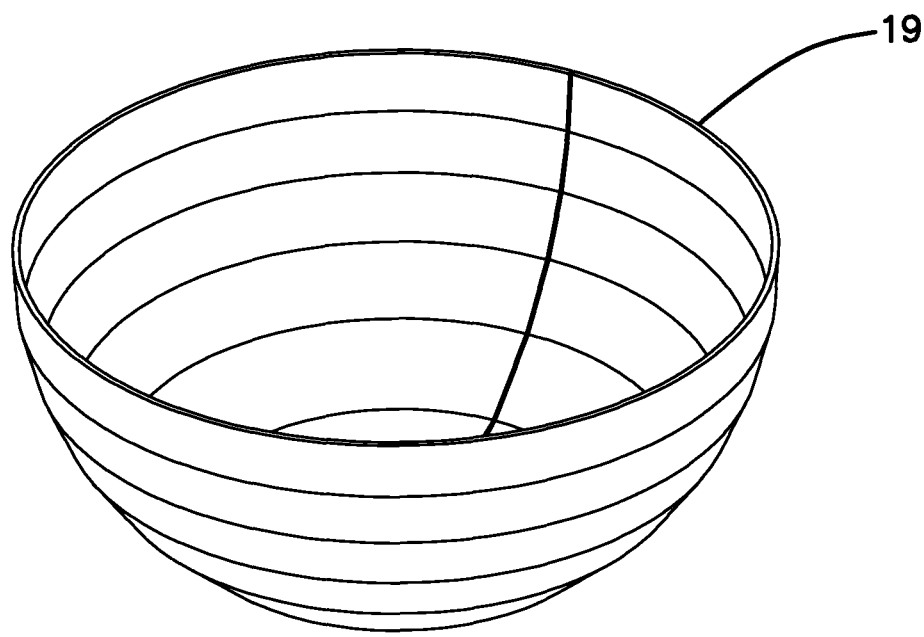
FIG. 4D illustrates the surface of FIG. 4C with its edges joined together, forming a dome according to the present invention.

Turning to FIG. 4A, a cutout of a domed projection 16 is shown. The cutout 16 is a transformation of the latitudes and longitudes of locations from the surface of a dome into locations on a plane. The same projection 16 with its edges brought together in order to form a domelike shape 17 is shown in FIG. 4B. Similarly, FIG. 4C shows a cutout of an alternate domed projection 18. The same projection 18 with its edges brought together to form a hemisphere-like shape 19 is shown in FIG. 4D. One skilled in the art can contemplate different types of cutout projections having different patterns than the ones shown in FIGS. 4A-4D. Also, the invention is not limited to hemispherical projections. Other domed shapes may also be projected. For example, an ellipsoid or any curved surface may be projected in the present invention. The projections serve either as a layer or pattern for cutting sheets to form one or more domed layers that are to constitute the simulated wall of the present invention as will be described in greater detail below.

Figure 5:
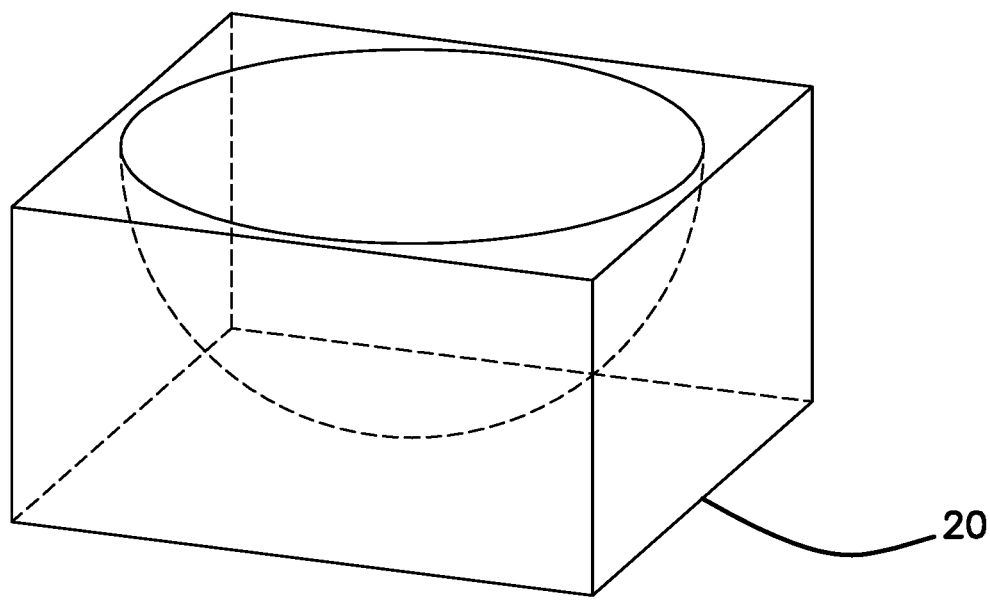
FIG. 5 is a transparent view of a mold used for the layup method for forming a simulated abdominal wall according to the present invention.

FIG. 5 shows a simple layup mold 20 that is used to form the layered simulated abdominal wall 15 according to the present invention. The mold 20 includes a hemispherical depression sized and configured for the desired shape of the final simulated abdominal wall 15. The depression may be semi-ellipsoidal, domed or curved in shape in another variation. The mold 20 is sized and configured to receive the cutout projections when layering them up to form a multiplicity of layers glued together into a multi-layered simulated abdominal wall 15. The layers are made of foam such as polyurethane foam, ethylene-vinyl acetate (EVA) foam, polyethylene foam, open cell foam, memory foam or silicone or a combination of silicone and foam. The polyurethane foam has a density of approximately 6 pound per cubic foot.

Figure 6B:
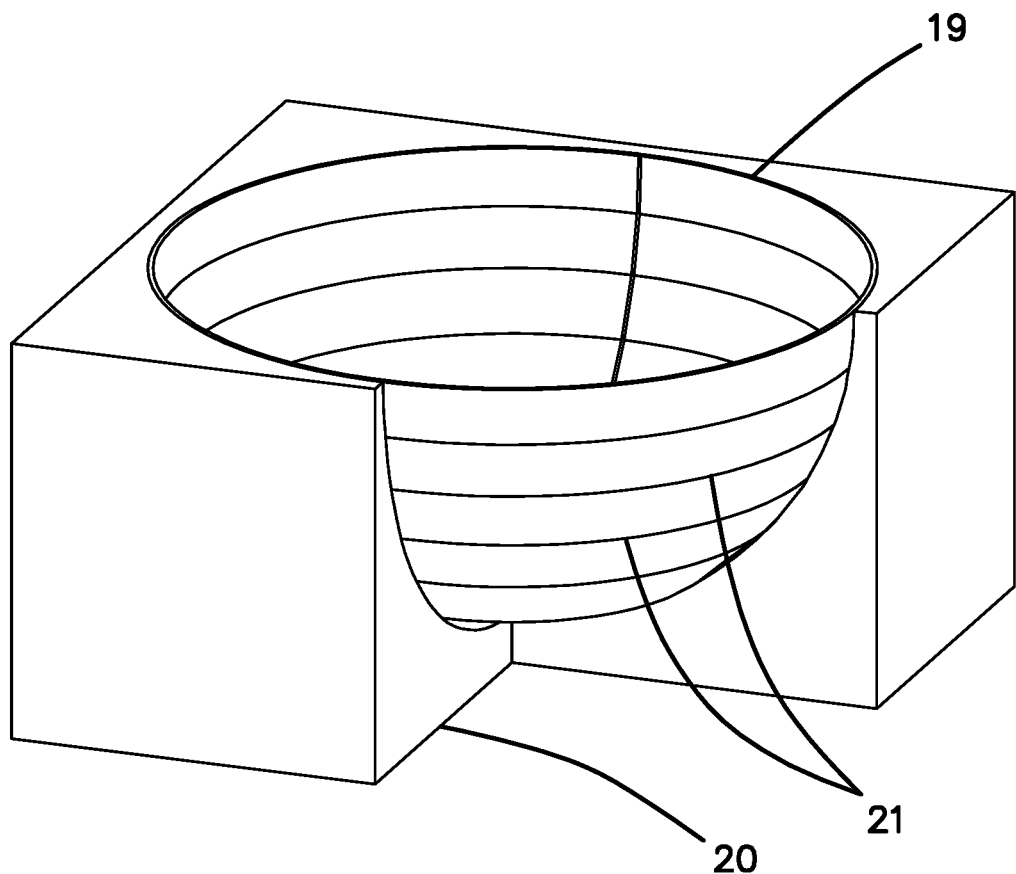
FIG. 6B illustrates the domed projection cutout of FIG. 4C with its edges joined together inside the layup mold of FIG. 5 according to the present invention.
Figure 6A:
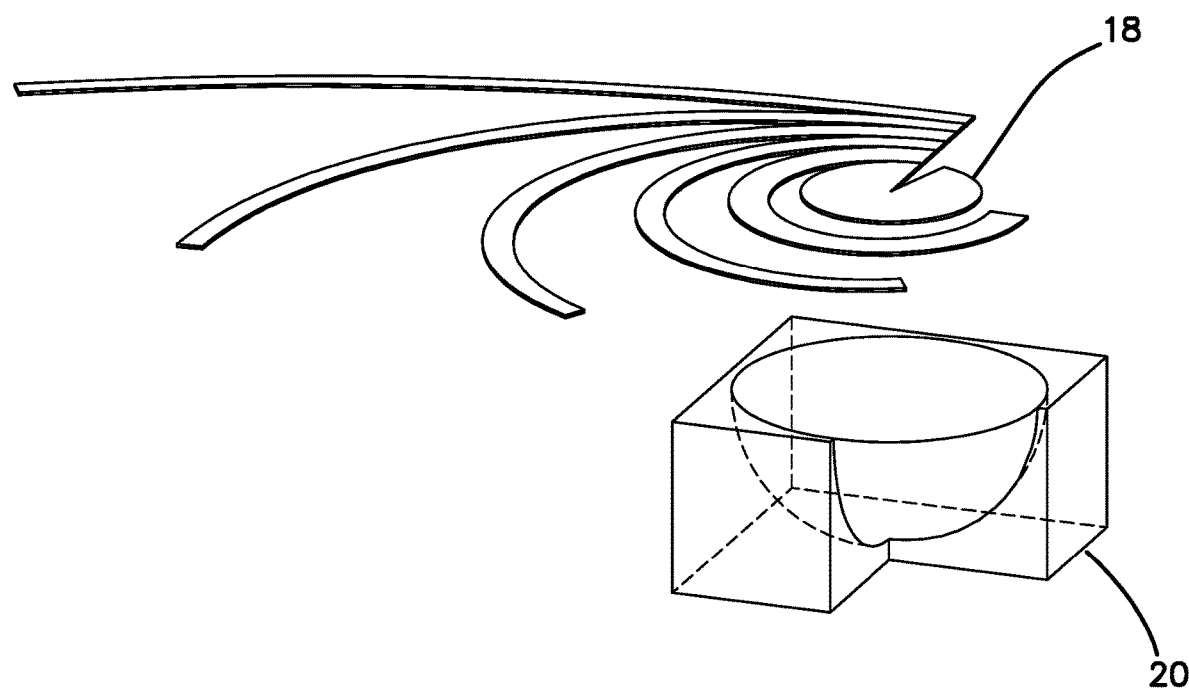
FIG. 6A illustrates the domed projection cutout of FIG. 4C above and prior to placement into the layup mold of FIG. 5 according to the present invention.
Figure 6C:
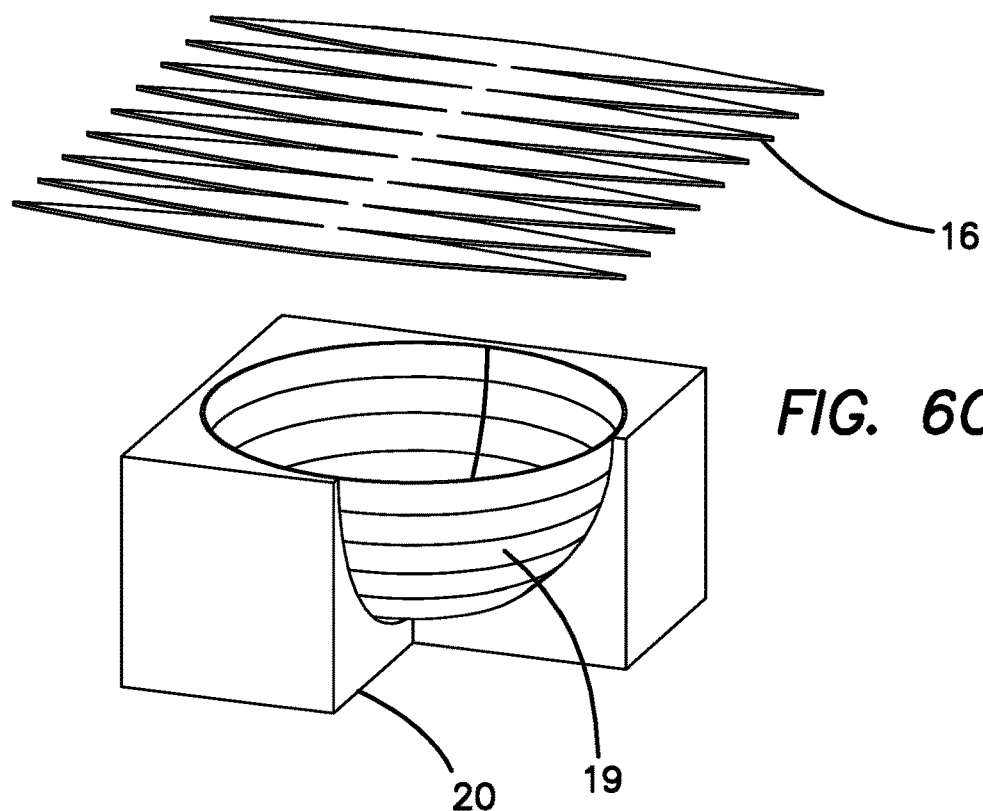
FIG. 6C illustrates the domed projection cutout of FIG. 4A above and prior to placement into the layup mold of FIG. 5 according to the present invention.
Figure 6D:
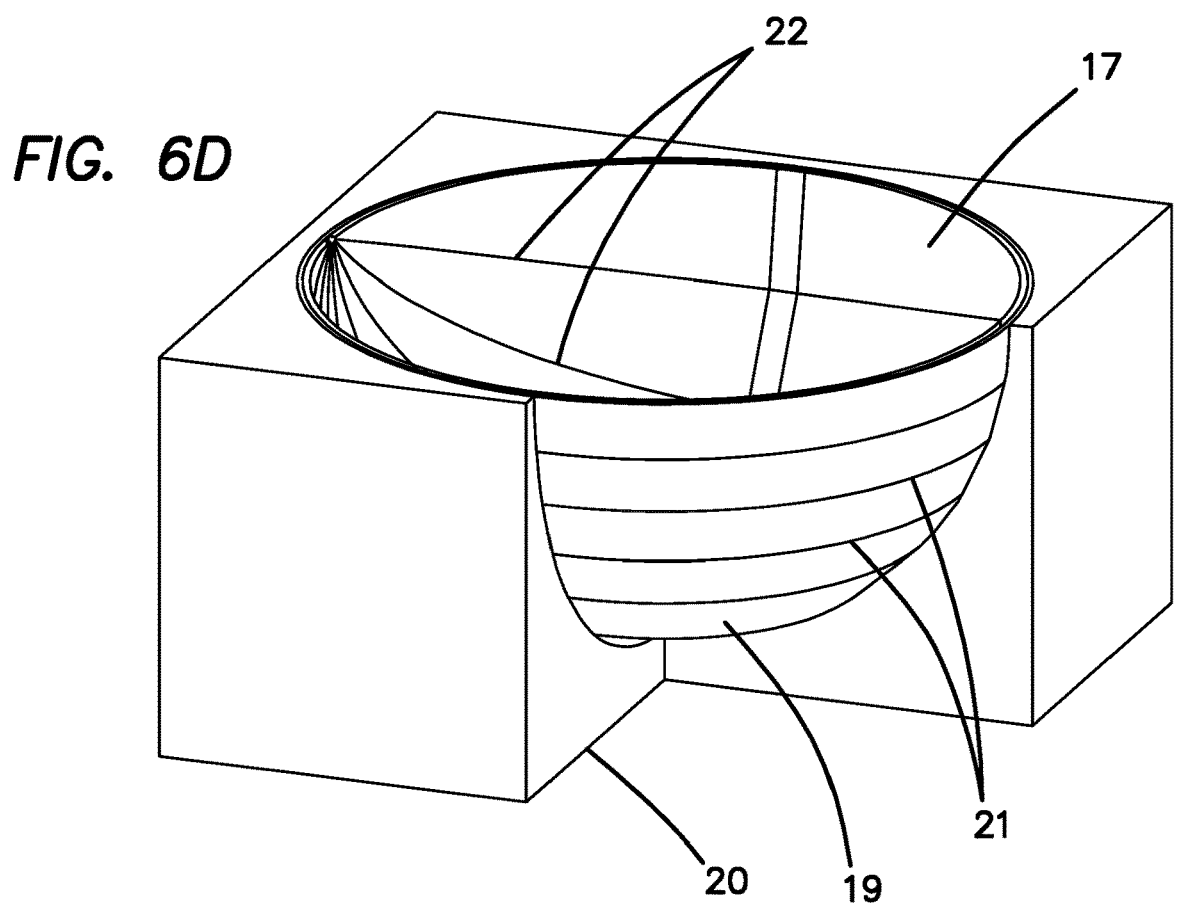
FIG. 6D illustrates the domed shape of FIG. 4B nested inside the domed shape of FIG. 4D inside the mold according to the present invention.

The size and shape of the depression of the mold conform closely to the shape of the assembled cutout projections. A cutout projection is assembled when its edges are joined together to form the desired shape. For example, in FIGS. 6A-6B, it can be seen that the cutout 18 fits into the depression of layup mold 20, thus forming a hemisphere-like shape 19. When the cutout 18 is located inside the mold 20, the edges of the cutout 18 are in juxtaposition to form seams 21 having a latitudinal orientation. FIG. 6C illustrates the cutout 16 in a flat orientation adjacent to the layup mold 20 containing the other cutout 18. Turning now to FIG. 6D, cutout 16 is shown located inside the depression of mold 20 with its edges together and nested inside the other cutout 18 previously placed into the mold 20. Again, note the latitudinal orientation of seams 21 of cutout 18 forming dome 19 and compare to the longitudinal orientation of seams 22 of cutout 16 forming dome 17. FIG. 6D is a two-layered simulated abdominal wall 15. The number of layers may be increased in a similar manner as described by alternating the two or more curved surfaces 17 and 19 to build up the layers of the simulated abdominal wall such that their seams do not align.

Figure 7:
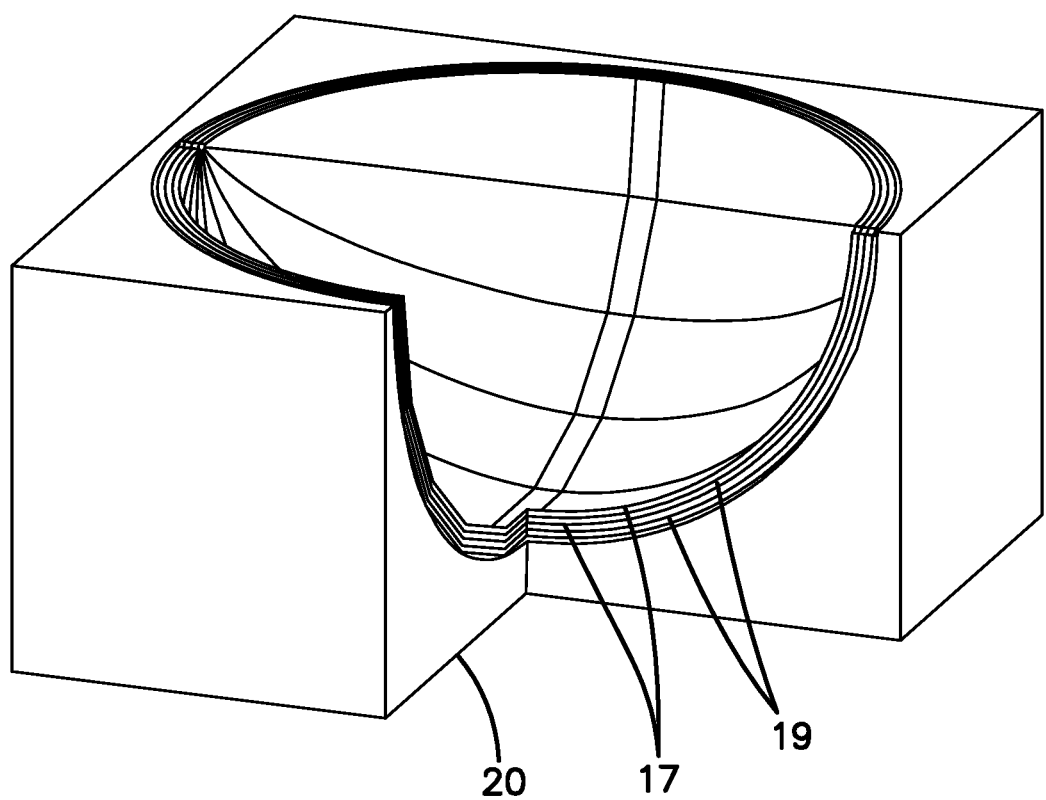
FIG. 7 is a sectional view of the layup mold of FIG. 5 with four foam layers according to the present invention.

FIG. 7 illustrates a section view of mold 20 with alternating domes 17 and 19 located in the mold 20. Each successive dome is sized to be slightly smaller to account for the thickness of each prior foam layer. Also, in one variation, each added dome alternates between at least two or more different cutout projections, lest the seams line up through the foam layers, which would result in a foam piece with reduced or no structural integrity. Alternatively, the same cutout projection may be employed for each layer such that each subsequent layer is rotated/displaced slightly to avoid alignment of the seams with the seams of the previous layer. For example, the cutout projection 16 of FIG. 4A can be rotated inside the mold 20 relative to the previously placed cutout projection 16 such that the seams 22 are offset and not aligned. It should be noted that different types and colors of foam sheets may be used to simulate the look of the layers present in a human abdominal wall. Adhesive is applied between the cutout projections to adhere the layers to form the abdominal wall.

By cutting flat sheets in a pattern and forming a three-dimensional dome from the combined flat sheets as described above, a resilient convex surface is created. Furthermore, because adhesive is applied only on the large flat surfaces of the foam and not directly to the thickness of the seams, there are no areas in the simulated abdominal wall where the stiffness is greater than the surrounding areas due to a thick seam of glue. Once all of the desired underlying layers have been laminated together, a foam/silicone skin layer is stretched and adhered to the work-piece. The skin layer covers up all of the seams, leaving a smooth convex surface visible to the user. The foam/silicone skin layer will be described in greater detail below.

In another method, a vacuum mold is used to form flat foam sheets into convex foam sheets and join them together. In this method, a flat foam sheet is placed on the vacuum mold and held in place with a frame. The vacuum pump is then turned on, and heat is applied to the foam. The heat relaxes the foam, allowing it to yield and stretch into the mold cavity due to the suction of the vacuum. Spray adhesive is applied to the foam in the mold and to a new sheet of foam. Next, a multitude of holes are poked through the first layer of foam so that the vacuum can act on the second layer of foam through the first. The order of hole-poking and glue application can be reversed and the process will still work. The frame is removed, the next sheet of foam is placed glue side down onto the vacuum mold with the first foam layer still in place, glue side up, and the frame is replaced. Again, the vacuum pump is turned on and heat is applied to the top foam layer. As the two foam layers come into contact they are bonded together. This process is then repeated for each desired foam layer. With the addition of each foam layer, the simulated abdominal wall gains strength. Once the desired foam layer configuration is met, the simulated abdominal wall is then inserted into an abdominal wall frame, which is a two piece component that secures the simulated abdominal wall along the perimeter only by compressing it between top and bottom frame parts and allows the user to easily install and take off the wall/frame assembly from the surgical simulator enclosure. The geometry of the abdominal wall frame adds further support to the convex form and feel of the simulated abdominal wall by utilizing an angled channel along the perimeter that the simulated abdominal wall is compressed between. The method will be described in greater detail with reference to the drawings hereinbelow.

Figure 10:
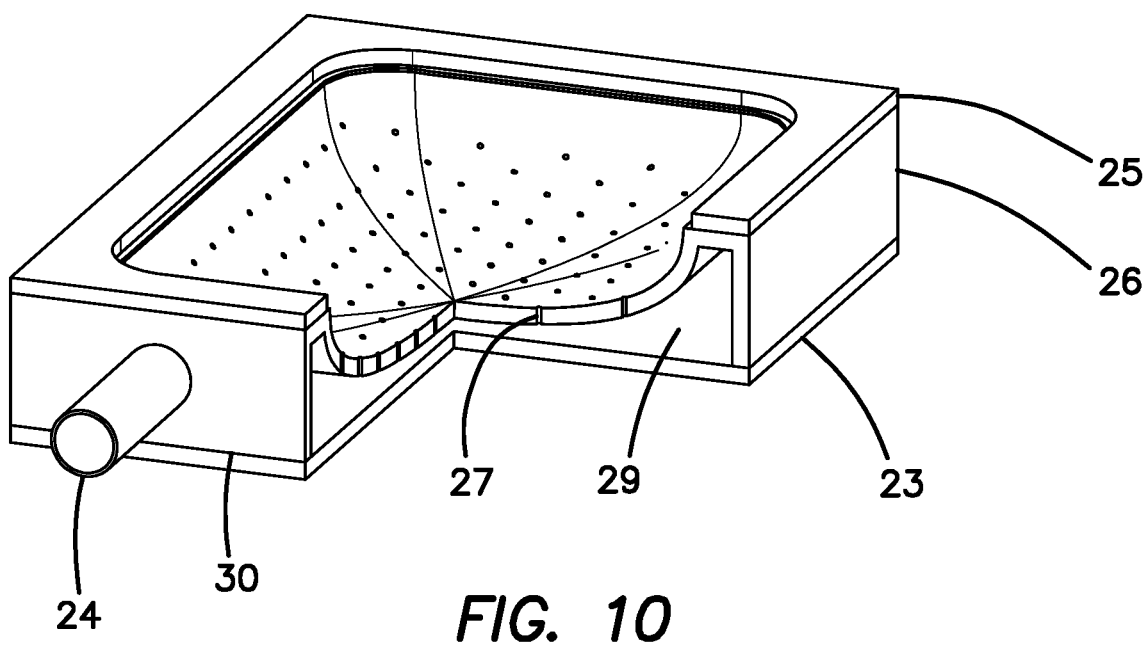
FIG. 10 is a top perspective, sectional view of a negative cavity vacuum mold according to the present invention.
Figure 8:
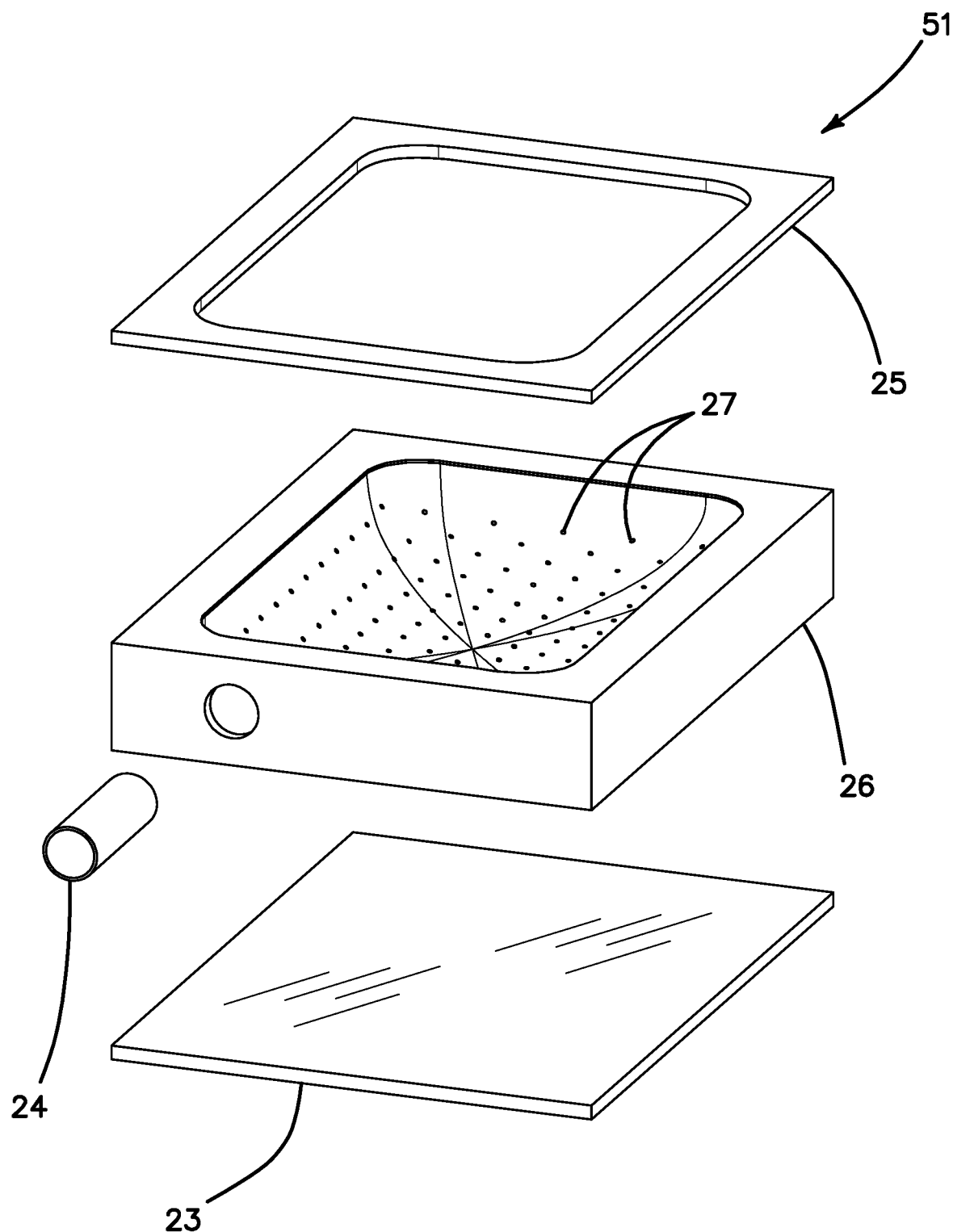
FIG. 8 is a top perspective, exploded view of a negative cavity vacuum mold according to the present invention.
Figure 9:
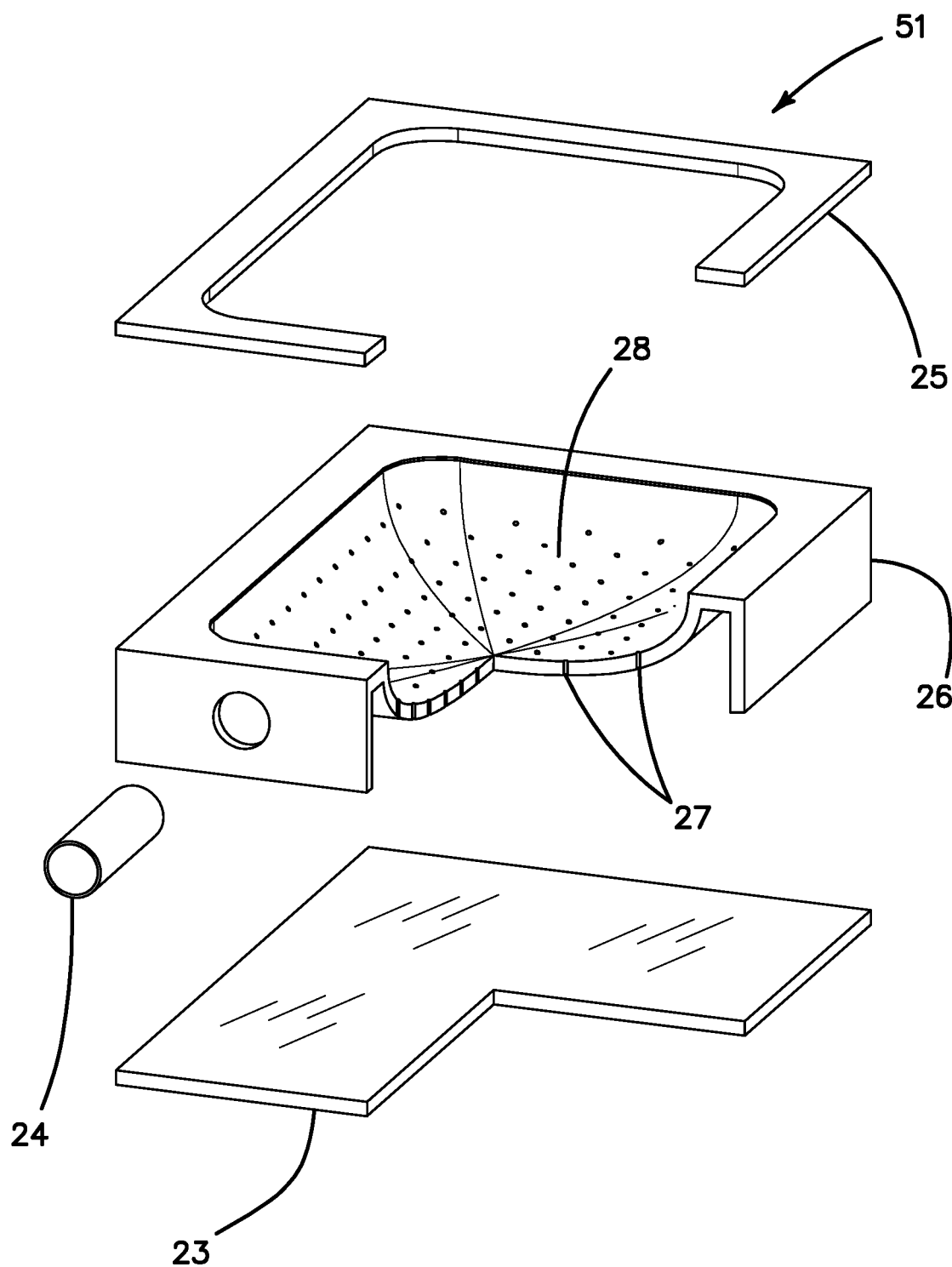
FIG. 9 is a top perspective, exploded, sectional view of a negative cavity vacuum mold according to the present invention.

Turning now to FIG. 8, an exploded view of a negative cavity vacuum mold 51 is shown. The vacuum mold 51 includes a base 23, air outlet 24, frame 25, and main body 26 having a negative cavity 28. FIG. 9 shows an exploded sectional view of the same vacuum mold 51. In this view, air holes 27 are seen to pierce the cavity 28. FIG. 10 shows a collapsed, sectional view of the vacuum mold 51 showing the plenum 29 created between the base 23 and main body 26, the plenum 29 is sealed between the base 23 and main body 26, as well as between the main body 26 and frame 25 and in fluid communication with the air outlet 24.

Figure 11:
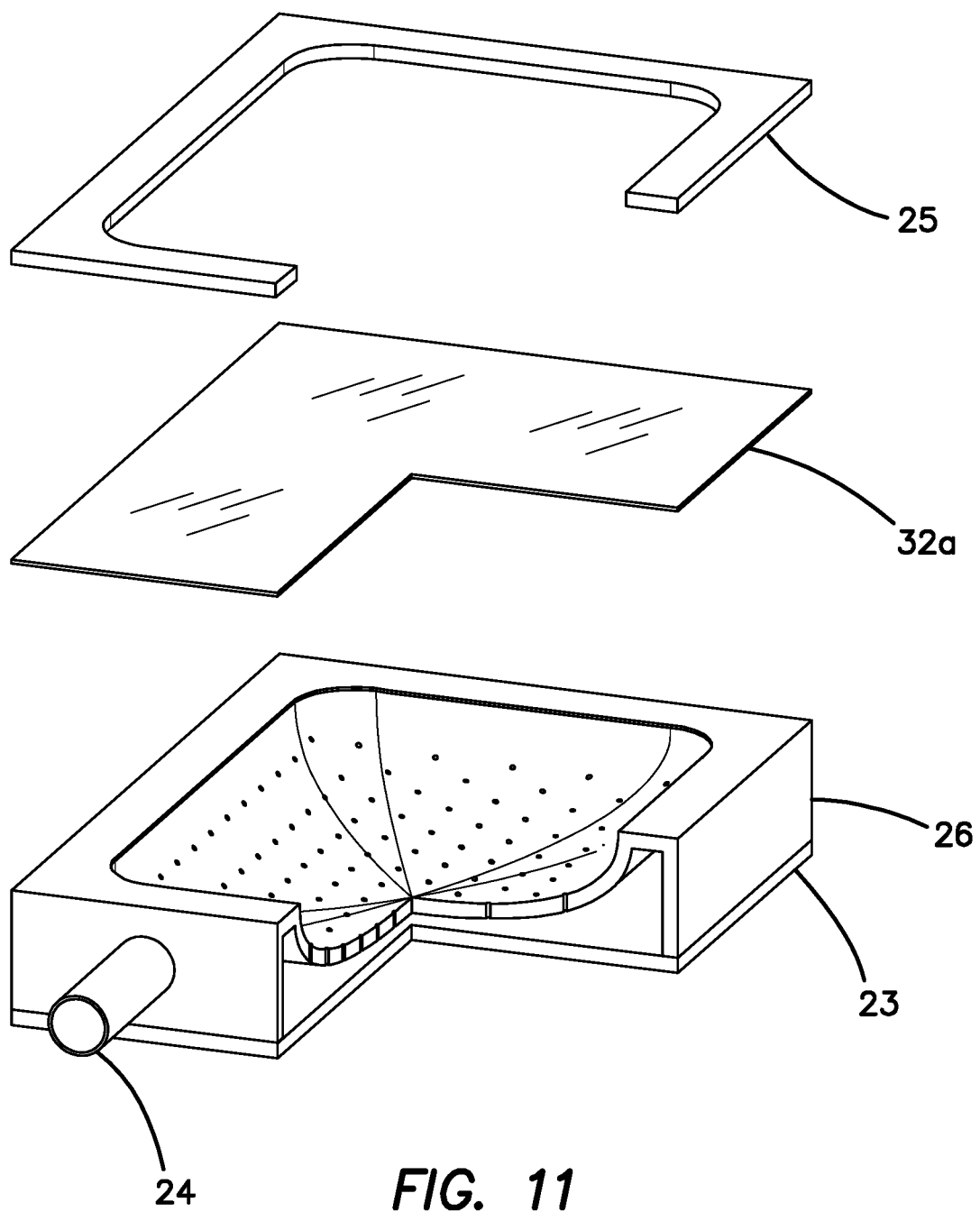
FIG. 11 is a top perspective, sectional view of vacuum mold and a flat undeformed foam layer according to the present invention.
Figure 12A:
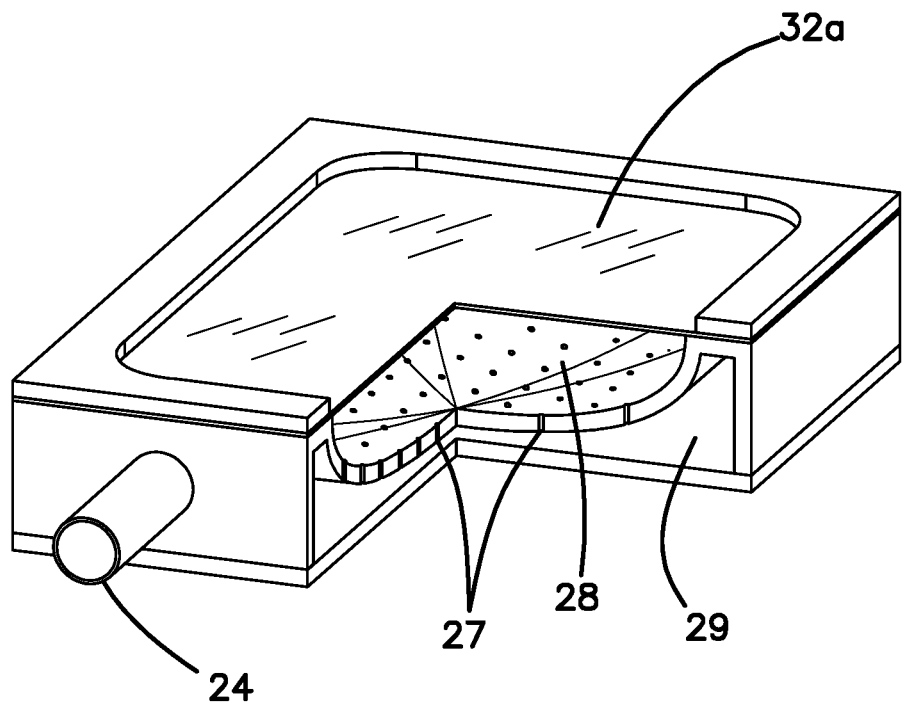
FIG. 12A is a top perspective, sectional view of a vacuum mold and a flat, undeformed foam layer according to the present invention.
Figure 12B:
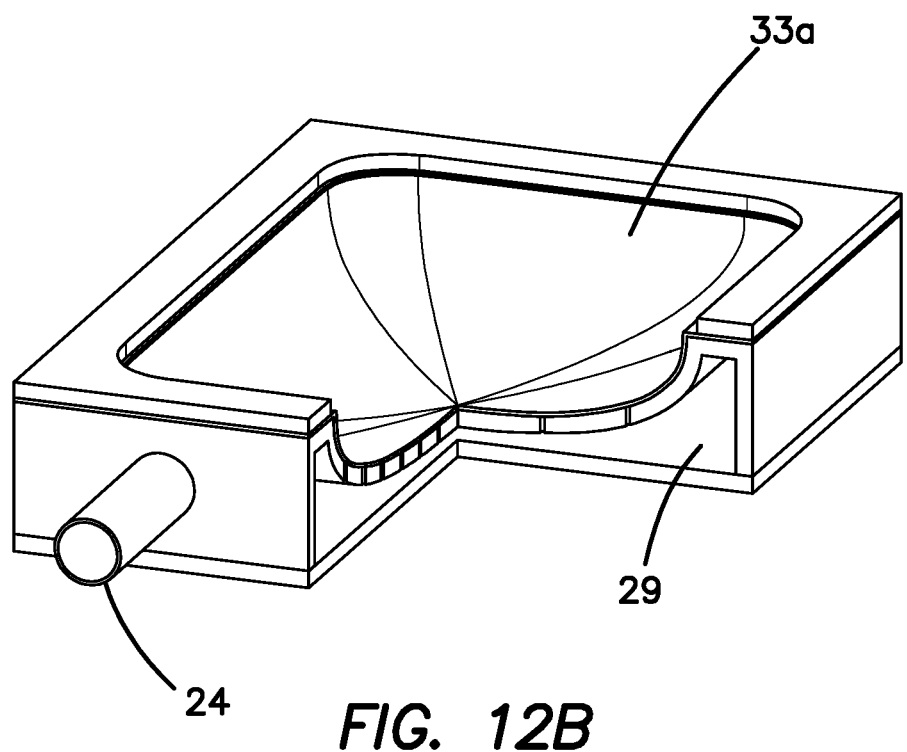
FIG. 12B is a top perspective, sectional view of a vacuum mold and a deformed layer according to the present invention.

With reference now to FIG. 11, a first flat sheet 32a of foam material is located above the main body 26 of the vacuum mold 51 and underneath the frame 25 which keeps the flat sheet 32a in place with respect to the mold 51. FIG. 12A shows the flat foam sheet 32 prior to forming. During the forming process, air is evacuated through air outlet 24, which creates negative pressure in the plenum 29. This negative pressure acts through air holes 27, and sucks the flat foam sheet 32 towards the inner surface of the cavity 28. While air is being evacuated through outlet 24, heat is applied, such as with a hot air gun or integrated heating element, to the top of the foam sheet 32. The heat allows the foam sheet 32 to stretch and conform to the shape of the cavity 28 making complete contact with the surface of the cavity 28. The heat is generally applied simultaneously with the application of vacuum to the sheet; although the invention is not so limited and heat may be applied prior to vacuum. A deformed foam sheet 33a molded in the vacuum mold 51 is shown in FIG. 12B.

Figure 13:
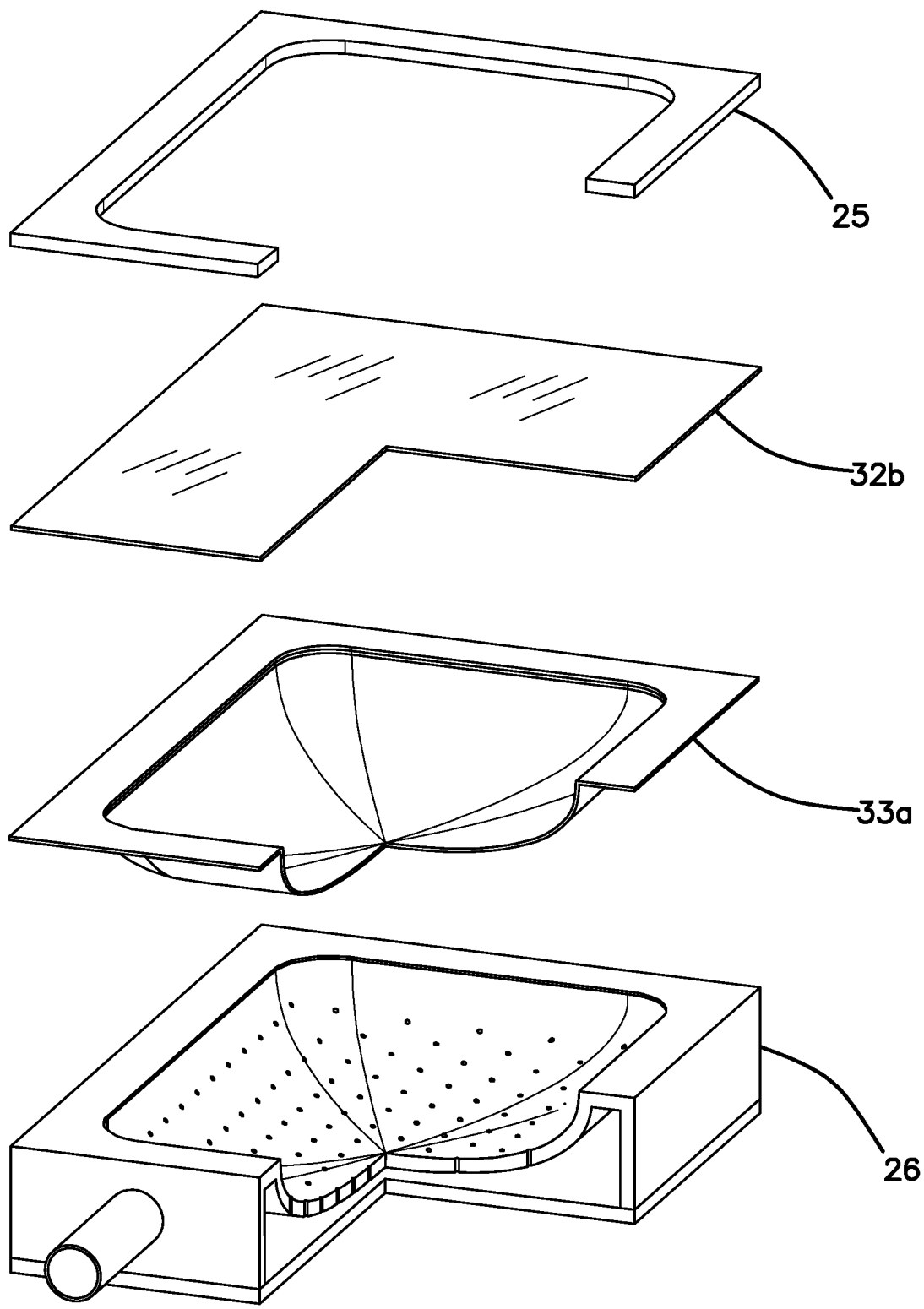
FIG. 13 is an exploded, sectional view of a vacuum mold, a deformed layer and a flat undeformed layer according to the present invention.
Figure 14A:
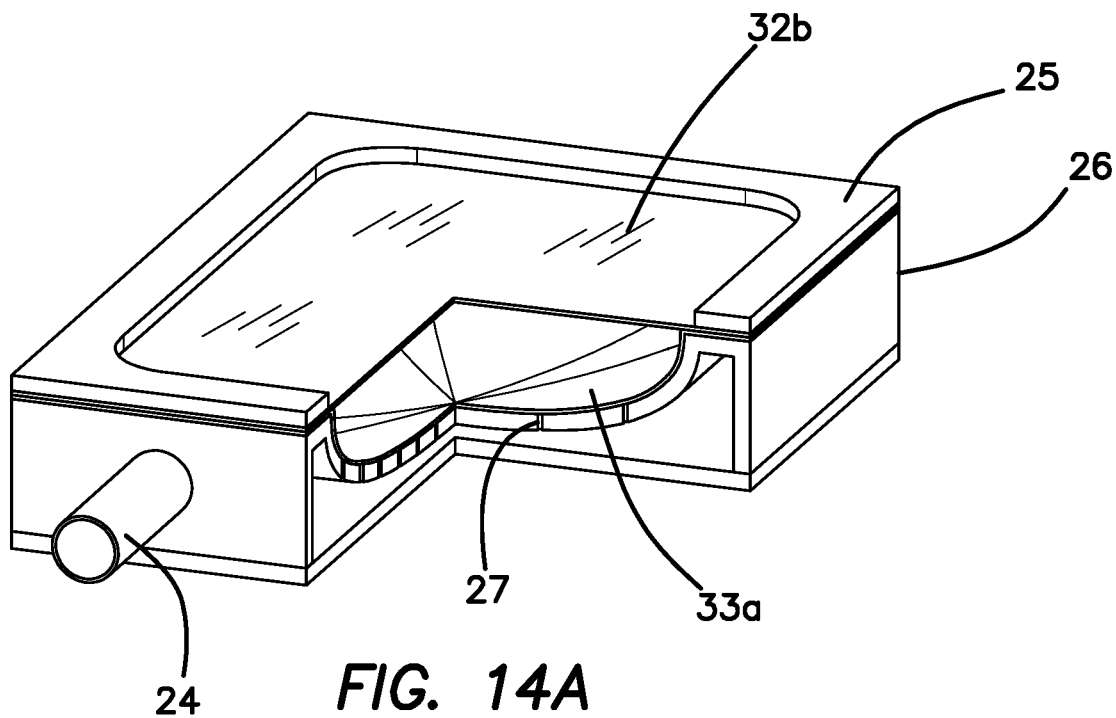
FIG. 14A is a top perspective, sectional view of a vacuum mold, a deformed layer and a flat undeformed layer according to the present invention.
Figure 14B:
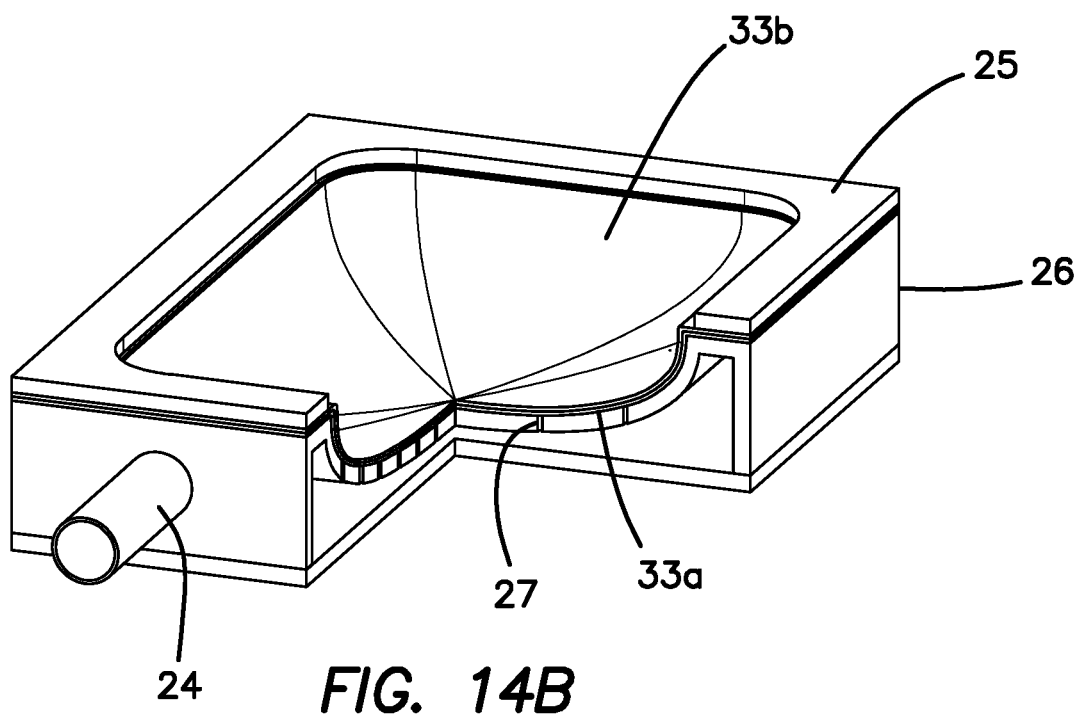
FIG. 14B is a top perspective, sectional view of a vacuum mold with two deformed layers according to the present invention.

With reference now to FIGS. 13 and 14A, the frame 25 is lifted and a second flat undeformed sheet 32b is placed atop the main body 26 and underneath the frame 25 of the vacuum mold 51. Prior to placement of the second undeformed sheet 32b into the vacuum mold 51, a multitude of holes are poked through the previously formed first layer 33a to allow the suction to act through its thickness, thus pulling the second undeformed, flat sheet 32b into the cavity 28. The holes are poked with a cylindrical roller having a plurality of spikes. The spikes are long enough to penetrate the thickest layer and are approximately 0.75 inches long. The radius of the cylinder of the roller is approximately 1.25 inches. Thereby, the roller is large enough with spikes spread apart from each other to avoid tearing the foam. Also, the roller is small enough so that it can still perforate the areas of the foam in the cavity with a minimum radius of curvature of approximately 1.7 inches which is approximately the same radius of curvature of the abdominal wall in one variation. The holes are approximately 2 millimeters in diameter. The second flat sheet 32b is also made of foam. Prior to placement in the vacuum mold 51, adhesive is applied to the top side of the first formed foam layer 33a to adhere the two adjacent layers to each other. Adhesive may also be applied to the underside surface of the second undeformed flat sheet 32b that faces the first foam layer 33a to adhere the layers to each other. Contact cement including solvent-based or water-based contact adhesive, which stays soft and flexible, may be employed so that the adhesive does not interfere with the look and feel of the final product. Also, the adhesive is selected and carefully applied so as to not create too much drag when a trocar is pushed through the skin layer. FIG. 14B shows the second flat sheet simultaneously formed and adhered to the first formed foam sheet 33a. The intermediate result is a simulated abdominal wall 15 having two formed layers 33a, 33b glued together. The process can be repeated to build up a simulated abdominal wall having as many layers as desired. Again, different types and colors of foam, such as any flexible thermoplastic foam, may be used for each layer to simulate the colors and textures present in a real abdominal wall. For example, red and white layers can be made of ethylene-vinyl acetate having a density of approximately 2-4 pounds per cubic foot, pink and translucent layers can be made of closed-cell polyethylene.

Figure 15:
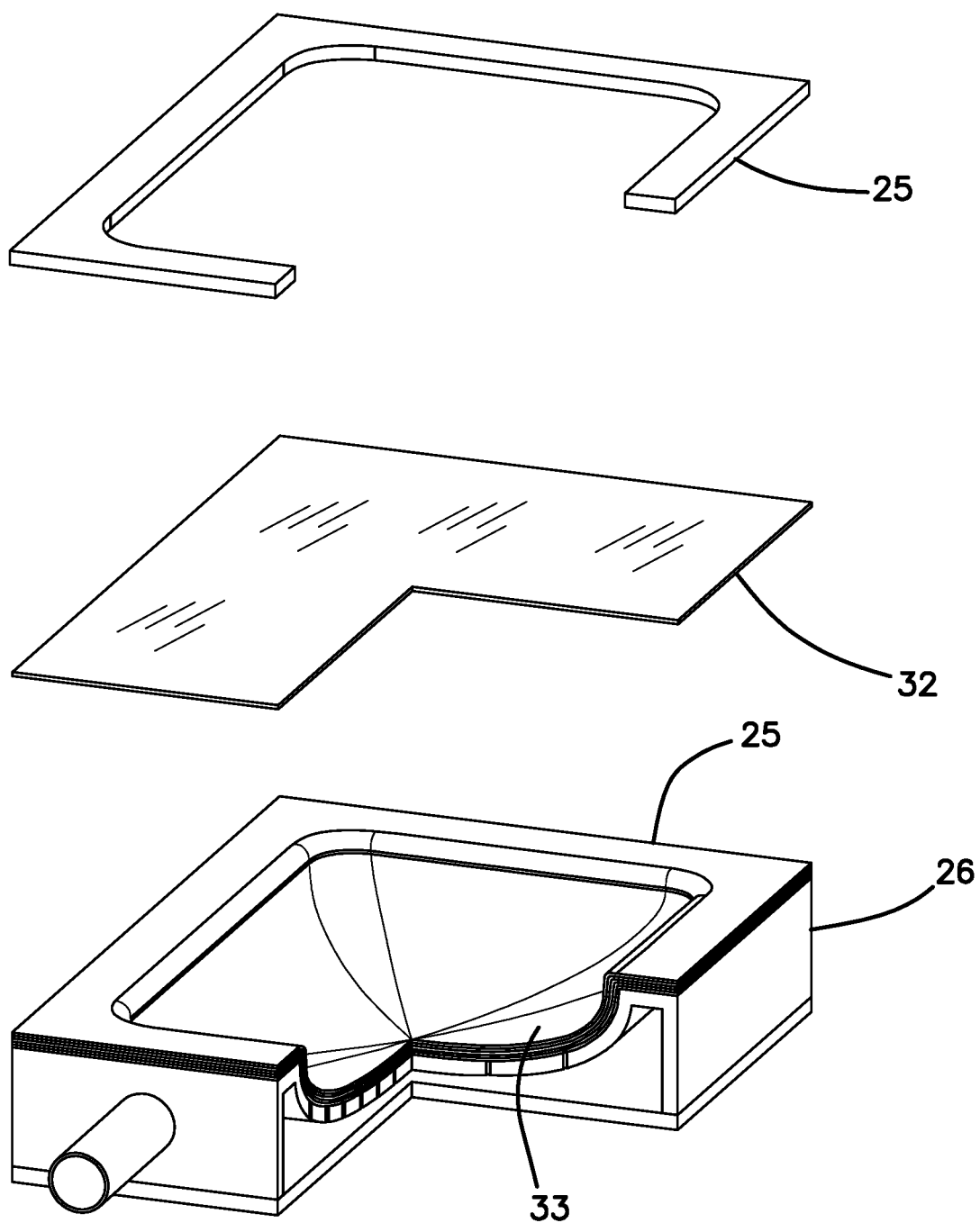
FIG. 15 is an exploded, sectional view of a vacuum mold, a plurality of deformed layers and one undeformed layer according to the present invention.
Figure 16A:
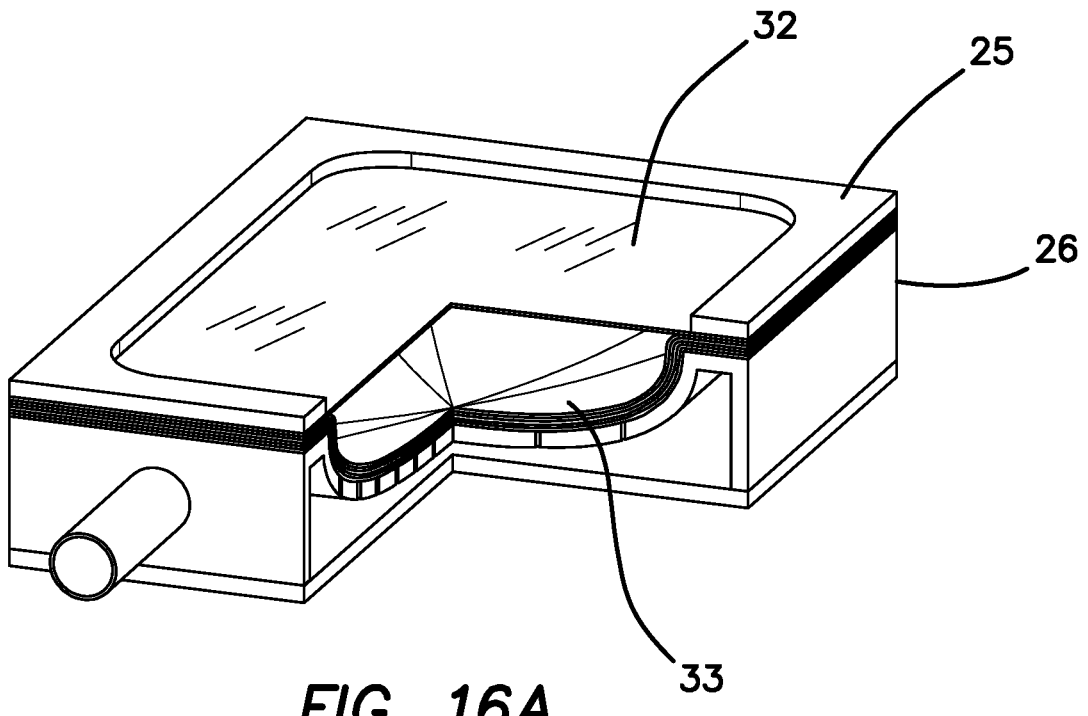
FIG. 16A is a top perspective view of an undeformed layer in place on the vacuum mold and five previously deformed foam layers according to the present invention.
Figure 16B:
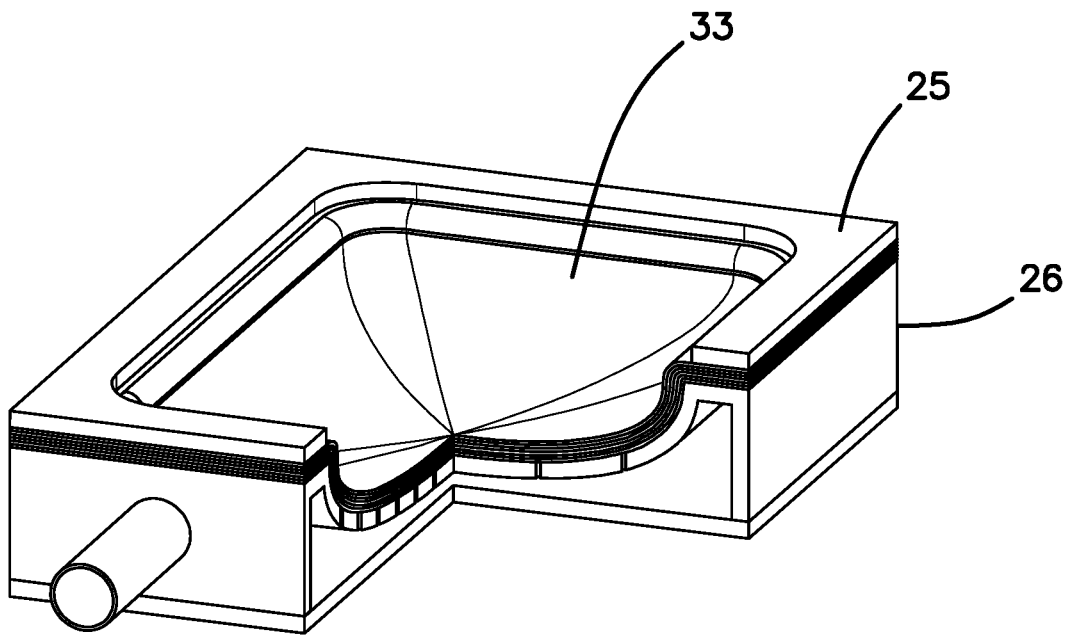
FIG. 16B is a top perspective view of six deformed layers and a vacuum mold according to the present invention.

FIG. 15 illustrates the process described above after several repetitions wherein a flat foam sheet 32 is placed atop a plurality of previously deformed layers 33 and pressed against the pre-made foam layers 33 using the frame 25. FIGS. 16A and 16B show an undeformed layer prior to and after vacuum molding. Again, between adding layers, a multitude of small holes through the deformed foam layers 33 is provided to place the undeformed layer in fluid communication with the vacuum across the main body 26 and across the previously deformed layers 33. Adhesive is applied to the top of the previously deformed layers 33 and to the underside of the flat undeformed foam layer 32. When the vacuum is activated and the heat applied the undeformed layer will be simultaneously deformed and adhered to the previously deformed layer.

Figure 17A:
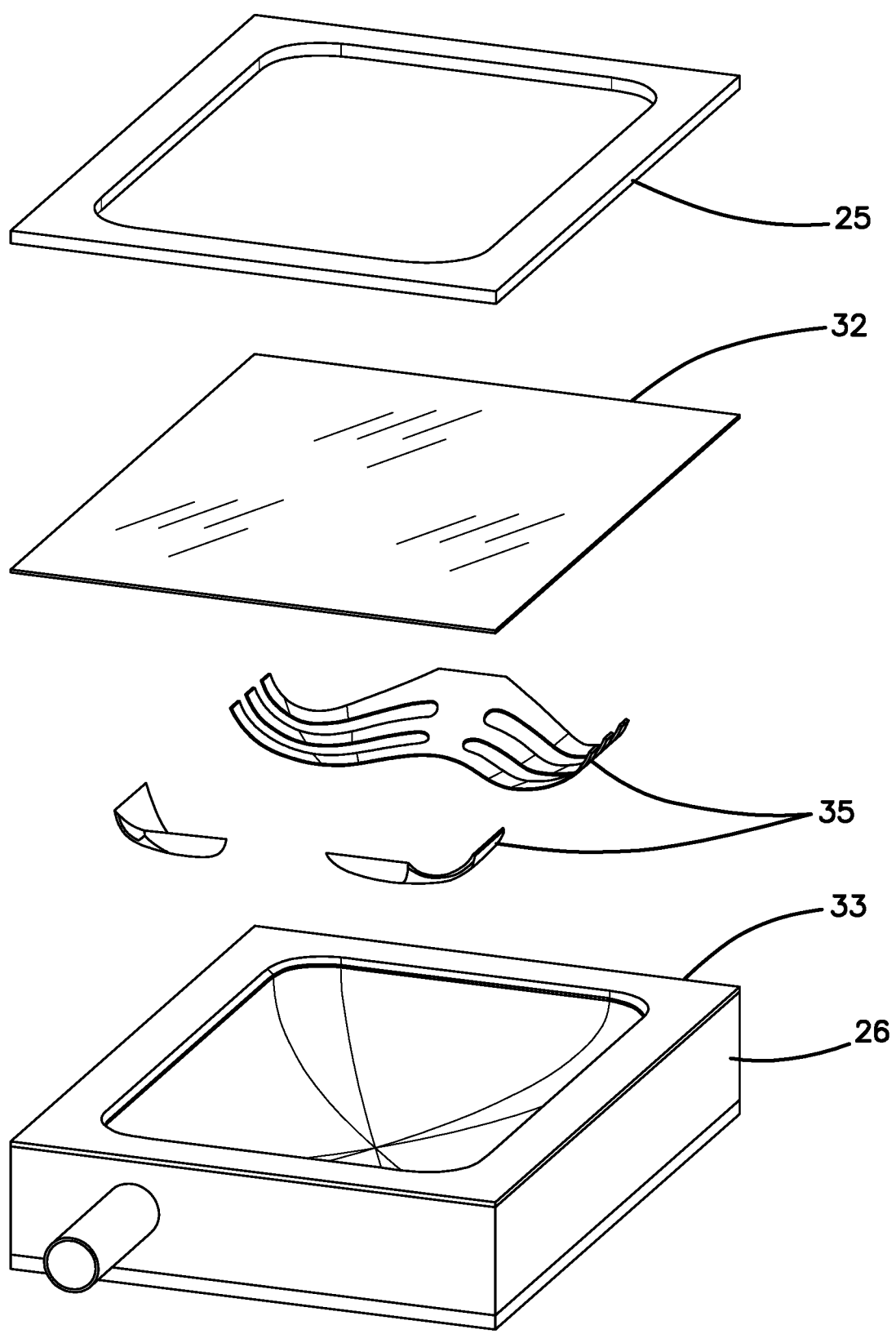
FIG. 17A is a top perspective, exploded view of a vacuum mold, a deformed layer, an undeformed layer, and three bony inserts according to the present invention.
Figure 17B:
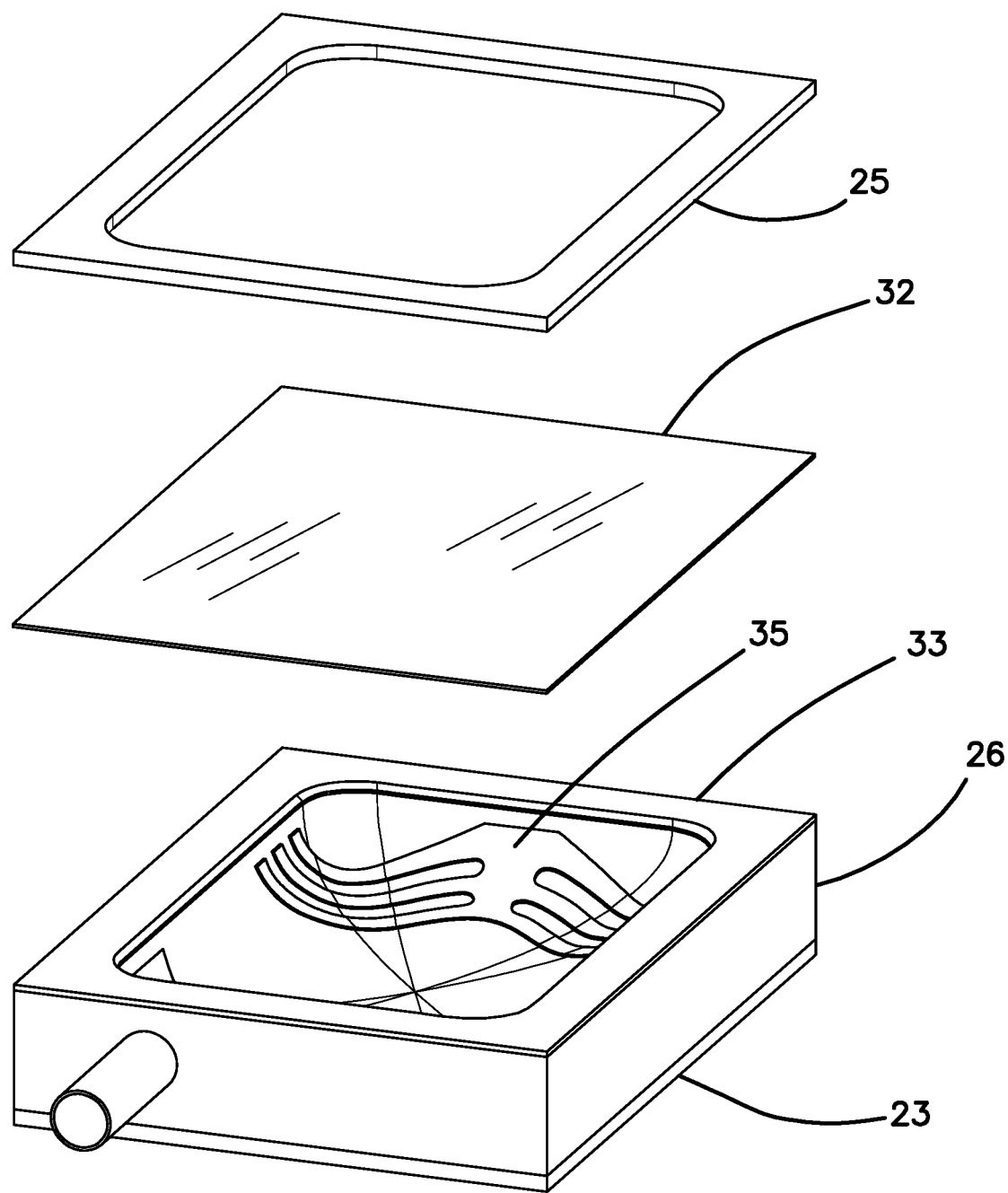
FIG. 17B is a top perspective view of a vacuum mold, a deformed layer, an undeformed layer, and a bony insert adhered to the deformed layer according to the present invention.
Figure 17C:
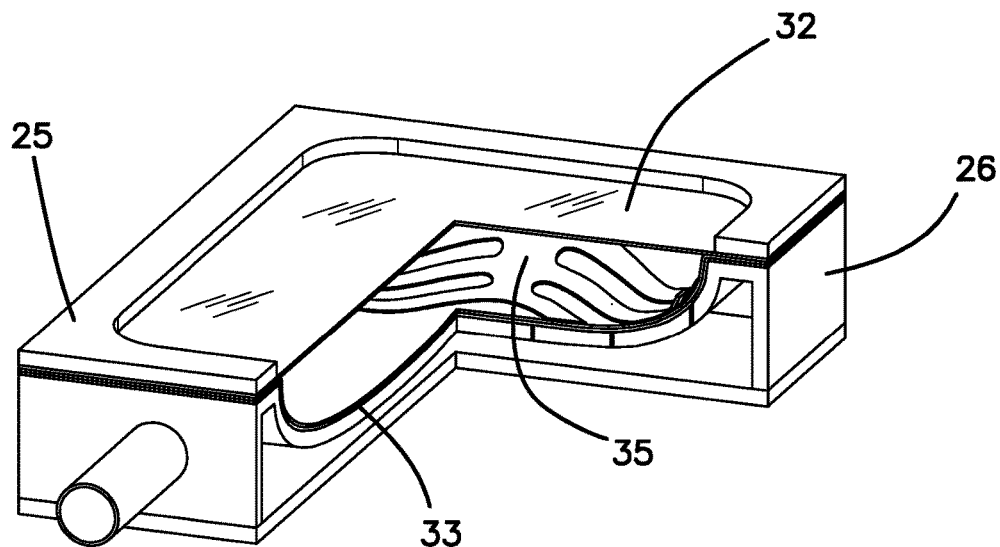
FIG. 17C is a top perspective, sectional view of a vacuum mold, at least one deformed layer, an undeformed layer, and a bony insert according to the present invention.
Figure 17D:
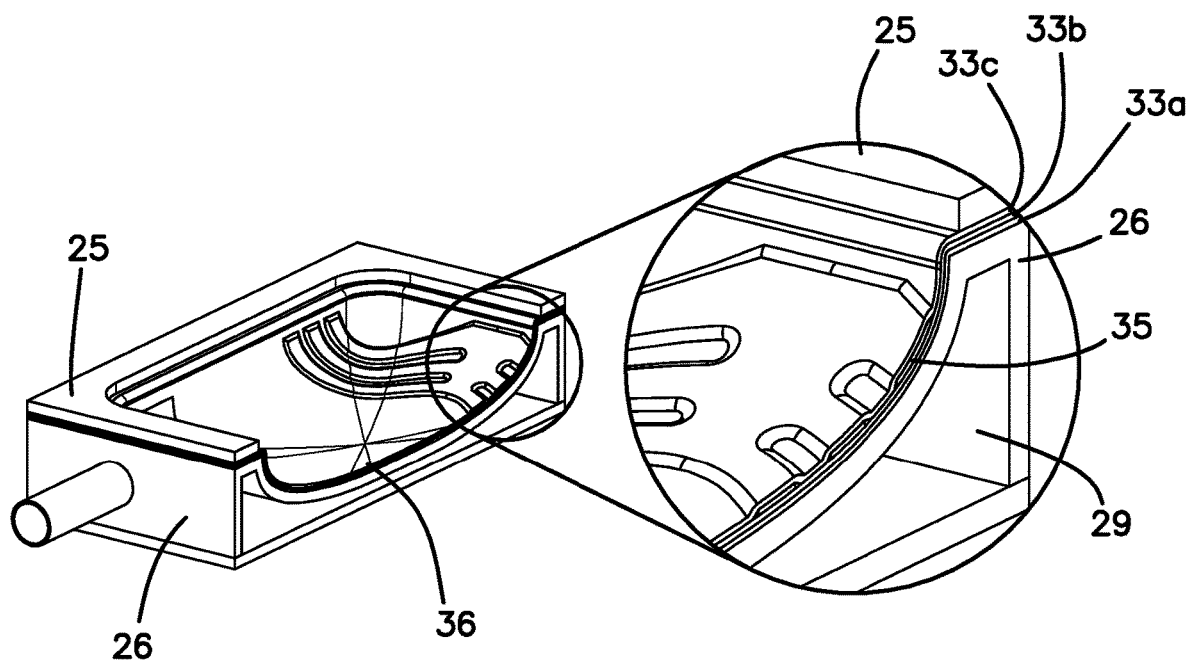
FIG. 17D is a detailed sectional view of a vacuum mold, and a bony insert located between two deformed layers according to the present invention.

In one variation of this process, at least one insert 35 is provided between two layers as can be seen in FIGS. 17A-17D. At least one foam layer 33 has already been deformed by the vacuum mold and is located inside the cavity 28. Prior to placing a flat foam sheet 32 and frame 25 onto at least one previously deformed foam layer 33, at least one bony insert 35 is glued in place on the upper surface of the last deformed foam layer 33b. FIG. 17B shows the bony insert 35 glued in place on top of the pre-made foam layers 33. Adhesive is also applied to the top side of the bony insert 35, and a subsequent flat foam sheet 32 is placed on top and held in place with frame 25 as shown in FIG. 17C. FIG. 17D shows the bony insert 35 sandwiched and enclosed between two deformed layers 33b and 33c creating a simulated abdominal wall with a bony insert. Other adjacent layers 33 may include bone inserts 35 therebetween. Although the word "bony" is used, the invention is not so limited and bony inserts not only represent bone in the anatomy, but may represent any other anatomical structure of increased rigidity relative to the foam layers such as cartilage, muscle, bones, tumors and the like or of decreased rigidity relative to the layers such as blood vessels, nerves and the like. To replicate bone, the bony inserts 35 are made of rigid plastic. To replicate nerves or vessels, the bony inserts 35 may be made of soft silicone. The inserts may be made from but not limited to the following materials: polypropylene, styrene, polyethylene, nylon, paper, cardstock, polyvinyl chloride, polyethylene terephthalate, polyethylene, terephthalate glycol-modified, and acetal homopolymer resin.

Figure 18:
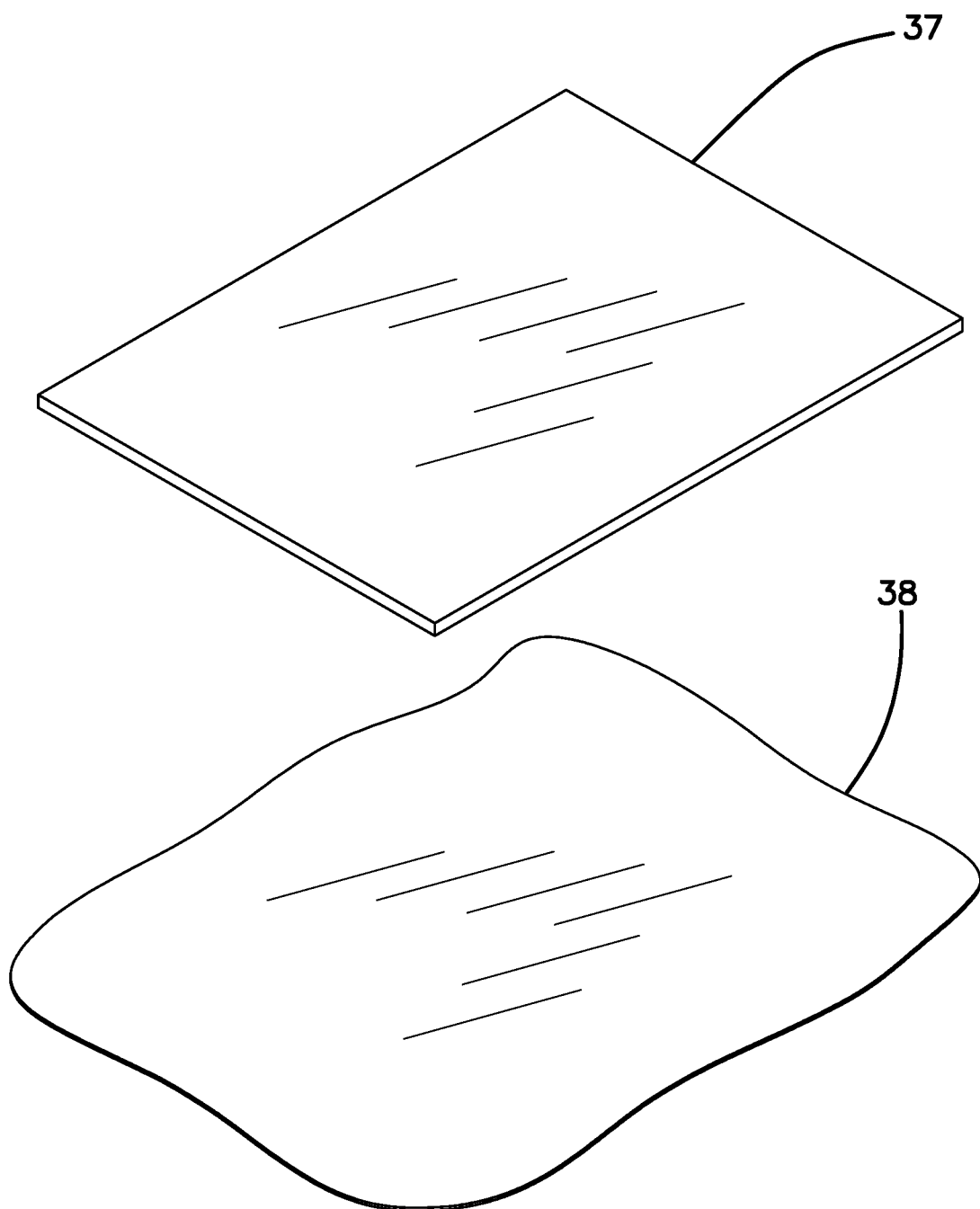
FIG. 18 is a top perspective view of a flat piece of foam, and an uncured sheet of silicone prior to being joined to make a skin layer according to the present invention.
Figure 19A:
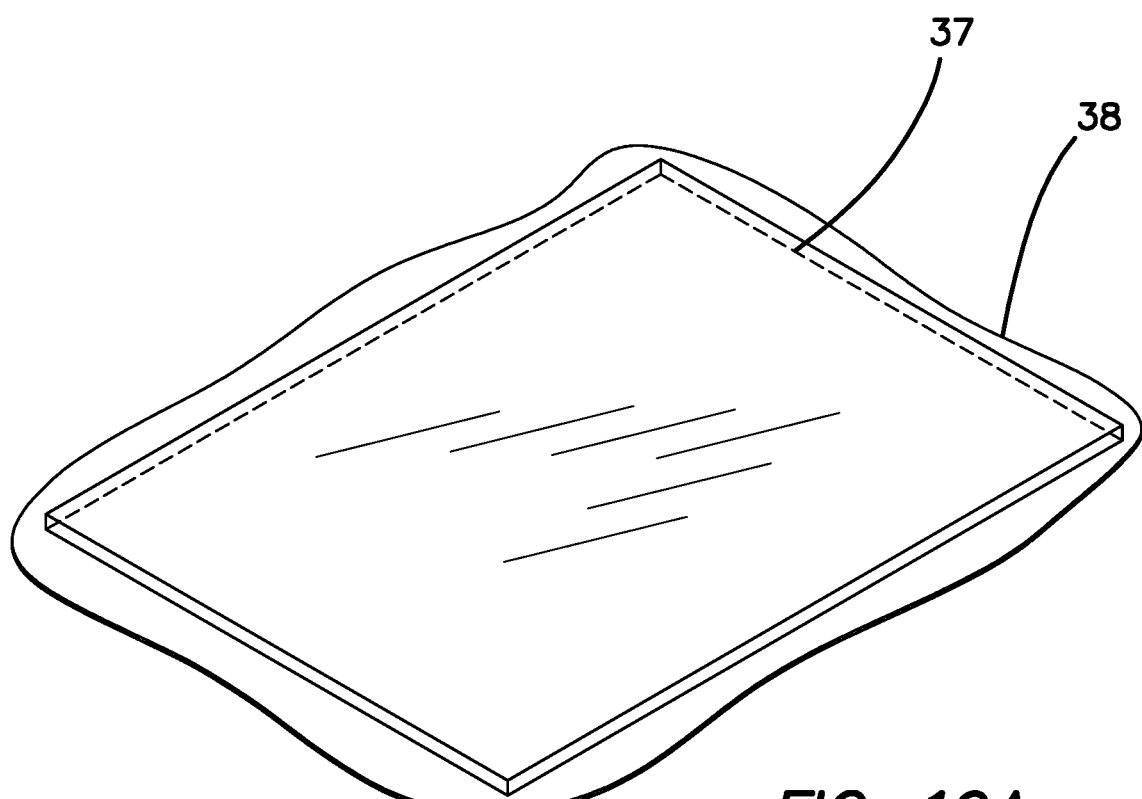
FIG. 19A is a top perspective view of a skin foam layer in place on an uncured layer of silicone according to the present invention.
Figure 19B:
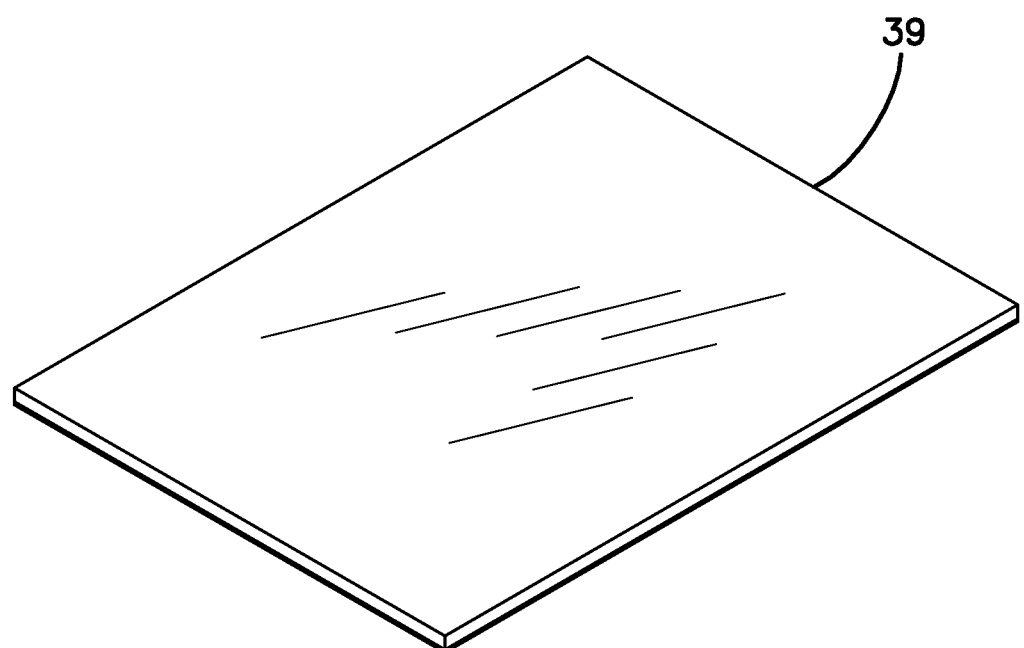
FIG. 19B is a top perspective view of a skin foam layer connected to a cured layer of silicone trimmed of excess cured silicone according to the present invention.

Turning now to FIG. 18, forming an outer skin layer 39 will now be described. The skin layer includes a skin foam layer 37 and a silicone layer 38. In one variation, the skin foam layer 37 is made of memory foam. In making the skin layer, the foam layer 37 is placed on an uncured silicone layer 38 as shown in FIG. 19A and the silicone layer 38 is allowed to cure. When the silicone cures on the foam, it creates a mechanical bond with the slightly porous foam material. As the silicone cures, it interlocks with the pores of the foam material. Once the silicone is fully cured, the excess is trimmed resulting in the trimmed skin layer 39. Because the silicone is securely bonded to the underlying foam, a much more durable skin layer is realized, and costs are driven down by reducing the frequency of abdominal wall replacement. The combination of foam and silicone closely adhered together via the curing process makes both layers easily deformed in the vacuum mold and further easily adhered to the rest of the deformed layers. Furthermore, in previous versions where the outer skin layer is not bound to the underlying layers, unrealistic spaces open up between the simulated abdominal wall layers during port placement visible to the surgeon. The present invention eliminates this issue because the silicone is mechanically bonded to a foam layer which is easily deformed and adhered to other foam layers.

Figure 20:
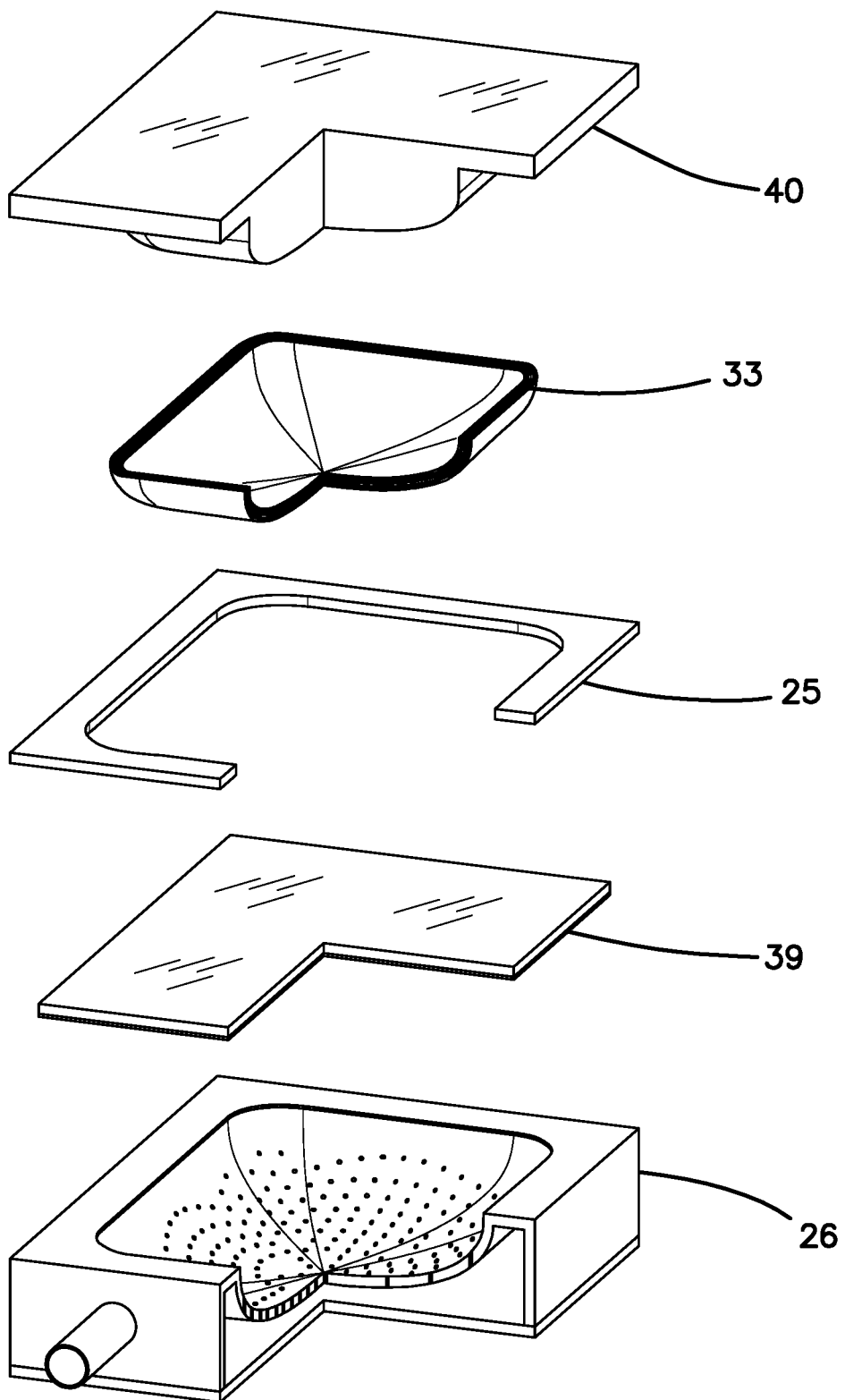
FIG. 20 is an exploded view of the vacuum mold, an undeformed skin layer, previously deformed layers and a weighted plug used to join the previously deformed layers to the skin layer according to the present invention.
Figure 21A:
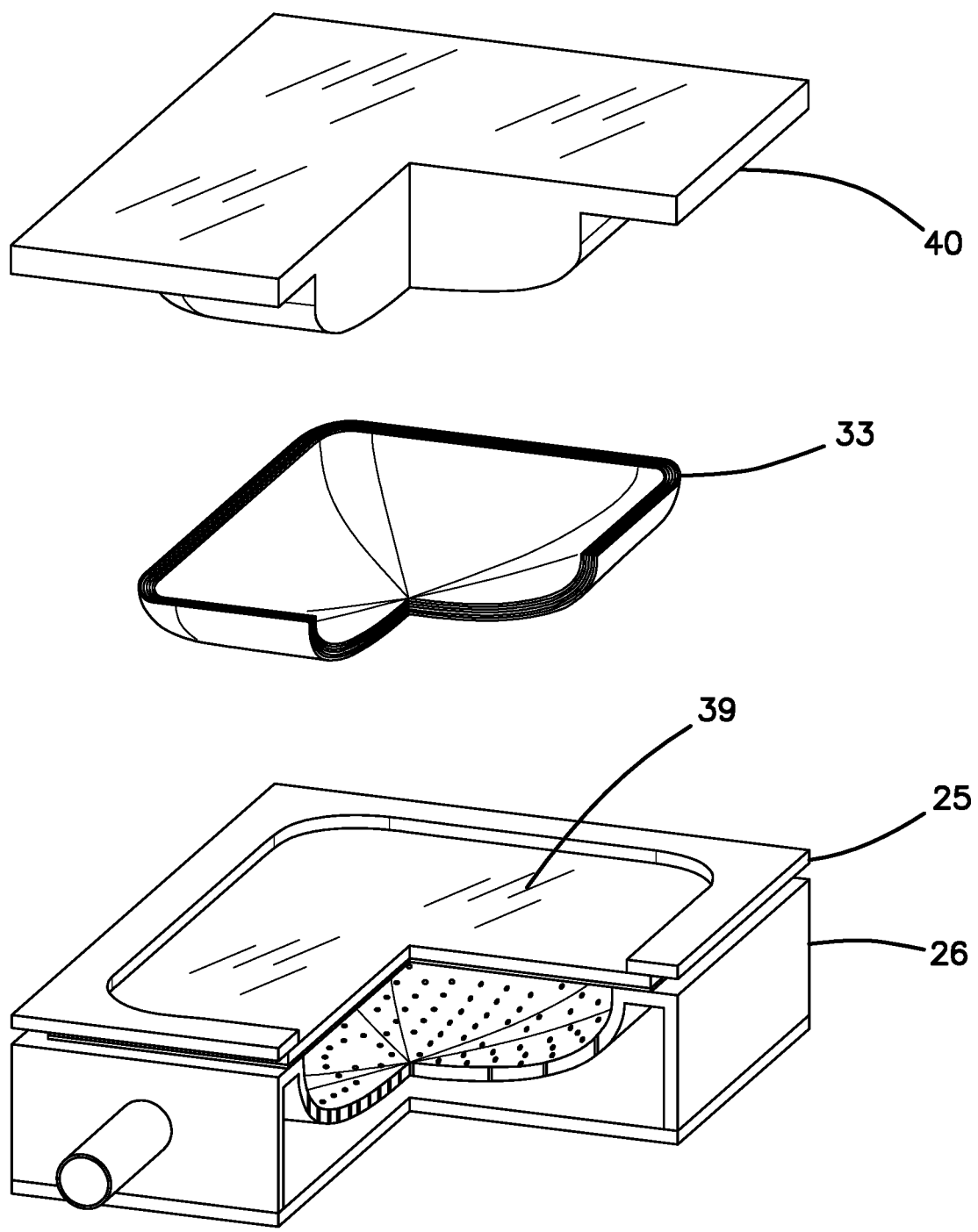
FIG. 21A is an exploded view of an undeformed skin layer in place on a vacuum mold, previously deformed layers and a weighted plug according to the present invention.
Figure 21B:
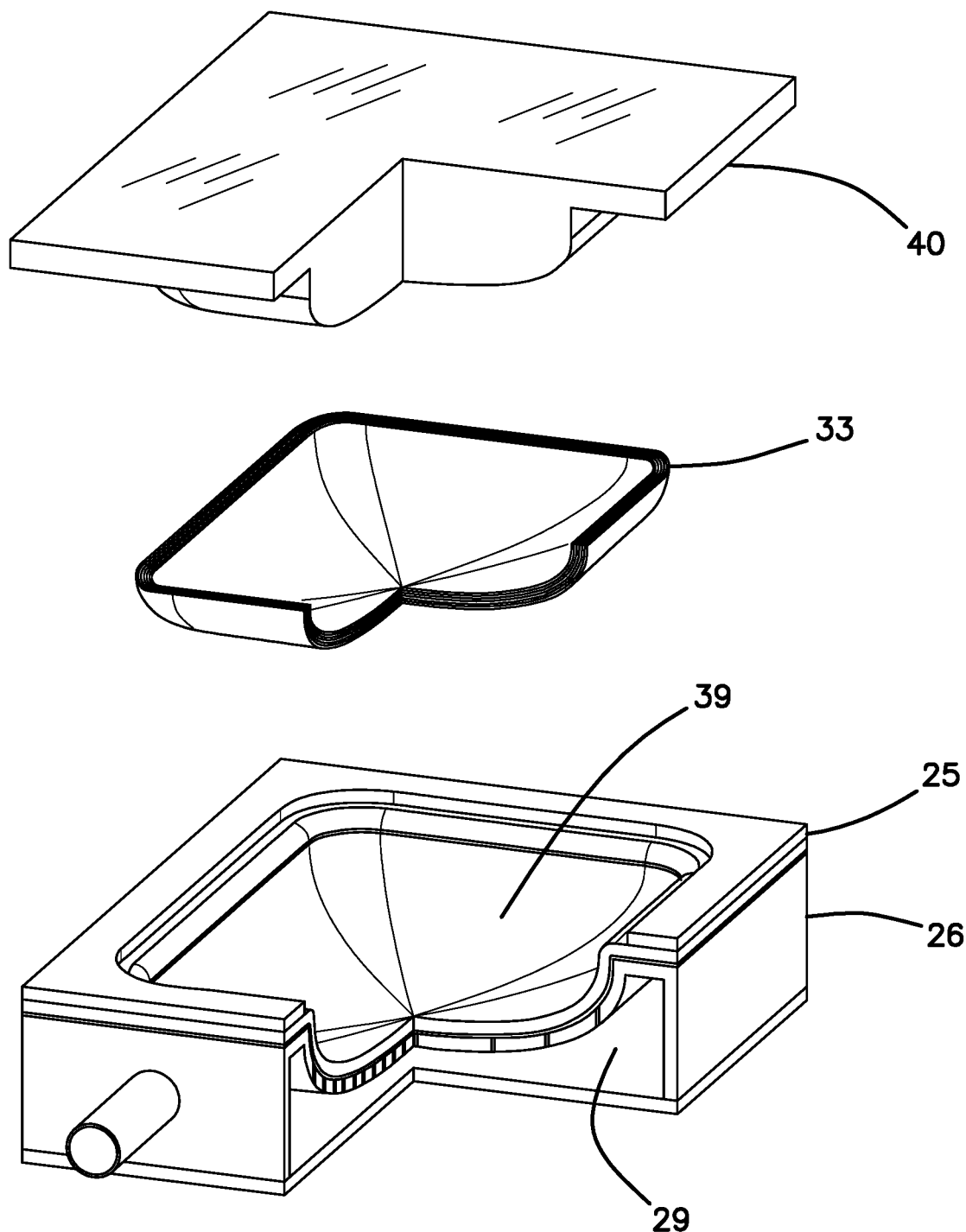
FIG. 21B is a top perspective view of a deformed skin layer, previously deformed layers and a weighted plug ready to be placed on top according to the present invention.
Figure 21C:
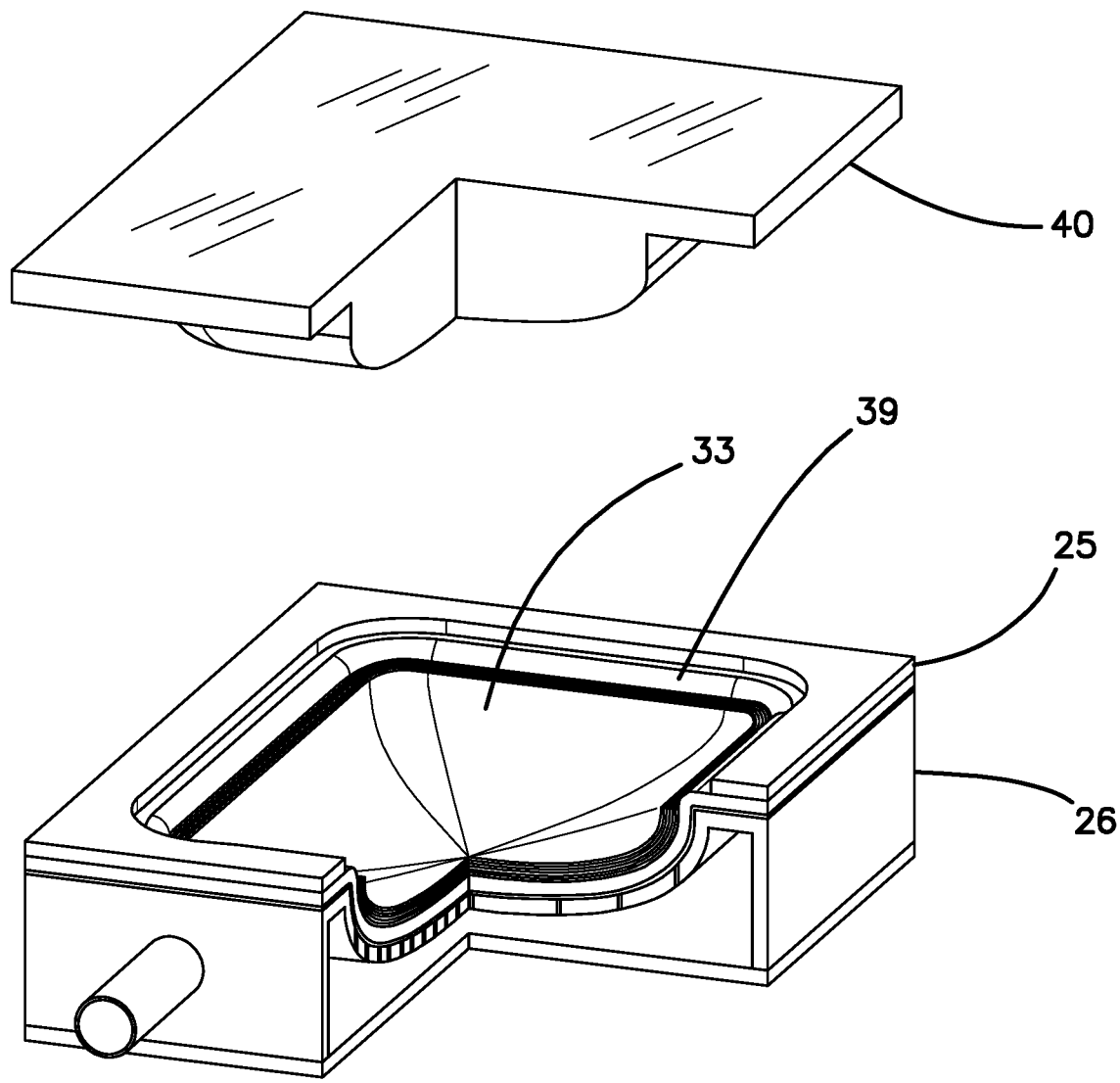
FIG. 21C is a top perspective view of a deformed skin layer shows the skin layer in place on the vacuum mold after forming, with previously deformed foam layers in place, and a weighted plug ready to be placed inside the cavity according to the present invention.
Figure 21D:
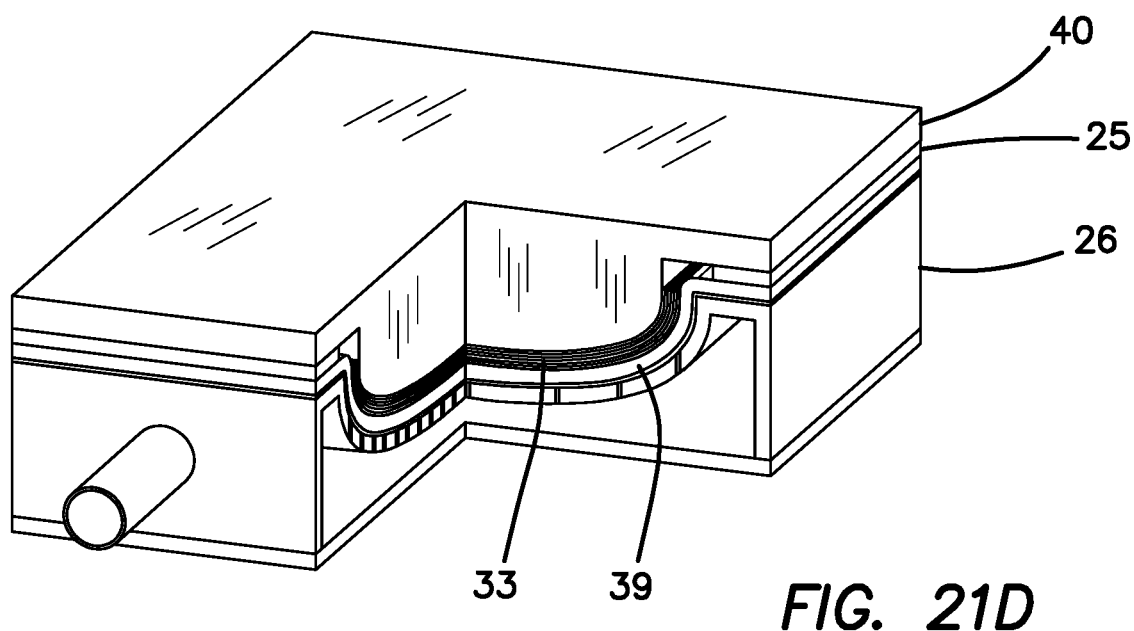
FIG. 21D is a top perspective view of a deformed skin layer inside a vacuum mold, with the deformed foam layers and weighted plug in place inside the cavity of a vacuum mold according to the present invention.
Figure 22:
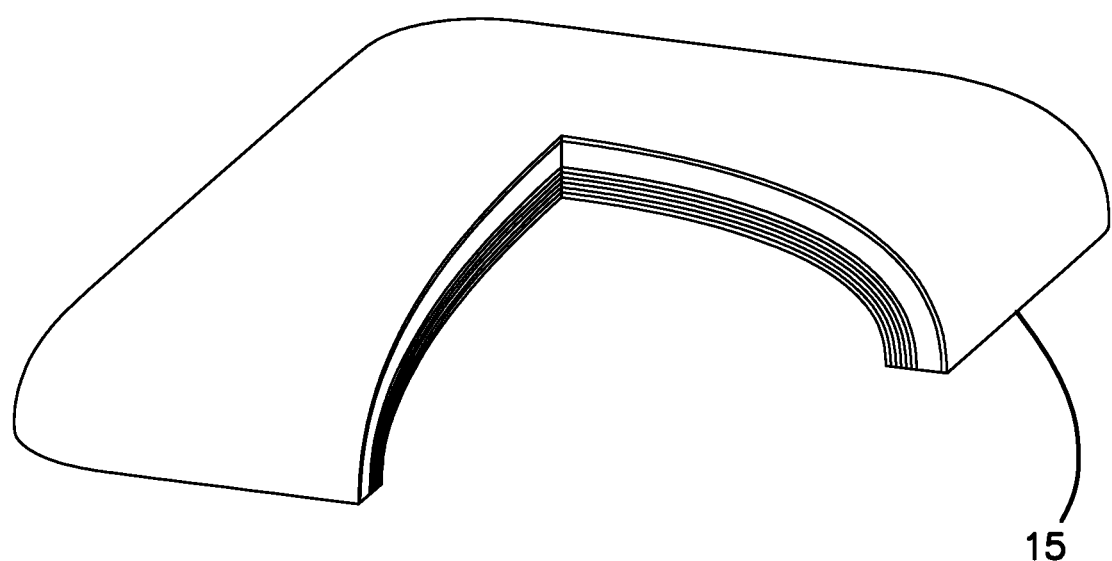
FIG. 22 is a top perspective view of a simulated abdominal wall for use in the assembly of the trainer according to the present invention.
Figure 23:
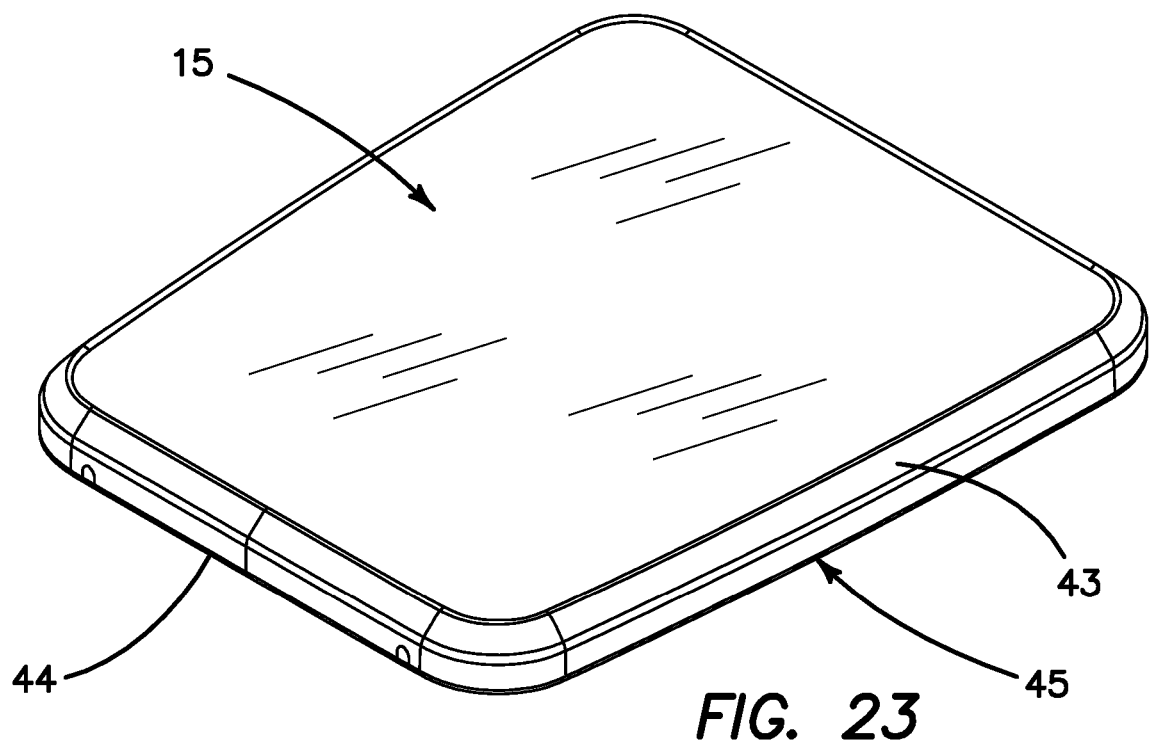
FIG. 23 is a top perspective view of a final simulated abdominal wall fit into the simulated abdominal wall frame according to the present invention.

Turning now to FIGS. 20-21, after the skin layer 39 is prepared, it is placed inside the cavity 28 of the vacuum mold 20 followed by the frame 25. The trimmed skin layer 39 is positioned with the silicone skin layer 38 facing the main body 26 of the mold 20. FIG. 21A shows the trimmed skin layer 39 held in place on the vacuum mold's main body 26 by the frame 25 prior to evacuation of the vacuum mold. FIG. 21B shows the trimmed skin layer 39 pulled into the cavity 28 of the vacuum mold as a result of activation of a vacuum inside the plenum 29. In FIG. 21B, the previously deformed foam layers 33 with or without bony inserts 35 are ready to be pressed down into the cavity by the weighted plug 40. FIG. 21C shows the previously deformed foam layers 33 glued into a unitary body placed into the cavity 28 on top of the trimmed and deformed skin layer 39. Adhesive is added between the skin layer 39 and uppermost foam layer 33 to adhere the skin layer 39 to the rest of the deformed layers 33. FIG. 21D shows the placement of the weighted plug 40 on top of the previously deformed foam layers 33. The weighted plug 40 helps to press all of the layers together to uniformly adhere the different layers until the glue dries. FIG. 22 shows the final simulated abdominal wall 15 in its finished state prior to having its edges bound into a trainer 10 by a frame having top and bottom halves 43, 44 as will be described hereinbelow. The final simulated abdominal wall 15 has a polygonal footprint. The simulated skin layer 39 may also be employed in a similar manner with the variation of FIGS. 4-7 wherein the completed domed-shaped skin layer 39 is adhered to the one or more domed cutout layer wherein the domed cutout layer(s) may themselves be bonded together.

Figure 24:
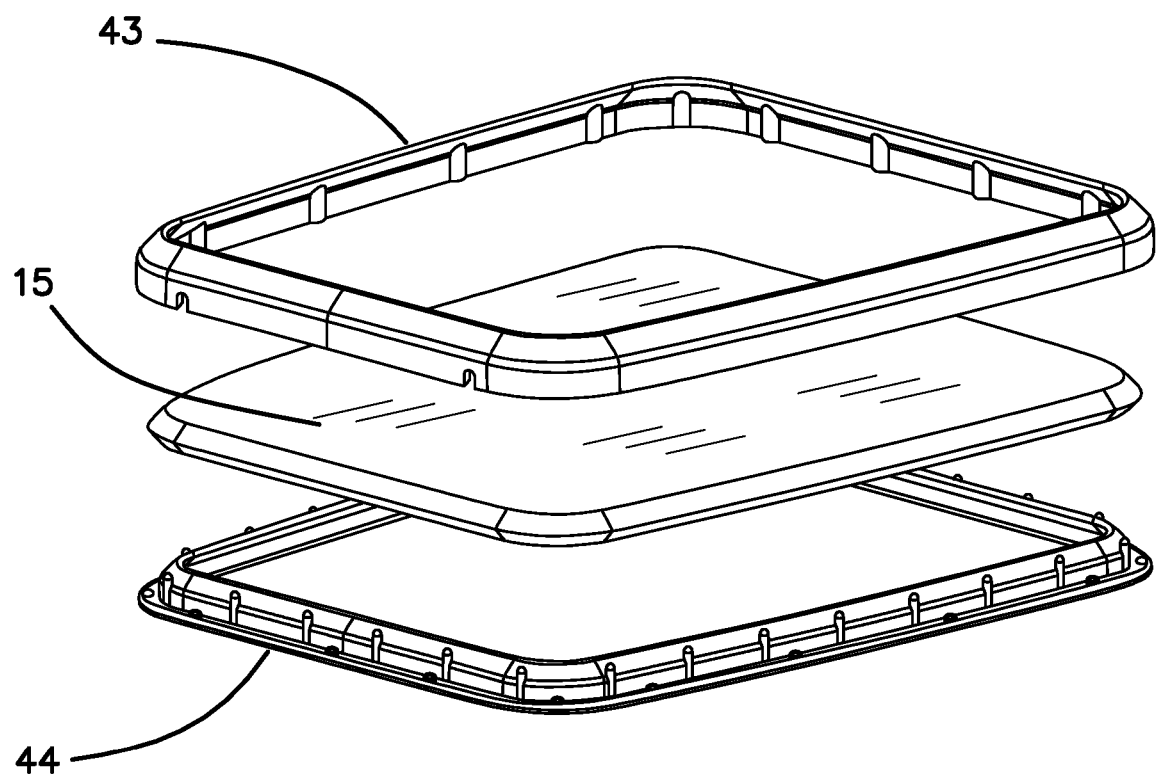
FIG. 24 is an exploded view of a simulated abdominal wall and two frame halves according to the present invention.

With reference to FIGS. 23-26, the simulated abdominal wall 15 is inserted into a simulated abdominal wall frame 45 which is a two-piece system including a top half 43 and a bottom half 44 that secures the simulated abdominal wall from the perimeter only by compressing the foam layers. The framed abdominal wall 15 is then removably fixed into a laparoscopic trainer 10. FIG. 24 shows the exploded view of the simulated abdominal wall 15 and frame assembly 43, 44 comprised of the simulated abdominal wall 15, top frame 43, and bottom frame 44. The top frame 43 and bottom frame 44 can be assembled together via screws or other fastener such as a snap-fit engagement in the case of a re-usable frame system, or snapped together via heat staking or other low cost assembly method.

Figure 25:
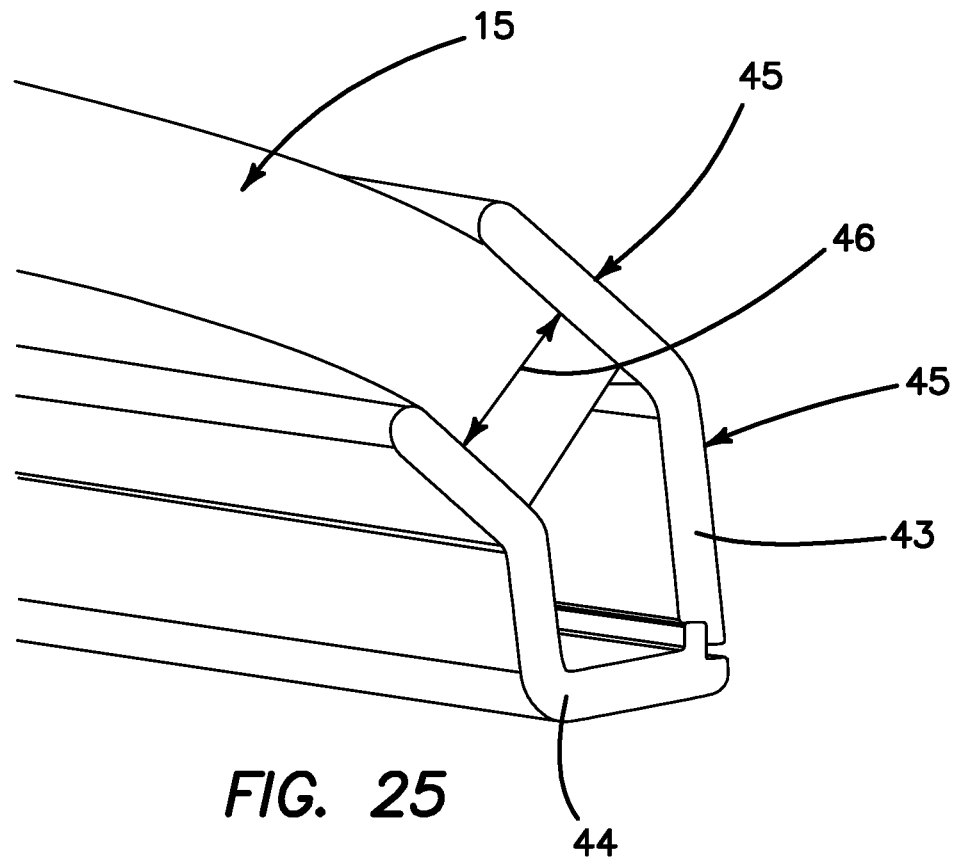
FIG. 25 is a partial cross-sectional view of an angled channel of the two frame halves and simulated abdominal wall compressed therebetween according to the present invention.

With reference to FIG. 25, the simulated abdominal wall frame 45 includes an angled channel 46 in which the simulated abdominal wall 15 is compressed to secure it into the frame 45. The angled channel 46 is created by the top and bottom frame components 43, 44. If the simulated abdominal wall 15 was compressed between two flat frames, it would weaken the structure and it would invert/collapse during use much more easily. The channel 46 is angled from the vertical axis toward the middle of the simulated abdominal wall 15. This angle follows the contour of the convex form of the simulated abdominal wall 15 and significantly strengthens and increases the support provided to the convex form of the simulated abdominal wall 15. Without this feature the simulated abdominal wall would invert during use much more easily.

Figure 26A:
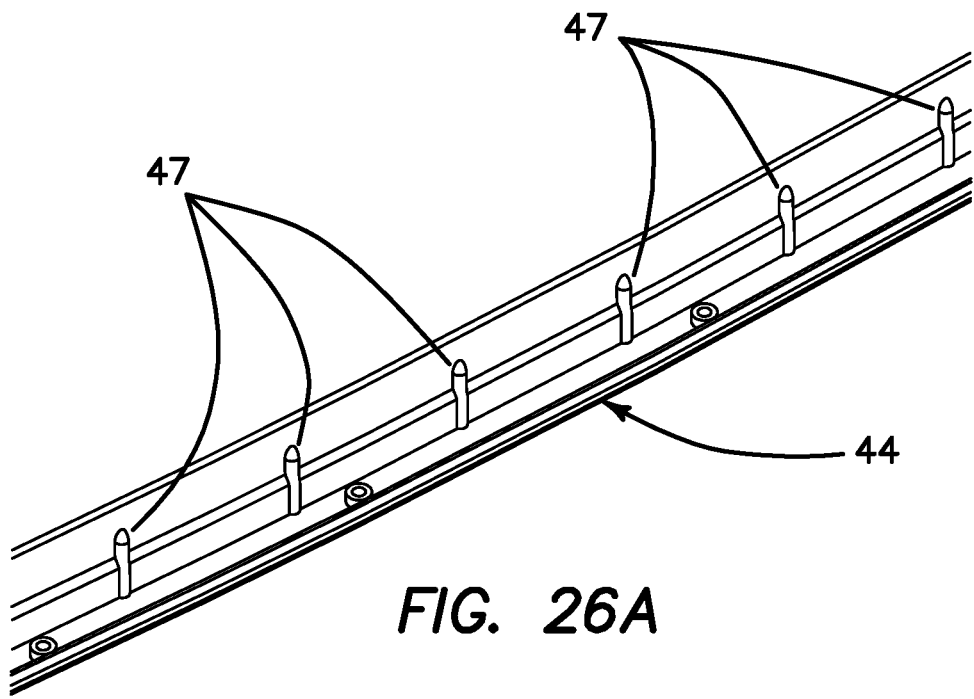
FIG. 26A is a sectional view of a bottom frame half with retention protrusions according to the present invention.
Figure 26B:
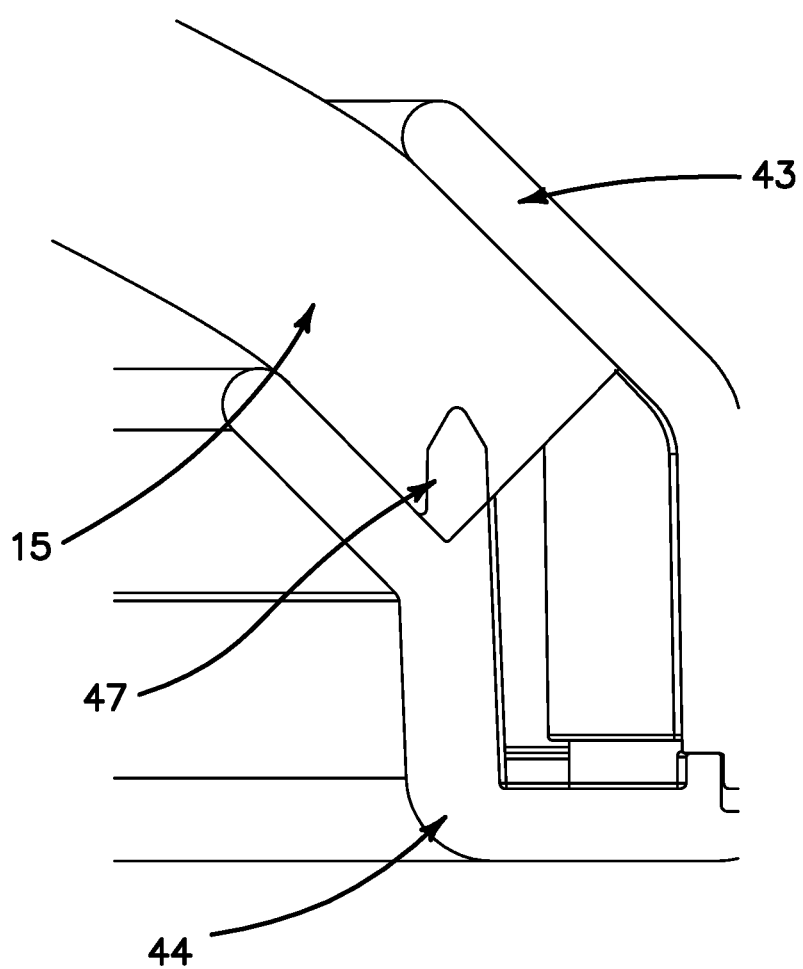
FIG. 26B is a sectional view of simulated abdominal wall and frame according to the present invention.

As shown in FIGS. 26A-26B, the bottom frame 44 includes upward protrusions 47 that are spaced around the perimeter of the bottom frame 44. These retaining protrusions 47 can also be present on the top frame 43, or both frame halves 43, 44. These teeth-like retaining protrusions 47 provide additional retention of the simulated abdominal wall 15 within the simulated abdominal wall frame 45 by pressing or biting into the simulated abdominal wall as it is compressed between the frame top 43 and frame bottom 44. With reference to FIG. 26B, a simulated abdominal wall 15 is compressed between the two frame halves 43, 44 and is pierced by a retaining protrusion 47. Alternatively, rubberized pads or double-sided tape may be employed together with or without the protrusions to retain the abdominal wall 15.

The design of the frame 45 allows the user to easily install and remove the wall/frame assembly from the surgical simulator enclosure. The geometry of the abdominal wall frame adds further support to the convex form of the simulated abdominal wall by utilizing an angled channel along the perimeter that the simulated abdominal wall is compressed between, which follows the natural shape of the simulated abdominal wall. Simply compressing the simulated abdominal wall between flat frame halves would result in significantly reduced support for the convex form and feel of the simulated abdominal wall, which would likely result in unwanted inversion during normal use.

The methods described above rely on a bent lamination mechanism formed in part by successively gluing surfaces together that have been made to curve. A structure that maintains the desired curvature emerges with each additional layer. The first method combines this gluing of curved layers with cutouts that have been made in the shape of a curved surface projected onto a flat surface. Different cutout patterns are alternated so that the seams of the cutouts do not align to weaken the structure, or alternatively, a cutout may be displaced/rotated with respect to the previous later having the same pattern to offset the seams from each other.

The second method uses vacuum forming to achieve curved surfaces and avoids seams across the surface altogether. Flat sheets of foam are placed over a negative cavity vacuum mold, a frame is placed over the foam to make an air-tight seal, and the vacuum mold is evacuated. As the vacuum is pulled, heat is applied to the foam, which allows the foam to yield and stretch into the mold cavity. When a new layer is to be added, a multitude of holes are poked through the previously-formed foam layers. Adhesive is applied between the layers so that they form a bond across the entire curved surface. After several layers of foam have been laminated together, the work-piece begins to maintain the curved shape of the mold. By adding or removing layers, the tactile response of the foam layers can be tailored for more lifelike feel.

Additionally, rigid or semi-rigid pieces may be added between the foam layers to simulate bony or other anatomy in any of the methods described herein. It should be noted that these bony inserts are not required for structural support. Instead, the bony inserts give the user landmarks for proper port placement, and also prevent port placement in the wrong area. Palpation is a common technique used for proper port placement, which is a crucial part of a successful procedure, and the bony inserts permit the user to train on palpation and proper port placement successfully. The bony inserts advantageously improve the realistic feel of the model.

It should be noted that while two methods are described here for layering pre-made foam sheets in order to create a curved surface with structural integrity, it would also be possible to create a casting mold that allows the user to sequentially build up a multitude of curved layers that are adhered to one another across their entire surface.

It is understood that various modifications may be made to the embodiments disclosed herein. Therefore, the above description should not be construed as limiting, but merely as exemplifications of preferred embodiments. Those skilled in the art will envision other modifications within the scope and spirit of the present disclosure.

We claim:
1. A surgical training system, comprising:
 a base;
 a top cover connected to and spaced apart from the base to define an internal cavity; the top cover including an opening;

a frame removably connected to the top cover in the location of the opening; and a simulated abdominal wall connected to the frame and spanning at least part of the opening; wherein the simulated abdominal wall comprises a plurality of dome-shaped layers forming a unitary dome body; the unitary dome body having a convex surface and a concave surface facing the internal cavity, wherein the frame includes an angled channel formed between a top frame and a bottom frame; the angled channel being sized and configured to receive a perimeter of the simulated abdominal wall and to compress the simulated abdominal wall.

2. The surgical training system of claim 1 wherein the frame comprises a two-piece system having the top frame and the bottom frame; the top and bottom frames being joined together with the simulated abdominal wall located therebetween.

3. The surgical training system of claim 1 wherein the frame includes protrusions spaced around either or both of the top and bottom frames to secure the simulated abdominal wall to the frame.

4. The surgical training system of claim 1 wherein the frame is polygonal in shape and the unitary dome body is a hemisphere.

5. The surgical training system of claim 1 wherein the simulated abdominal wall is penetrable by a surgical trocar.

6. The surgical training system of claim 1 wherein the simulated abdominal wall further comprises at least one insert disposed between two adjacent layers from the plurality of dome-shaped layers; the at least one insert being made of rigid plastic or soft plastic.

7. The surgical training system of claim 6 wherein the at least one insert replicates anatomical structure of increased rigidity relative to the plurality of dome-shaped layers when made from rigid plastic; the at least one insert representing cartilage, muscle, bones, or tumors.

8. The surgical training system of claim 6 wherein the at least one insert replicates anatomical structure of decreased rigidity relative to the plurality of dome-shaped layers when made from soft silicone; the at least one insert representing blood vessels or nerves.

9. The surgical training device of claim 1 wherein adjacent layers of the plurality of dome-shaped layers are nested inside one another.

10. The surgical training system of claim 1 wherein the unitary dome body is formed by bonding inner and outer surfaces of adjacent layers of the plurality of dome-shaped layers using adhesive.

11. The surgical training system of claim 1 wherein the convex surface of the unitary dome body is curved in at least two directions; the convex surface having a curvature formed using a bent lamination mechanism where the plurality of domed-shaped layers are successively glued together.

12. The surgical training system of claim 1 wherein the convex surface of the unitary dome body comprises a skin dome-shaped layer; the skin dome-shaped layer being formed from a planar skin layer comprising a planar layer of silicone cured onto a planar layer of foam, such that the silicone adheres to the foam.

13. The surgical training system of claim 12 wherein the planar skin layer is deformed into the skin dome-shaped layer by exposure to heat in a vacuum plenum or mold; the skin dome-shaped layer having an inner surface made of foam and an outer surface made of cured silicone.

14. The surgical training system of claim 13 wherein the inner surface of the skin dome-shaped layer is adhered to an outer surface of a topmost layer of the plurality of domed-shaped layers using adhesive.

15. The surgical training system of claim 1 wherein the plurality of dome-shaped layers are formed from a plurality of planar cutouts of domed projections; the plurality of planar cutouts of domed projections being made of foam.

16. The surgical training system of claim 15 wherein each of the plurality planar cutouts of domed projections is assembled into a dome having seams; the seams being defined by joining edges of each planar cutout of domed projection.

17. The surgical training system of claim 15 wherein the plurality of planar cutouts of domed projections are of at least one or more different domed projections.

18. The surgical training system of claim 1 wherein the plurality of dome-shaped layers are formed from a plurality of convex foam sheets; each of the plurality of convex foam sheets is formed from one flat foam sheet deformed by exposure to heat in a vacuum plenum or mold.

19. A surgical training system, comprising:
a base;
a top cover connected to and spaced apart from the base to define an internal cavity; the top cover including an opening;
a frame removably connected to the top cover in the location of the opening; and
a simulated abdominal wall connected to the frame and spanning at least part of the opening; wherein the simulated abdominal wall comprises a plurality of dome-shaped layers forming a unitary dome body; the unitary dome body having a convex surface and a concave surface facing the internal cavity, wherein:
the frame includes an angled channel sized and configured to receive a perimeter of the simulated abdominal wall and to compress the simulated abdominal wall, and
the angled channel is angled from a vertical axis toward a center of the simulated abdominal wall and follows a contour of the convex surface of the unitary dome body.

20. The surgical training system of claim 19 wherein the frame comprises a two-piece system having a top frame and a bottom frame; the top and bottom frames being joined together with the simulated abdominal wall located therebetween; wherein the angled channel is formed between the top frame and the bottom frame.

* * * * *